United States Patent [19]

Kohno et al.

[11] Patent Number: 5,539,582
[45] Date of Patent: Jul. 23, 1996

[54] ZOOM LENS SYSTEM

[75] Inventors: Tetsuo Kohno, Toyonaka; Hiroyuki Matsumoto, Wakayama, both of Japan

[73] Assignee: Minolta Co., Ltd., Osaka, Japan

[21] Appl. No.: 986,456

[22] Filed: Dec. 7, 1992

[30] Foreign Application Priority Data

Dec. 9, 1991 [JP] Japan .................. 3-350164
Dec. 19, 1991 [JP] Japan .................. 3-354905
Dec. 24, 1991 [JP] Japan .................. 3-357337

[51] Int. Cl.[6] .................. G02B 15/14
[52] U.S. Cl. .................. 359/689; 359/684; 359/740
[58] Field of Search .................. 359/689, 682, 359/684, 740

[56] References Cited

U.S. PATENT DOCUMENTS

| | | | |
|---|---|---|---|
| 4,936,661 | 6/1990 | Betensky | 350/423 |
| 4,955,700 | 9/1990 | Tamaguchi | 350/423 |
| 5,042,926 | 8/1991 | Kikuchi | 359/684 |
| 5,059,006 | 10/1991 | Kikuchi | 350/426 |
| 5,216,547 | 6/1993 | Ogata | 359/689 |

FOREIGN PATENT DOCUMENTS

| | | |
|---|---|---|
| 6472114 | 3/1989 | Japan . |
| 6474521 | 3/1989 | Japan . |
| 210307 | 1/1990 | Japan . |
| 234812 | 2/1990 | Japan . |
| 250118 | 2/1990 | Japan . |
| 263007 | 2/1990 | Japan . |
| 2181715 | 7/1990 | Japan . |
| 2201409 | 8/1990 | Japan . |
| 2201410 | 8/1990 | Japan . |
| 2238416 | 9/1990 | Japan . |
| 2238417 | 9/1990 | Japan . |
| 2238418 | 9/1990 | Japan . |
| 3197914 | 7/1991 | Japan . |
| 3212607 | 9/1991 | Japan . |
| 3212608 | 9/1991 | Japan . |
| 3233422 | 10/1991 | Japan . |
| 3265811 | 11/1991 | Japan . |

*Primary Examiner*—Scott J. Sugarman
*Attorney, Agent, or Firm*—Price, Gess & Ubell

[57] ABSTRACT

A zoom lens system is provided with, from the object side, a first lens unit having a negative refractive power, a second lens unit having a positive refractive power and a third lens unit having a negative refractive power. Zooming from a shortest focal length condition to a longest focal length condition is performed by moving all of the lens units while reducing the distance between the first and second lens units and the distance between the second and third lens units. The second lens unit includes three lens elements of a positive lens element, a negative lens element and a positive lens element from the object side.

16 Claims, 36 Drawing Sheets

1st Enbodiment

1st Enbodiment

1st Embodiment

2nd Enbodiment

FIG. 4A  FIG. 4B  FIG. 4C
2nd Enbodiment [D=∞]
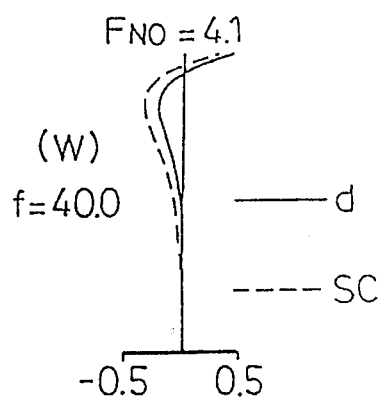
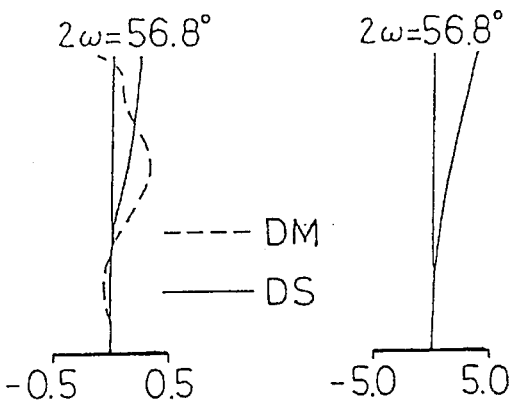
FIG. 4D  FIG. 4E  FIG. 4F
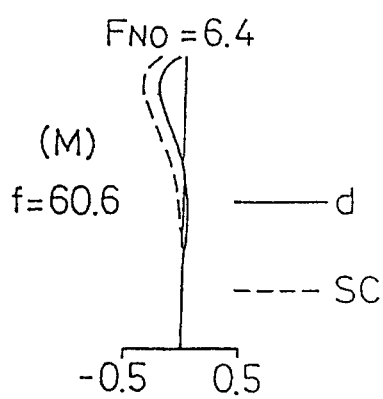
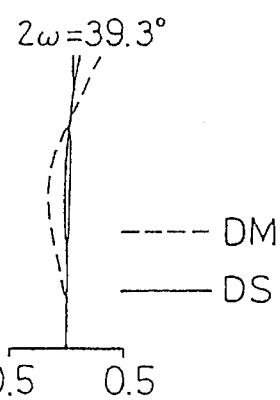
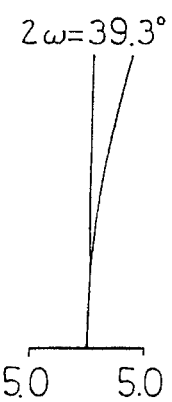
FIG. 4G  FIG. 4H  FIG. 4I
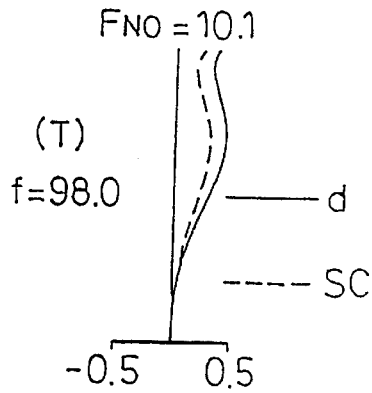
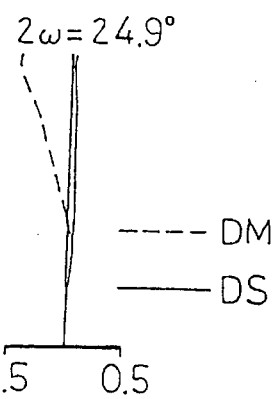
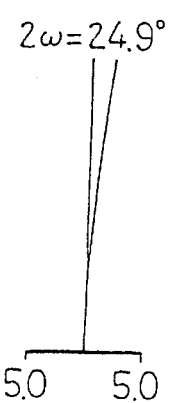

FIG. 5A  FIG. 5B  FIG. 5C

2nd Enbodiment (D=2.5m)

$F_{NO}=4.1$  $2\omega=56.8°$  $2\omega=56.8°$ (W) f=40.0

—— d
---- SC
---- DM
—— DS

-0.5  0.5   -0.5  0.5   -5.0  5.0

Spherical aberration | Sine condition | Astigmatism | Distortion(%)

FIG. 5D  FIG. 5E  FIG. 5F $F_{NO}=6.4$  $2\omega=39.3°$  $2\omega=39.3°$ (M) f=60.6

—— d
---- SC
---- DM
—— DS

-0.5  0.5   -0.5  0.5   -5.0  5.0

Spherical aberration | Sine condition | Astigmatism | Distortion(%)

FIG. 5G  FIG. 5H  FIG. 5I $F_{NO}=10.1$  $2\omega=24.9°$  $2\omega=24.9°$ (T) f=98.0

—— d
---- SC
---- DM
—— DS

-0.5  0.5   -0.5  0.5   -5.0  5.0

Spherical aberration | Sine condition | Astigmatism | Distortion(%)

FIG. 6A  FIG. 6B  FIG. 6C

2nd Enbodiment  [D=0.6~0.8~1.0m]

(W) FNO=4.1  2ω=56.8°  2ω=56.8°
f=40.0
D=0.6m

—— d  ———— DM
———— SC  —— DS

-0.5  0.5  -0.5  0.5  -5.0  5.0

Spherical   Sine
aberration  condition  Astignatism  Distortion(%)

FIG. 6D  FIG. 6E  FIG. 6F (M) FNO=6.4  2ω=39.3°  2ω=39.3°
f=60.6
D=0.8m

—— d  ———— DM
———— SC  —— DS

-0.5  0.5  -0.5  0.5  -5.0  5.0

Spherical   Sine
aberration  condition  Astignatism  Distortion(%)

FIG. 6G  FIG. 6H  FIG. 6I (T) FNO=10.1  2ω=24.9°  2ω=24.9°
f=98.0
D=1.0m

—— d  ———— DM
———— SC  —— DS

-0.5  0.5  -0.5  0.5  -5.0  5.0

Spherical   Sine
aberration  condition  Astignatism  Distortion(%)

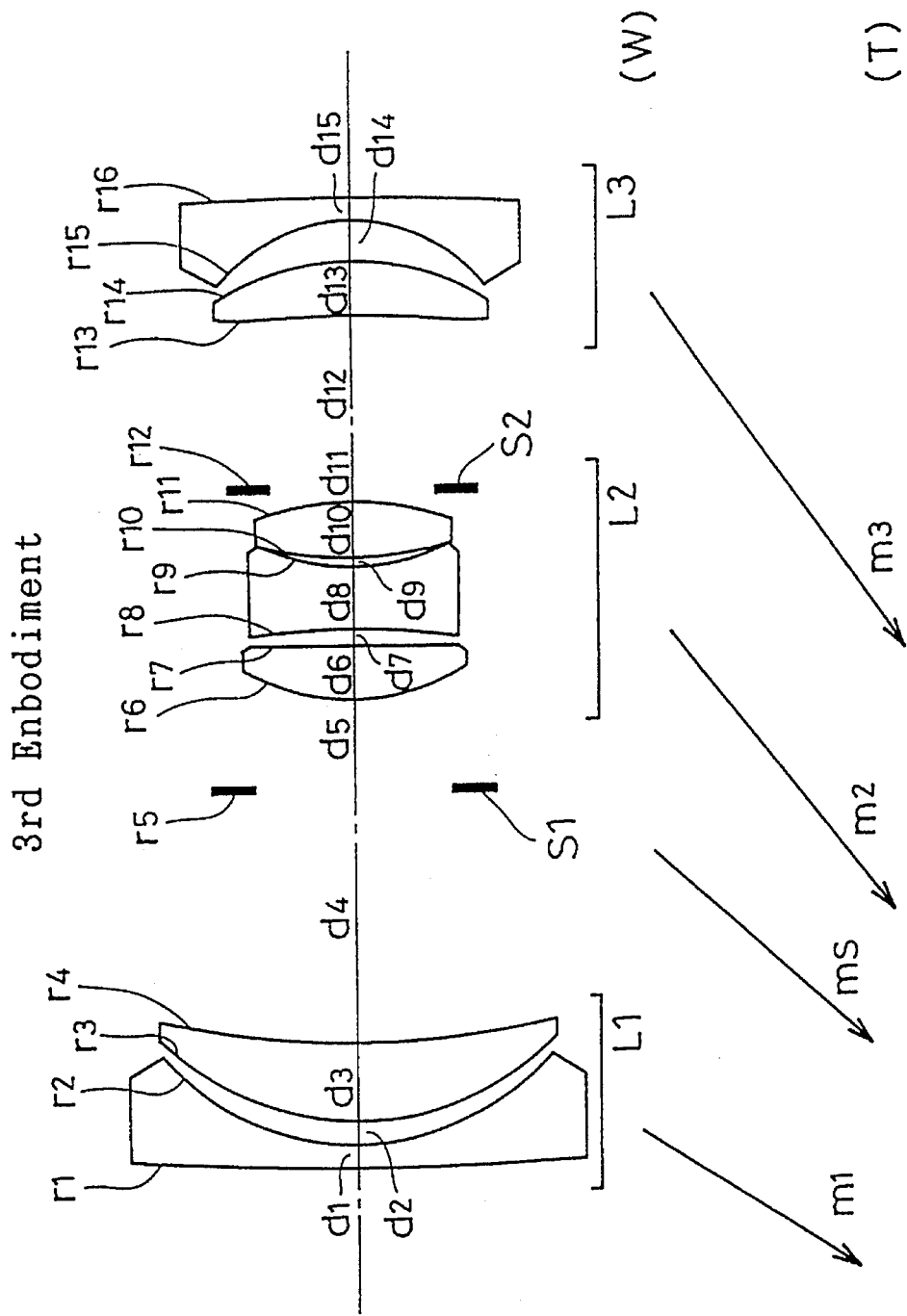

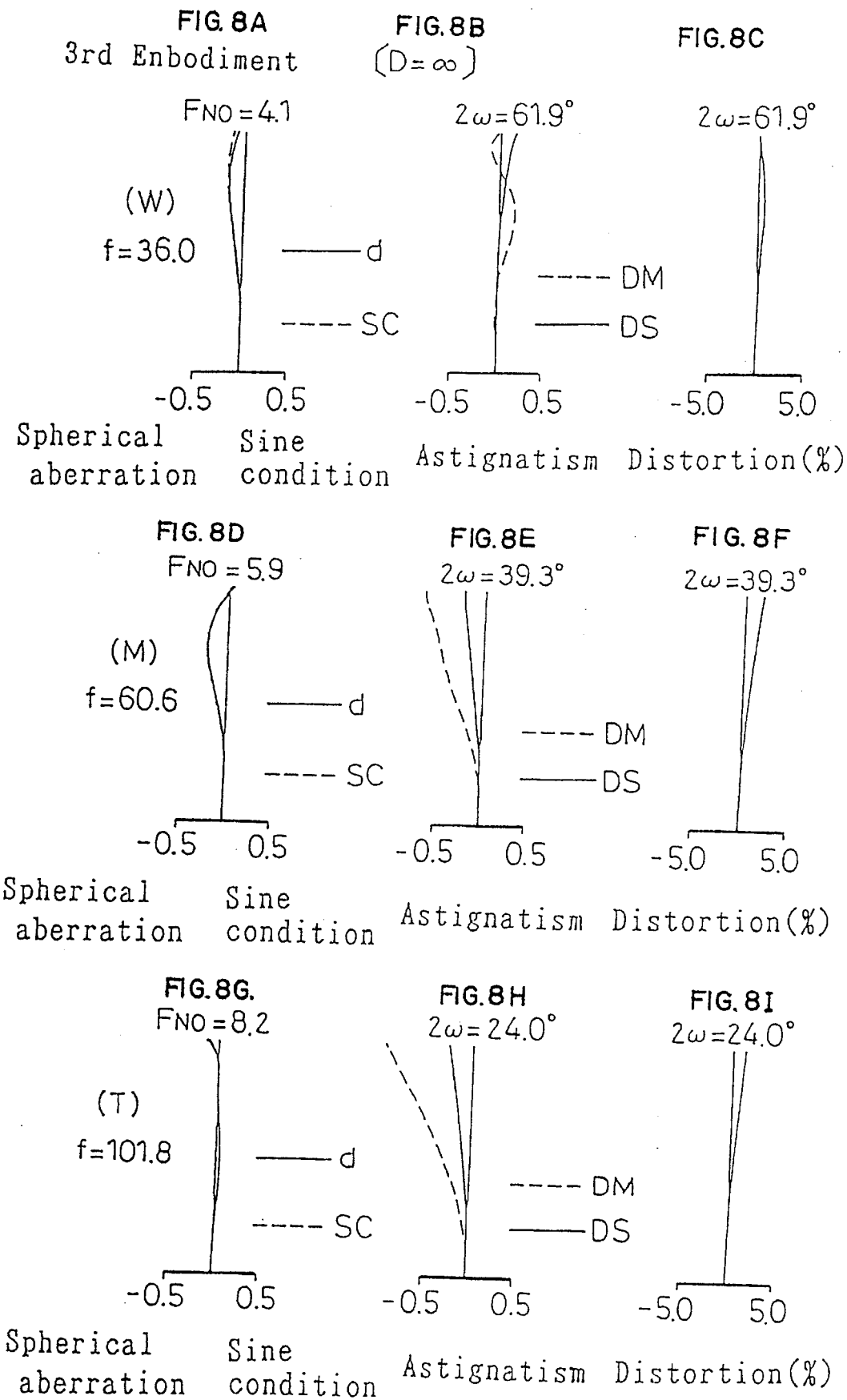

3rd Embodiment
FNO=4.1
(W)
f=36.0
— d
---- SC
-0.5    0.5
Spherical   Sine
aberration  condition (D = 2.5m)
2ω=61.9°
---- DM
— DS
-0.5    0.5
Astignatism 2ω=61.9°
-5.0    5.0
Distortion(%)

FNO=5.9
(M)
f=60.6
— d
---- SC
-0.5    0.5
Spherical   Sine
aberration  condition 2ω=39.3°
---- DM
— DS
-0.5    0.5
Astignatism 2ω=39.3°
-5.0    5.0
Distortion(%)

FNO=8.2
(T)
f=101.8
— d
---- SC
-0.5    0.5
Spherical   Sine
aberration  condition 2ω=24.0°
---- DM
— DS
-0.5    0.5
Astignatism 2ω=24.0°
-5.0    5.0
Distortion(%)

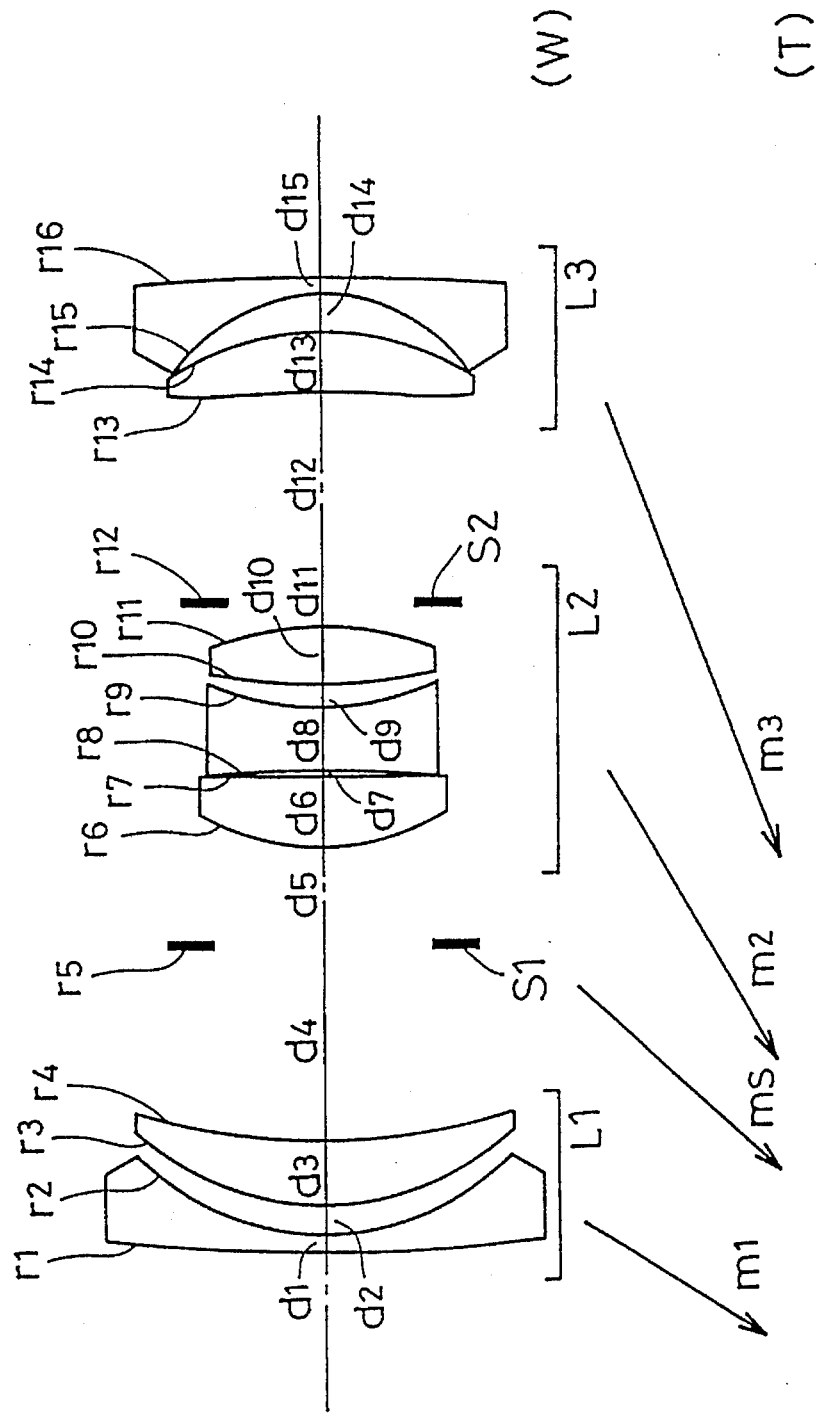

FIG. 12A
4th Enbodiment
FNO =4.1
FIG. 12B
[D=∞]
2ω=61.9°
FIG. 12C
2ω=61.9°
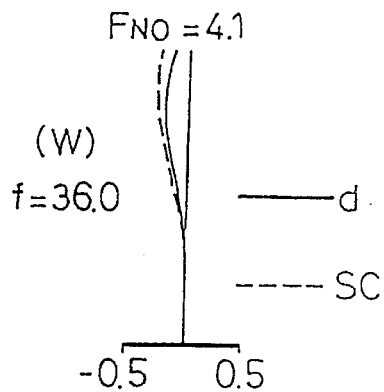
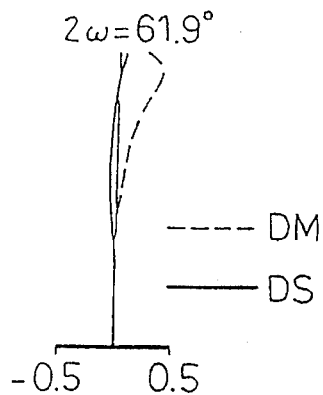
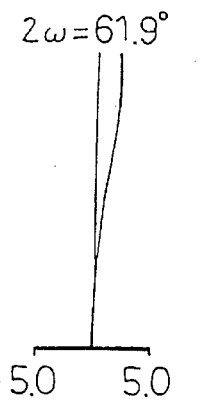
(W)
f=36.0
—— d
----- SC
----- DM
—— DS
-0.5  0.5      -0.5  0.5      -5.0  5.0
Spherical  Sine
aberration condition  Astignatism  Distortion(%)
FIG. 12D
FNO =6.1
FIG. 12E
2ω=39.3°
FIG. 12F
2ω=39.3°
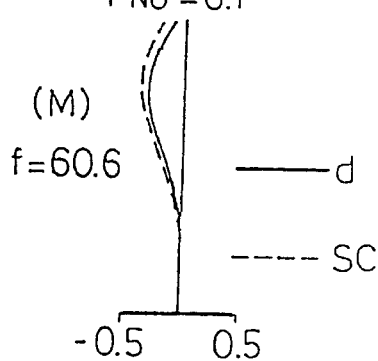
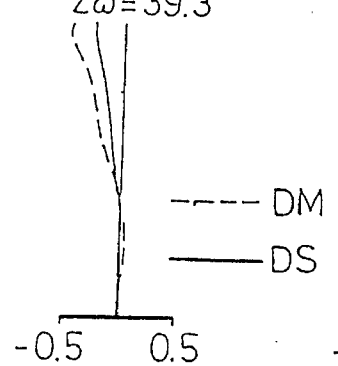
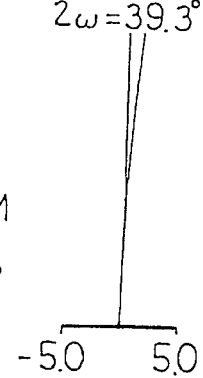
(M)
f=60.6
—— d
----- SC
----- DM
—— DS
-0.5  0.5      -0.5  0.5      -5.0  5.0
Spherical  Sine
aberration condition  Astignatism  Distortion(%)
FIG. 12G
FNO =8.2
FIG. 12H
2ω=24.0°
FIG. 12I
2ω=24.0°
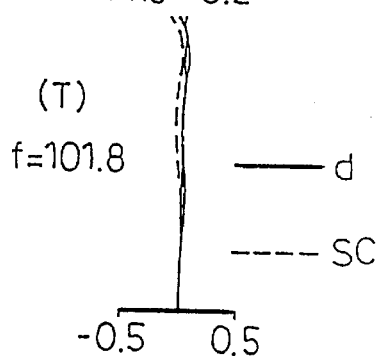
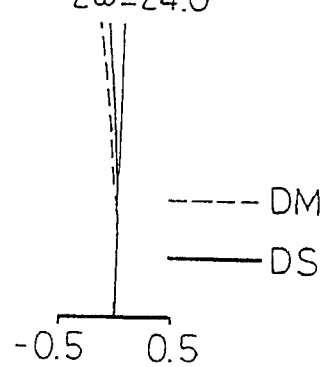
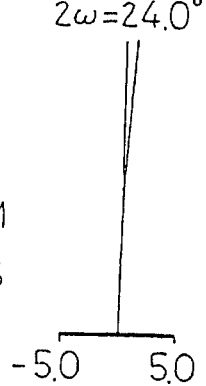
(T)
f=101.8
—— d
----- SC
----- DM
—— DS
-0.5  0.5      -0.5  0.5      -5.0  5.0
Spherical  Sine
aberration condition  Astignatism  Distortion(%)

4th Enbodiment
FNO=4.1
(W)
f=36.0

—— d
---- SC

-0.5　0.5

Spherical　Sine
aberration　condition (D=2.0m)
2ω=61.9°

---- DM
—— DS

-0.5　0.5

Astignatism

2ω=61.9°

-5.0　5.0

Distortion(%)

FNO=6.1
(M)
f=60.6

—— d
---- SC

-0.5　0.5

Spherical　Sine
aberration　condition

2ω=39.3°

---- DM
—— DS

-0.5　0.5

Astignatism

2ω=39.3°

-5.0　5.0

Distortion(%)

FNO=8.2
(T)
f=101.8

—— d
---- SC

-0.5　0.5

Spherical　Sine
aberration　condition

2ω=24.0°

---- DM
—— DS

-0.5　0.5

Astignatism

2ω=24.0°

-5.0　5.0

Distortion(%)

FIG. 14A
4th Enbodiment
(W)
f=36.0
D=0.5m
F$_{NO}$=4.1
— d
---- SC
Spherical aberration / Sine condition FIG. 14B
(D=0.5~0.8~1.1m)
2ω=61.9°
---- DM
— DS
Astignatism FIG. 14C
2ω=61.9°
Distortion(%)

FIG. 14D
(M)
f=60.6
D=0.8m
F$_{NO}$=6.1
— d
---- SC
Spherical aberration / Sine condition FIG. 14E
2ω=39.3°
---- DM
— DS
Astignatism FIG. 14F
2ω=39.3°
Distortion(%)

FIG. 14G
(T)
f=101.8
D=1.1m
F$_{NO}$=8.2
— d
---- SC
Spherical aberration / Sine condition FIG. 14H
2ω=24.0°
---- DM
— DS
Astignatism FIG. 14I
2ω=24.0°
Distortion(%)

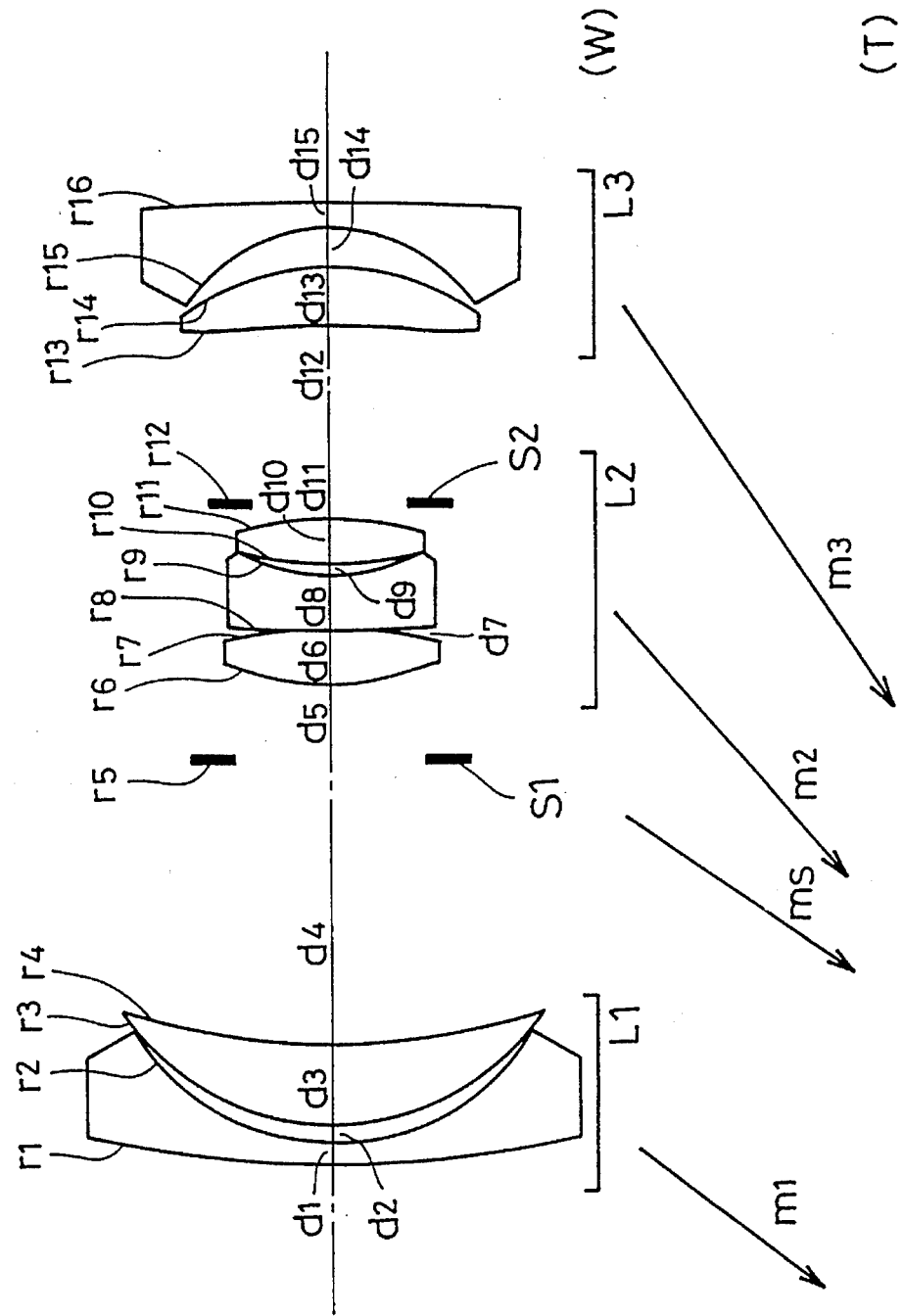

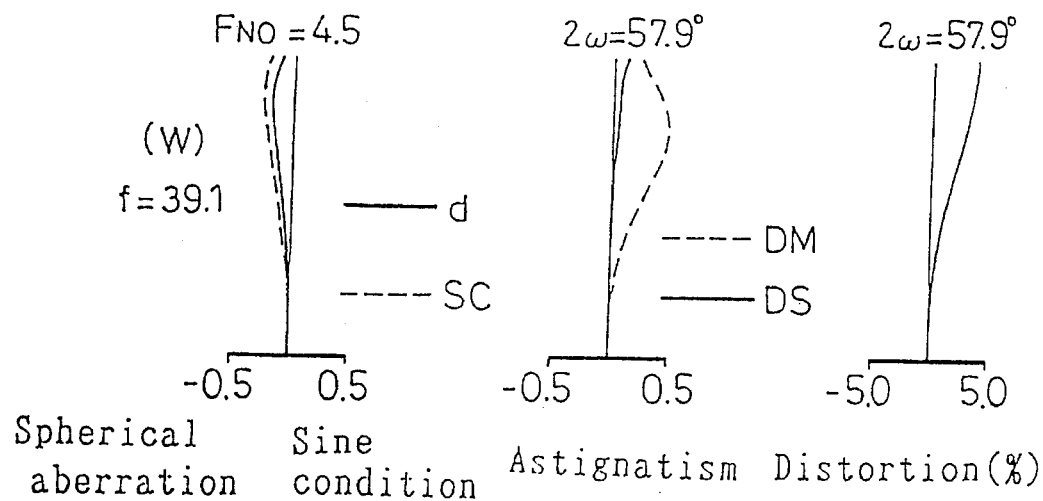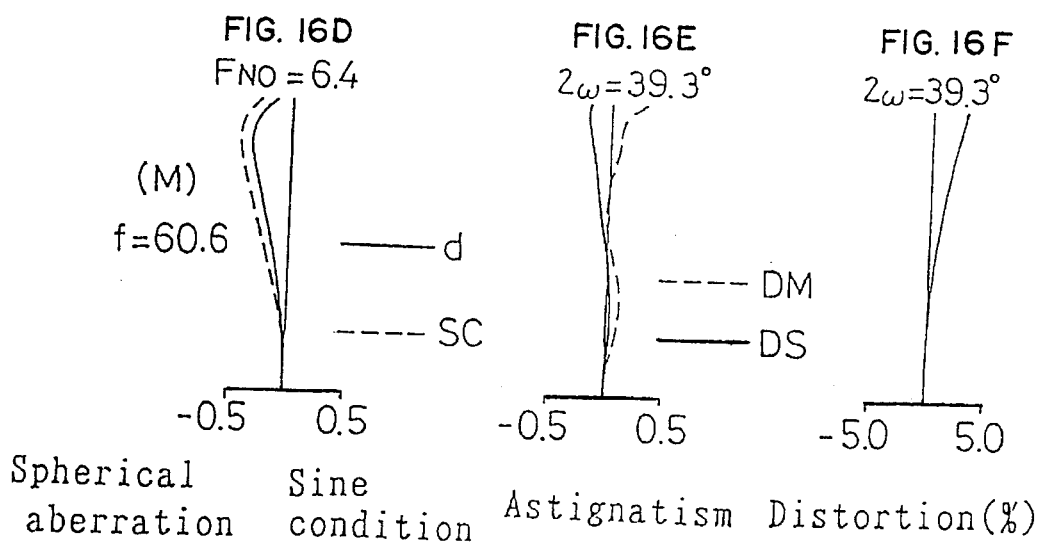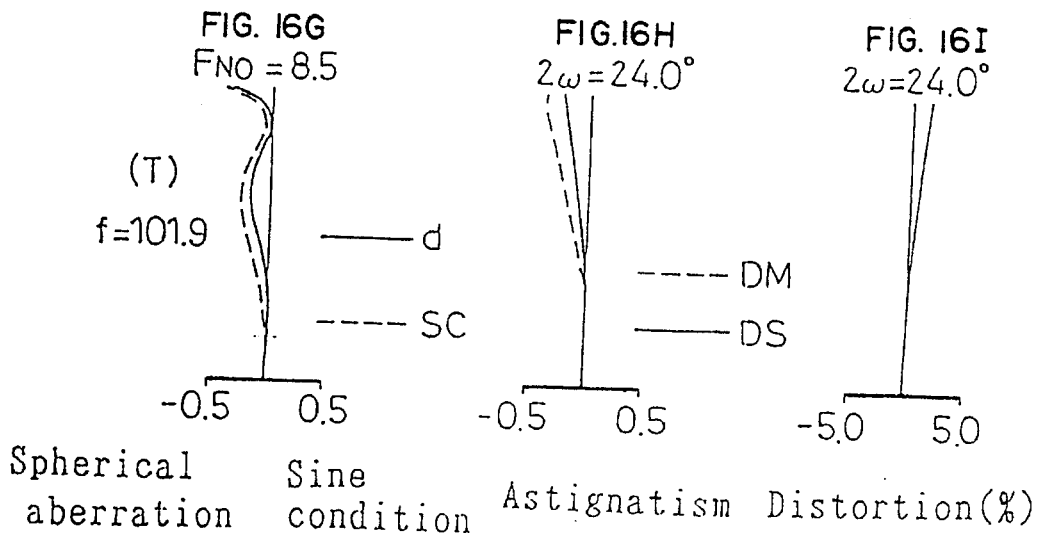
FIG. 16A 5th Embodiment — FNO=4.5, (W) f=39.1, Spherical aberration / Sine condition
FIG. 16B — 2ω=57.9°, Astigmatism (DM, DS)
FIG. 16C — 2ω=57.9°, Distortion (%)
FIG. 16D — FNO=6.4, (M) f=60.6, Spherical aberration / Sine condition
FIG. 16E — 2ω=39.3°, Astigmatism (DM, DS)
FIG. 16F — 2ω=39.3°, Distortion (%)
FIG. 16G — FNO=8.5, (T) f=101.9, Spherical aberration / Sine condition
FIG. 16H — 2ω=24.0°, Astigmatism (DM, DS)
FIG. 16I — 2ω=24.0°, Distortion (%)

6th Enbodiment

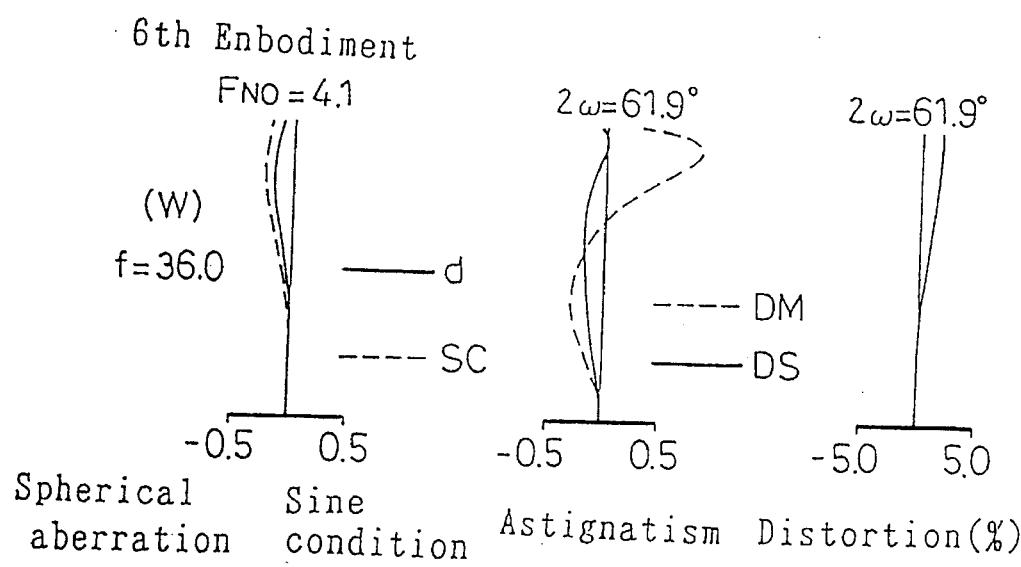
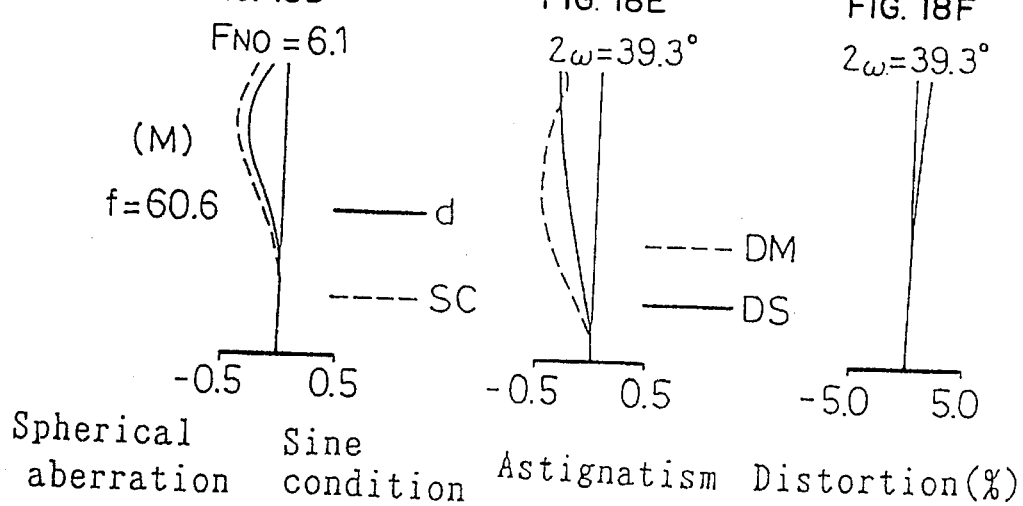
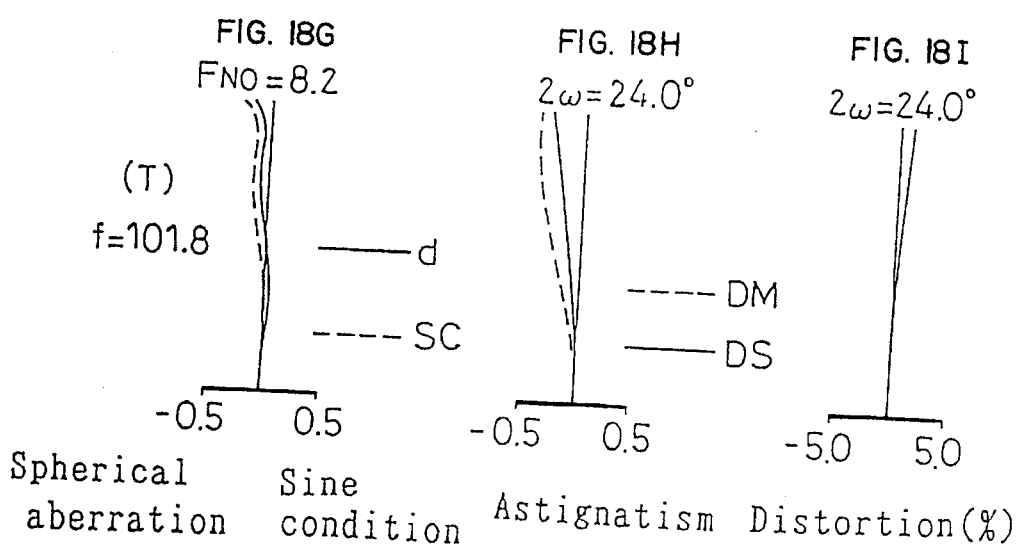

7th Enbodiment

7th Enbodiment
FNO=4.1

(W)
f=28.8

— d
---- SC

-0.5  0.5
Spherical    Sine
aberration   condition (D=∞)
2ω=73.7°

---- DM
— DS

-0.5  0.5
Astignatism

2ω=73.7°

-5.0  5.0
Distortion(%)

FNO=6.1

(M)
f=54.2

— d
---- SC

-0.5  0.5
Spherical    Sine
aberration   condition

2ω=43.5°

---- DM
— DS

-0.5  0.5
Astignatism

2ω=43.5°

-5.0  5.0
Distortion(%)

FNO=8.2

(T)
f=101.9

— d
---- SC

-0.5  0.5
Spherical    Sine
aberration   condition

2ω=24.0°

---- DM
— DS

-0.5  0.5
Astignatism

2ω=24.0°

-5.0  5.0
Distortion(%)

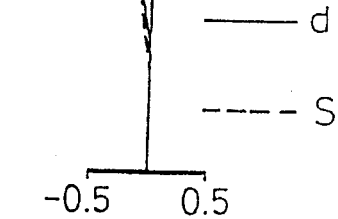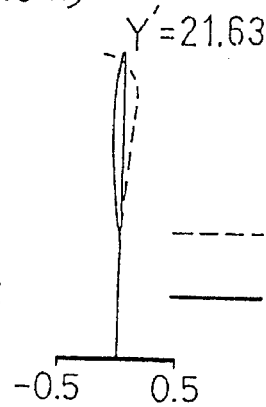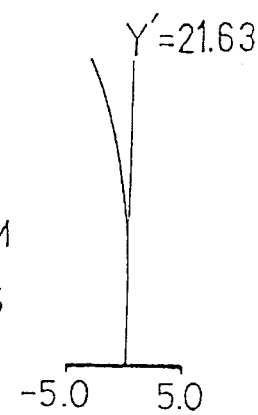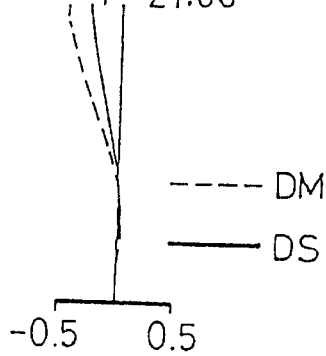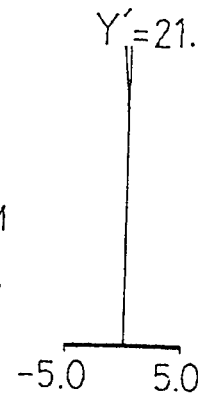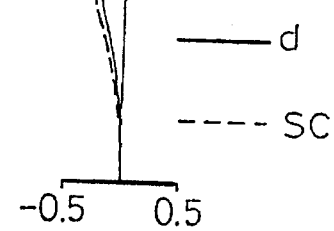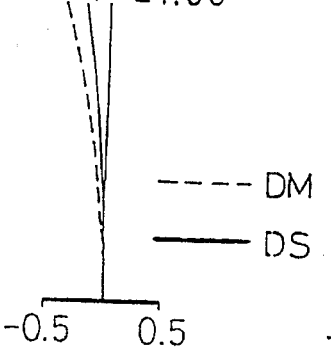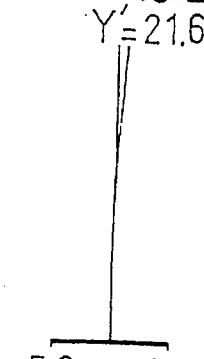

FIG.22A  FIG.22B  FIG.22C

7th Enbodiment  (D=0.7~0.9~1.2m)

(W)
f=28.8
D=0.7m $F_{NO}=4.1$  $Y'=21.63$  $Y'=21.63$

— d
---- SC

---- DM
— DS

-0.5  0.5   -0.5  0.5   -5.0  5.0

Spherical   Sine
aberration  condition   Astignatism  Distortion(%)

Spherical   Sine
aberration  condition   Astignatism  Distortion(%)

Spherical   Sine
aberration  condition   Astignatism  Distortion(%)

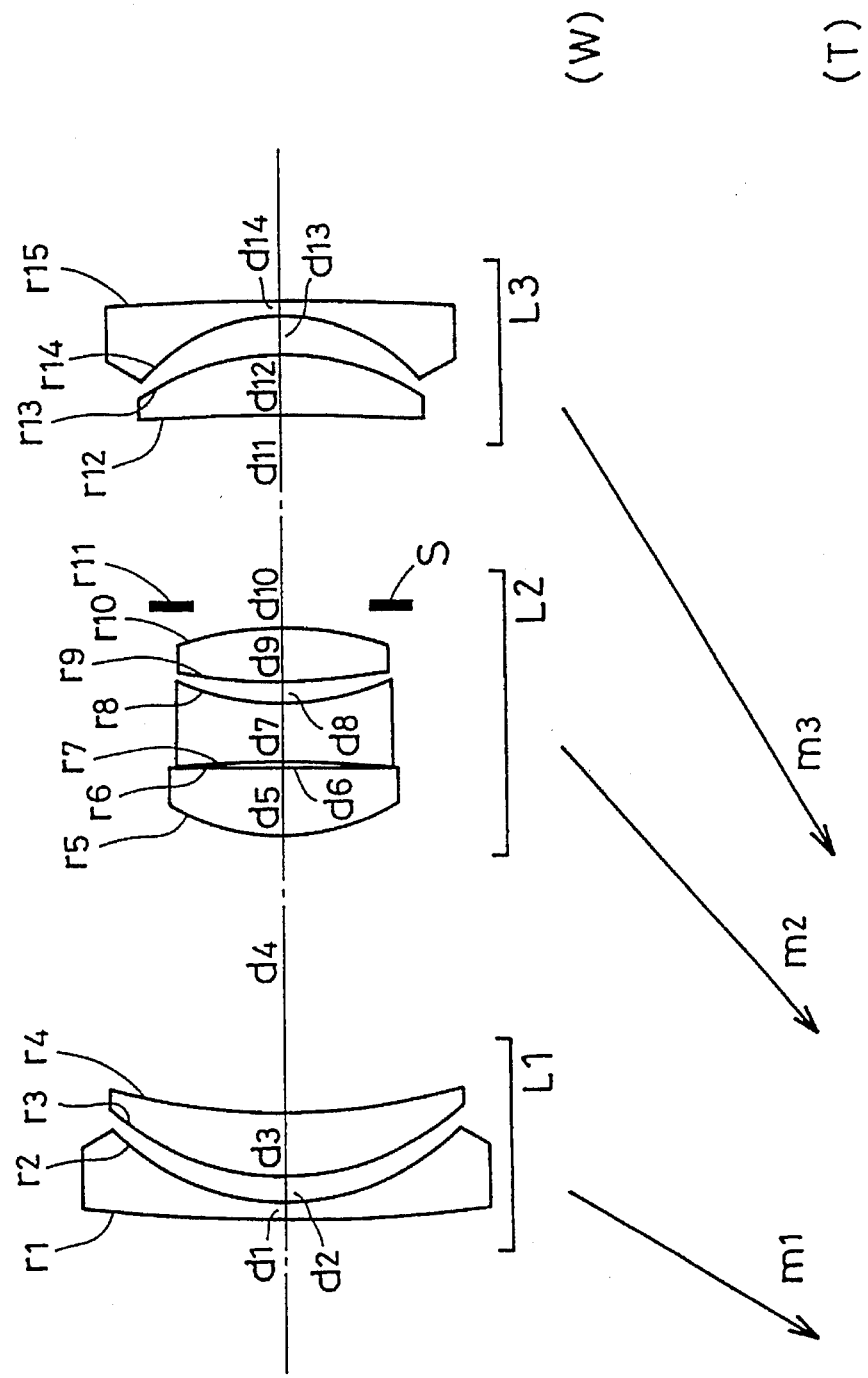

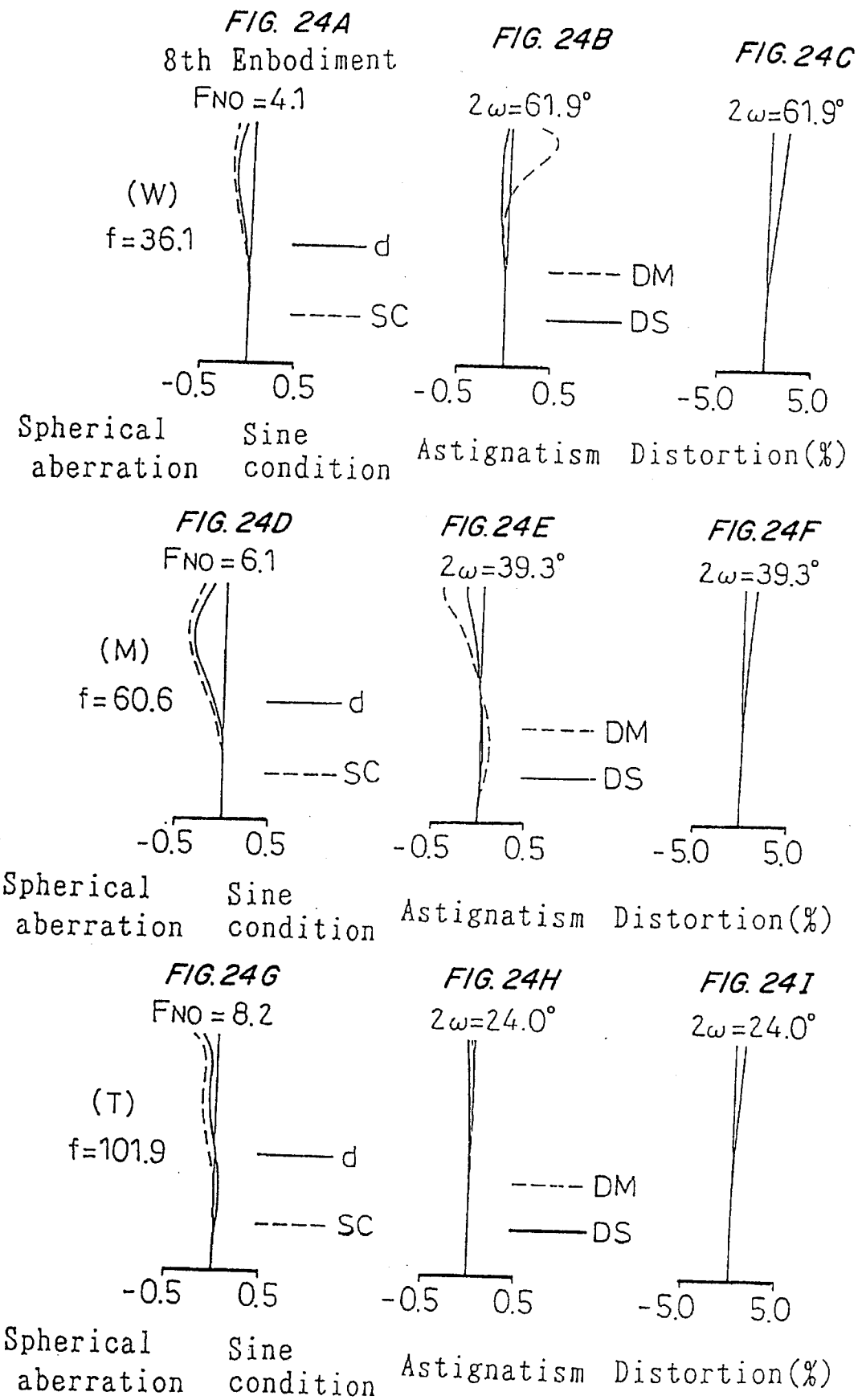

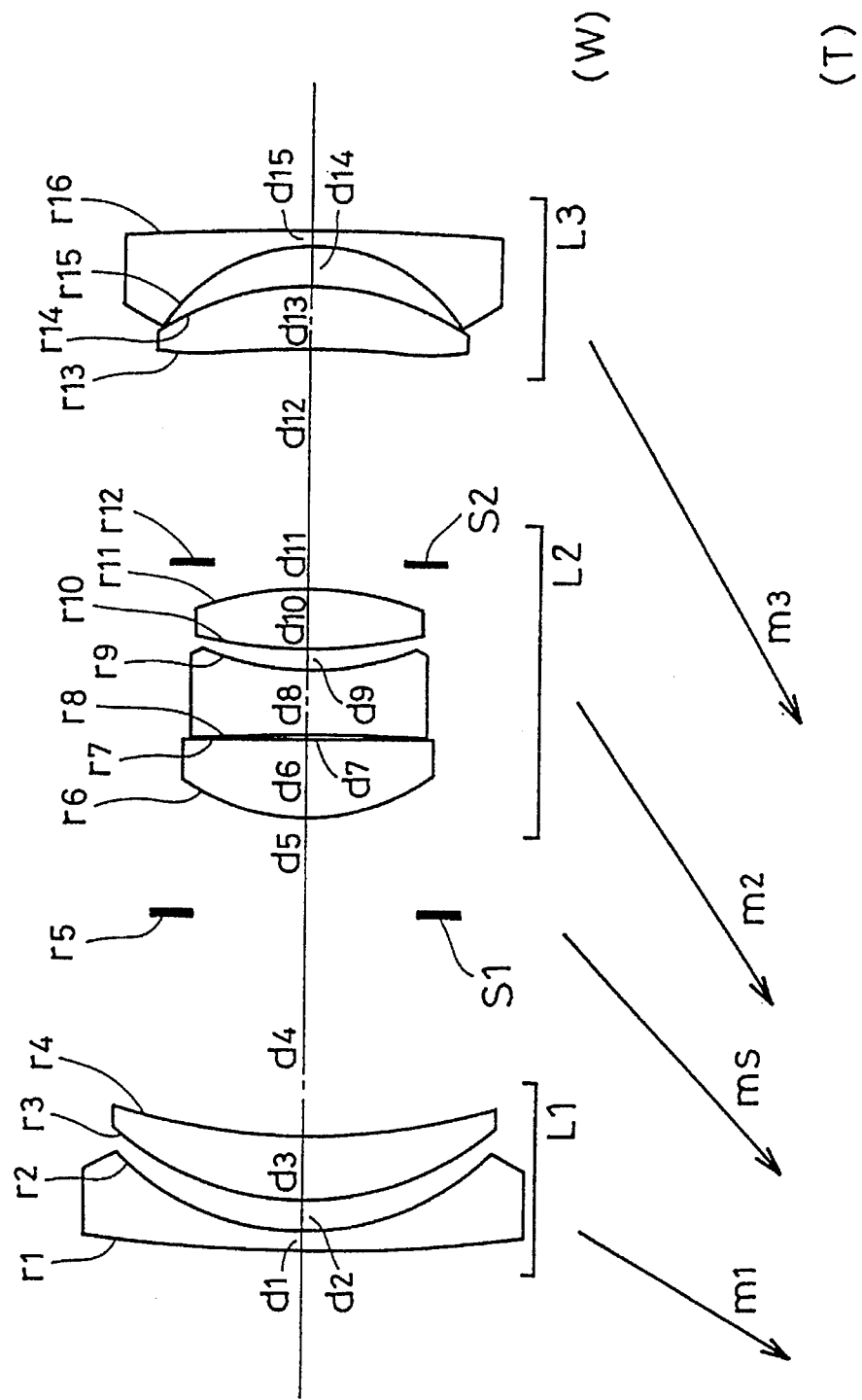

9th Embodiment
F$_{NO}$ = 4.1

(W)
f=40.2

— d
---- SC

-0.5  0.5

Spherical    Sine
aberration  condition

2ω=56.6°

---- DM
— DS

-0.5  0.5

Astigmatism

2ω=56.6°

-5.0  5.0

Distortion(%)

F$_{NO}$ = 6.1

(M)
f=68.4

— d
---- SC

-0.5  0.5

Spherical    Sine
aberration  condition

2ω=35.1°

---- DM
— DS

-0.5  0.5

Astigmatism

2ω=35.1°

-5.0  5.0

Distortion(%)

F$_{NO}$ = 8.2

(T)
f=116.4

— d
---- SC

-0.5  0.5

Spherical    Sine
aberration  condition

2ω=21.1°

---- DM
— DS

-0.5  0.5

Astigmatism

2ω=21.1°

-5.0  5.0

Distortion(%)

10th Enbodiment

FIG. 28A
10th Embodiment
F$_{NO}$= 4.1
(W)
f=28.8
— d
---- SC
Spherical aberration   Sine condition
FIG. 28B
2ω=61.9°
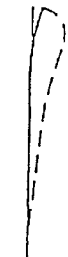
---- DM
— DS
Astigmatism
FIG. 28C
2ω=61.9°
-5.0    5.0
Distortion(%)
FIG. 28D
F$_{NO}$=6.1
(M)
f=54.2
— d
---- SC
Spherical aberration   Sine condition
FIG. 28E
2ω=39.3°
---- DM
— DS
Astigmatism
FIG. 28F
2ω=39.3°
-5.0    5.0
Distortion(%)
FIG. 28G
F$_{NO}$=8.2
(T)
f=101.8
— d
---- SC
Spherical aberration   Sine condition
FIG. 28H
2ω=24.0°
---- DM
— DS
Astigmatism
FIG. 28I
2ω=24.0°
-5.0    5.0
Distortion(%)

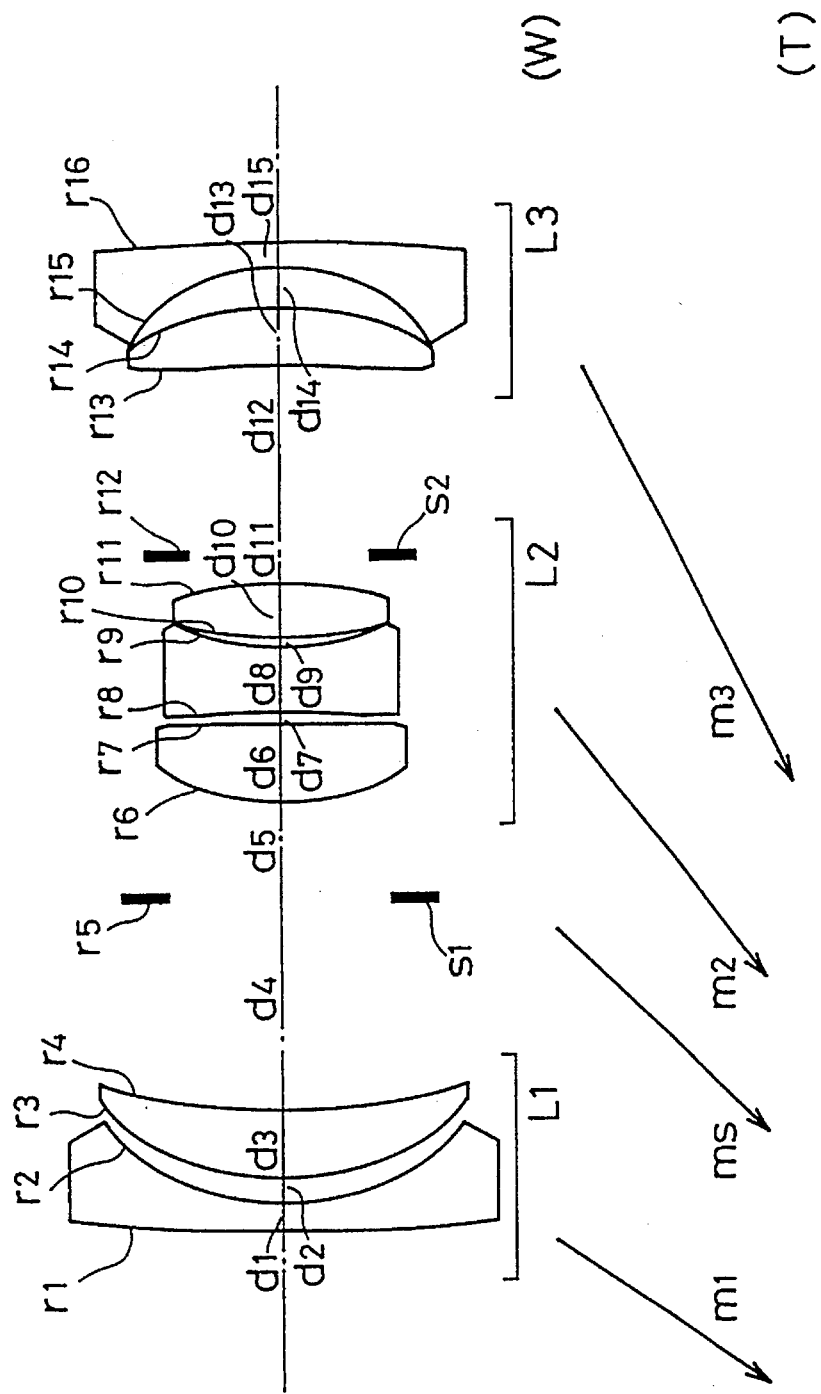

11th Embodiment
FNO=4.1
(W)
f=36.0

2ω=61.9°

2ω=61.9°

Spherical aberration   Sine condition   Astigmatism   Distortion(%)

FNO=6.1
(M)
f=60.6

2ω=39.3°

2ω=39.3°

Spherical aberration   Sine condition   Astigmatism   Distortion(%)

FNO=8.2
(T)
f=101.8

2ω=24.0°

2ω=24.0°

Spherical aberration   Sine condition   Astigmatism   Distortion(%)

12th Enbodiment

FIG. 32A
12th Enbodiment
FNO=4.1
(W)
f=36.0
— d
---- SC
-0.5  0.5
Spherical   Sine
aberration  condition
FIG. 32B
2ω=61.9°
---- DM
— DS
-0.5  0.5
Astignatism
FIG. 32C
2ω=61.9°
-5.0  5.0
Distortion(%)
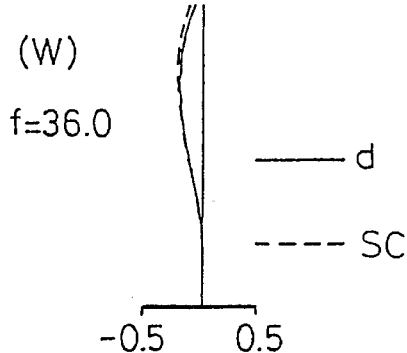
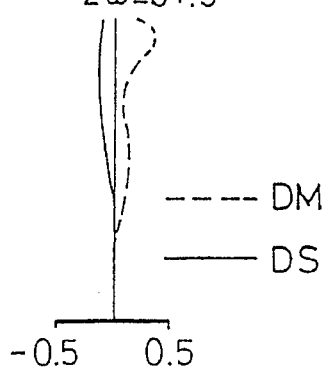
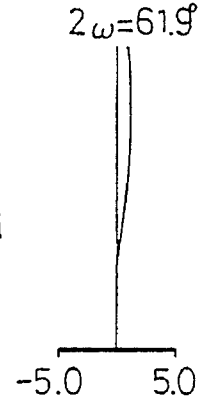
FIG. 32D
FNO=6.1
(M)
f=60.6
— d
---- SC
-0.5  0.5
Spherical   Sine
aberration  condition
FIG. 32E
2ω=39.3°
---- DM
— DS
-0.5  0.5
Astignatism
FIG. 32F
2ω=39.3°
-5.0  5.0
Distortion(%)
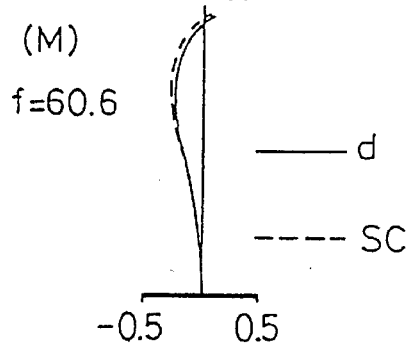
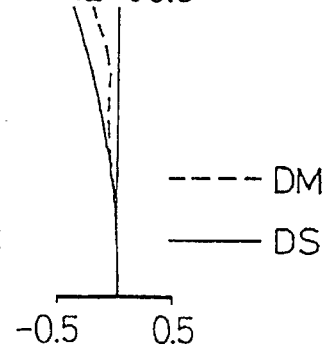
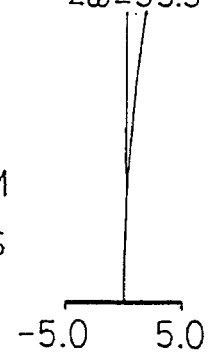
FIG. 32G
FNO=8.2
(T)
f=101.8
— d
---- SC
-0.5  0.5
Spherical   Sine
aberration  condition
FIG. 32H
2ω=24.0°
---- DM
— DS
-0.5  0.5
Astignatism
FIG. 32I
2ω=24.0°
-5.0  5.0
Distortion(%)
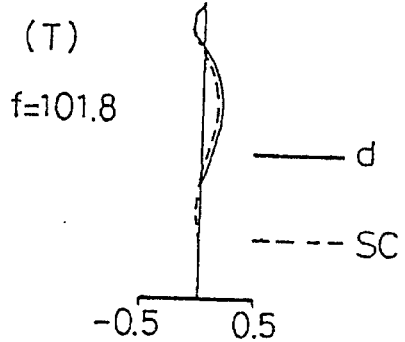
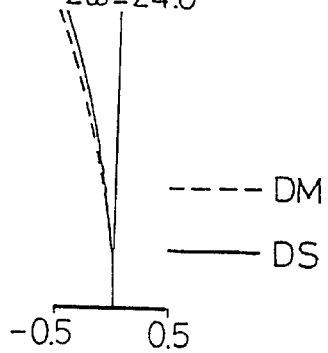
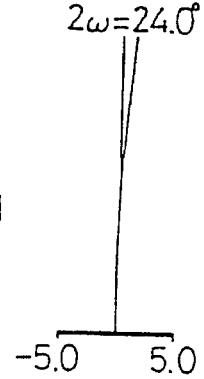

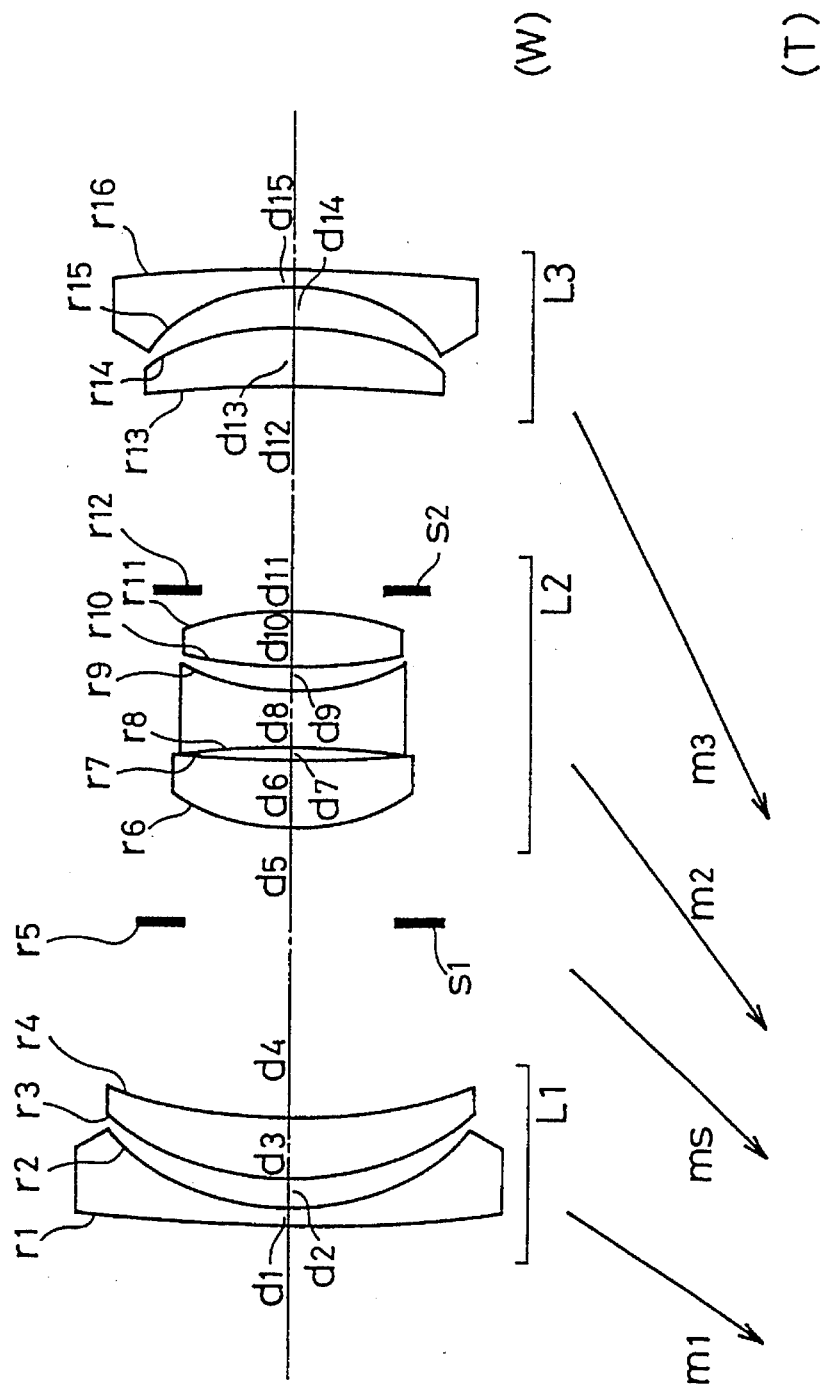

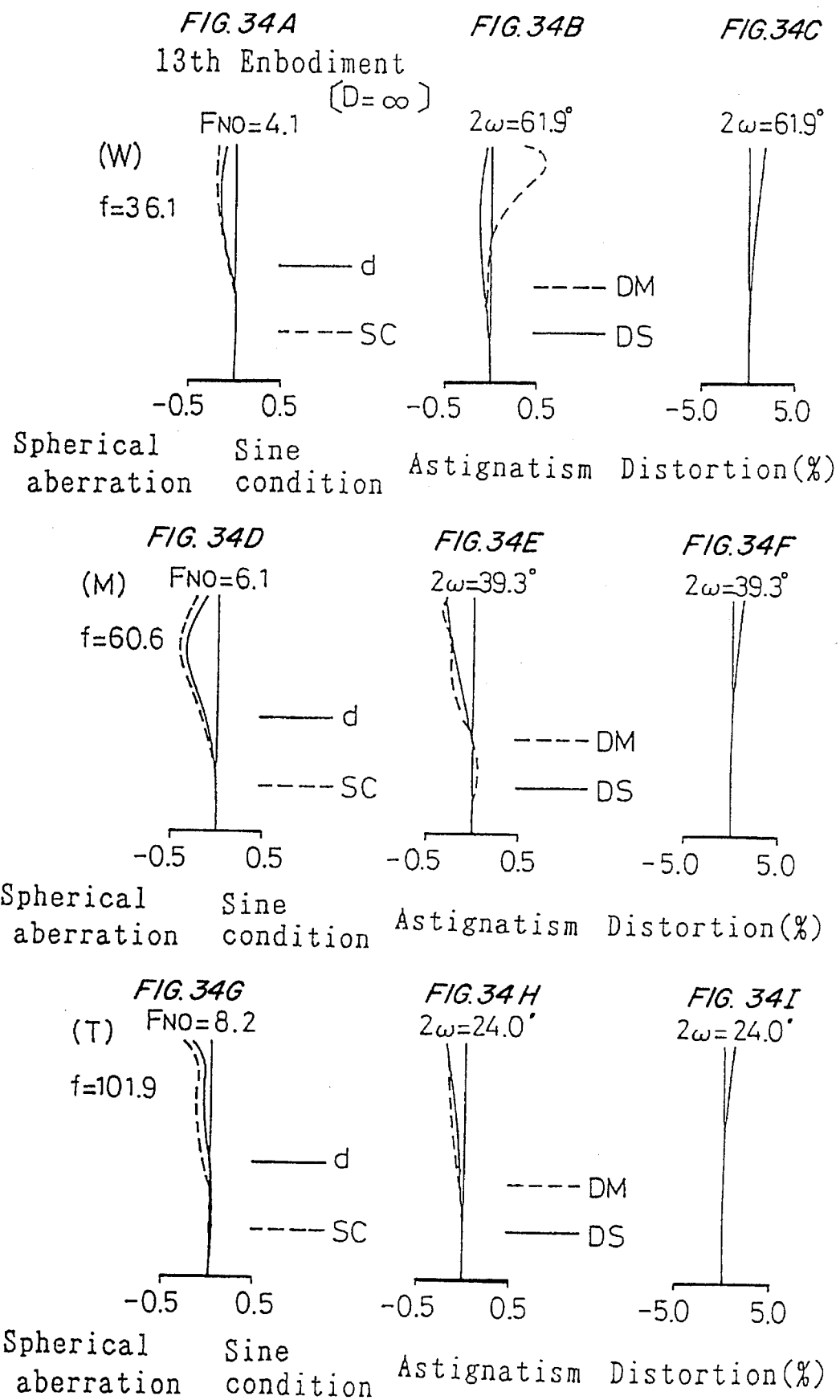

13th Embodiment (D=2m)
FNO=4.1
(W)
f=36.1

—— d
---- SC

Spherical aberration    Sine condition

Y'=21.63

---- DM
—— DS

Astigmatism

Y'=21.63

Distortion(%)

FNO=6.1
(M)
f=60.6

—— d
---- SC

Spherical aberration    Sine condition

Y'=21.63

---- DM
—— DS

Astigmatism

Y'=21.63

Distortion(%)

FNO=8.2
(T)
f=101.9

—— d
---- SC

Spherical aberration    Sine condition

Y'=21.63

---- DM
—— DS

Astigmatism

Y'=21.63

Distortion(%)

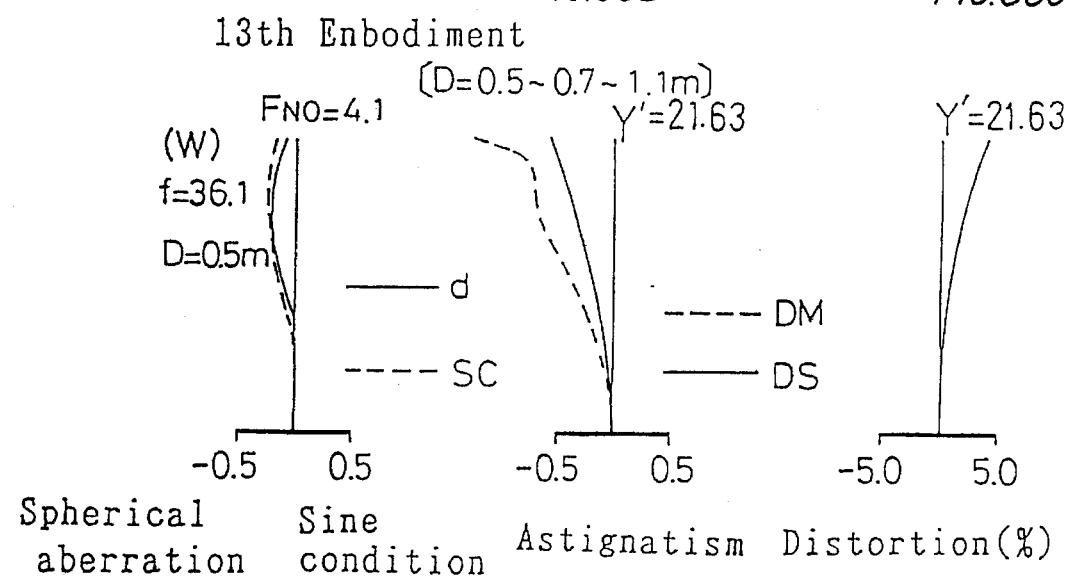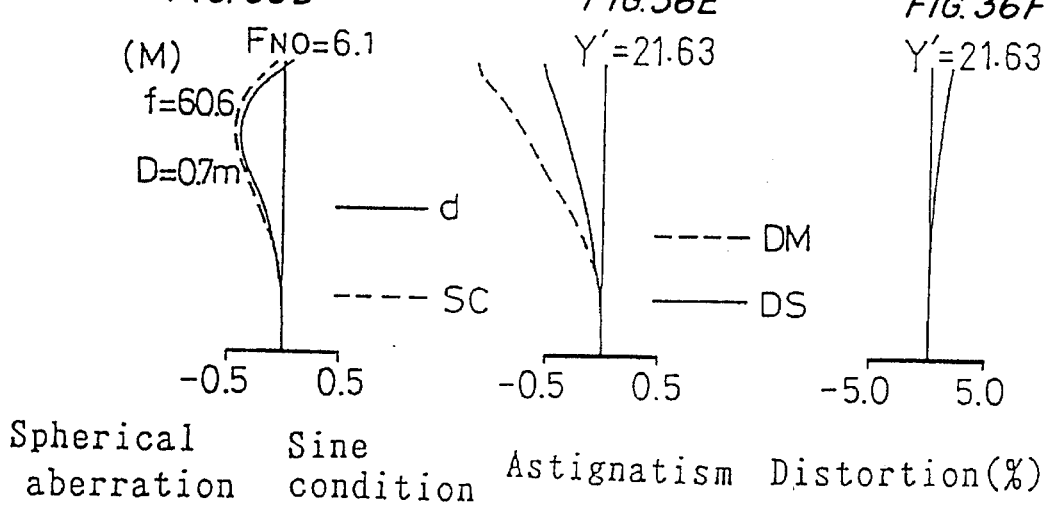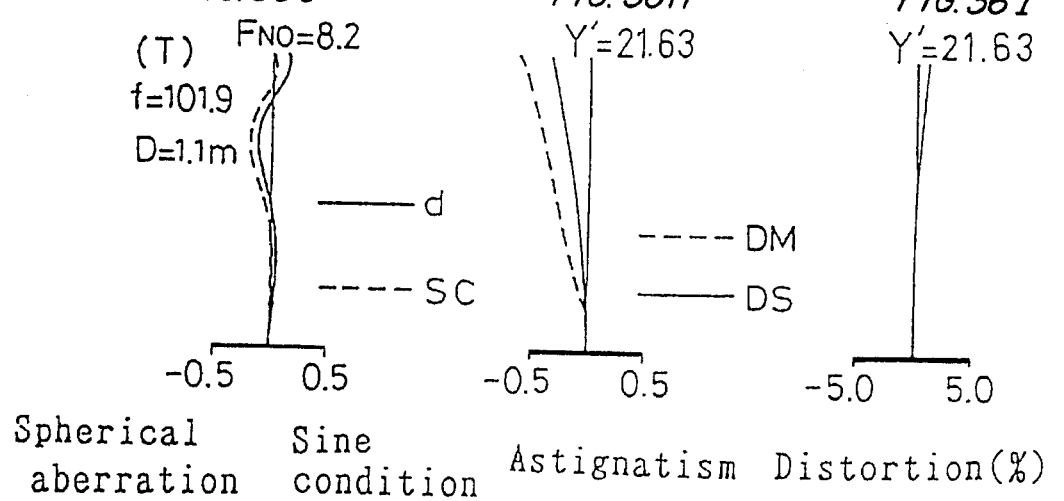

ZOOM LENS SYSTEM

BACKGROUND OF THE INVENTION

1. Field of the Invention

The present invention relates to a zoom lens system, and more specifically, to a zoom lens system for use in a lens shutter camera incorporating a zoom lens system.

2. Description of the Prior Art

Presently, a compacter, lower-cost taking lens system is demanded to realize a compacter, lower-cost lens shutter camera incorporating a zoom lens system. On the other hand, a zoom lens system having a large zoom ratio is demanded.

In order to reduce the size of a zoom lens system including movements of lens units during zooming while maintaining a sufficient zoom ratio, it is necessary to increase the refractive power of each unit.

However, increasing the refractive power while maintaining a sufficient performance results in an increase in the number of lens elements. On the other hand, in order to reduce the cost, it is effective to reduce the number of lens elements.

As described above, reducing the size and reducing the cost while maintaining a sufficient zoom ratio conflict with each other.

As a zoom lens system which is intended to realize a smaller size and a higher zoom ratio while maintaining a sufficient optical performance, zoom lens systems have been proposed (in Japanese Laid-open Patent Application No. S64-72114, Japanese Laid-open Patent Application No. H2-63007, Japanese Laid-open Patent Application No. H2-181715 and Japanese Laid-open Patent Application No. H2-201409) which comprise from the object side a first lens unit having a negative refractive power, a second lens unit having a positive refractive power and a third lens unit having a negative refractive power and where zooming is performed by moving each lens unit.

These zoom lens systems, however, do not meet the present demand for a compacter, lower-cost zoom lens system. That is, in the zoom lens systems, it is difficult to reduce the number of lens elements and hold down the cost while maintaining a sufficient optical performance, and the size is not sufficiently reduced.

Generally, lens shutter cameras incorporating a zoom lens system employ a front focusing method where a first lens unit arranged on the most object side is moved during focusing. This method, however, has a defect that it is necessary to increase the effective diameter (front lens diameter) of the first lens unit in order to secure a sufficient peripheral illumination in photographing a subject located close to the camera. As a result, the size of the entire camera system and a load on a motor for moving the lens unit increase.

Another method has been suggested where focusing is performed by means of a lens unit other than the first lens unit. For example, Japanese Laid-open Patent Application No. H2-201409 discloses a zoom lens system comprising from the object side a first lens unit having a negative refractive power, a second lens unit having a positive refractive power and a third lens unit having a negative refractive power. Focusing is performed by moving the third lens unit.

However, this method where focusing is performed by mean of the third lens unit has a defect that it is necessary to increase the effective diameter of the third lens unit similarly to the previously-mentioned method where focusing is performed by mean of the first lens unit. In this case, the size of the entire camera system also increases.

SUMMARY OF THE INVENTION

An object of the present invention is to provide a zoom lens system suitable for a lens shutter camera, having a high optical performance in the entire zoom range of zoom ratios of approximately from 2 to 4× and wherein a compactness and a low cost are realized with fewer lens elements.

Another object of the present invention is to provide a zoom lens system having a high optical performance with respect to a subject located between infinity and a nearest position in the entire zoom range of zoom ratios of approximately from 2 to 4× and wherein a compactness is realized by performing focusing by means of a lens unit other than a first lens unit which lens unit has the smallest diameter.

BRIEF DESCRIPTION OF THE DRAWINGS

These and other objects and features of this invention will become clear from the following description, taken in conjunction with the preferred embodiments with reference to the accompanied drawings in which:

FIGS. 4A, through 4I are graphic representations of aberrations of the second embodiment with respect to an infinity subject;

FIGS. 5A, through 5I are graphic representations of aberrations of the second embodiment when an object distance D is 2.5 m;

FIGS. 6A, through 6I are graphic representations of aberrations of the second embodiment when an object distance D is 0.6 to 0.8 to 1.0 m;

FIG. 7 is a lens arrangement of a third embodiment of the present invention;

FIGS. 8A, through 8I are graphic representations of aberrations of the third embodiment with respect to an infinity subject;

FIG. 11 is a lens arrangement of a fourth embodiment of the present invention;

FIGS. 12A, through 12I are graphic representations of aberrations of the fourth embodiment with respect to an infinity subject;

FIGS. 14A, through 14I are graphic representations of aberrations of the fourth embodiment when an object distance D is 0.5 to 0.8 to 1.0 m;

FIG. 15 is a lens arrangement of a fifth embodiment of the present invention;

FIGS. 16A, through 16I are graphic representations of aberrations of the fifth embodiment of the present invention;

FIGS. 18A, through 18I are graphic representations of aberrations of the sixth embodiment of the present invention;

FIGS. 21A, through 21I are graphic representations of aberrations of the seventh embodiment when an object distanced is 2.0 m;

FIGS. 22A, through 22I are graphic representations of aberrations of the seventh embodiment when an object distance D is 0.7 to 0.9 to 1.2 m;

FIG. 23 is a lens arrangement of an eighth embodiment of the present invention;

FIGS. 24A, through 24I are graphic representations of aberrations of the eighth embodiment of the present invention;

FIG. 25 is a lens arrangement of a ninth embodiment of the present invention;

FIGS. 28A, through 28I are graphic representations of aberrations of the tenth embodiment of the present invention;

FIG. 29 shows a lens arrangement of an eleventh embodiment of the present invention;

FIGS. 32A, through 32I are graphic representations of aberrations of the twelfth embodiment of the present invention;

FIG. 33 is a lens arrangement of a thirteenth embodiment of the present invention;

FIGS. 34A, through 33I are graphic representations of aberrations of the thirteenth embodiment with respect to an infinity subject;

FIGS. 36A, through 36I are graphic representations of aberrations of the thirteenth embodiment when an object distance D is 0.5 to 0.7 to 1.1 m.

DESCRIPTION OF THE PREFERRED EMBODIMENTS

Figure 1:
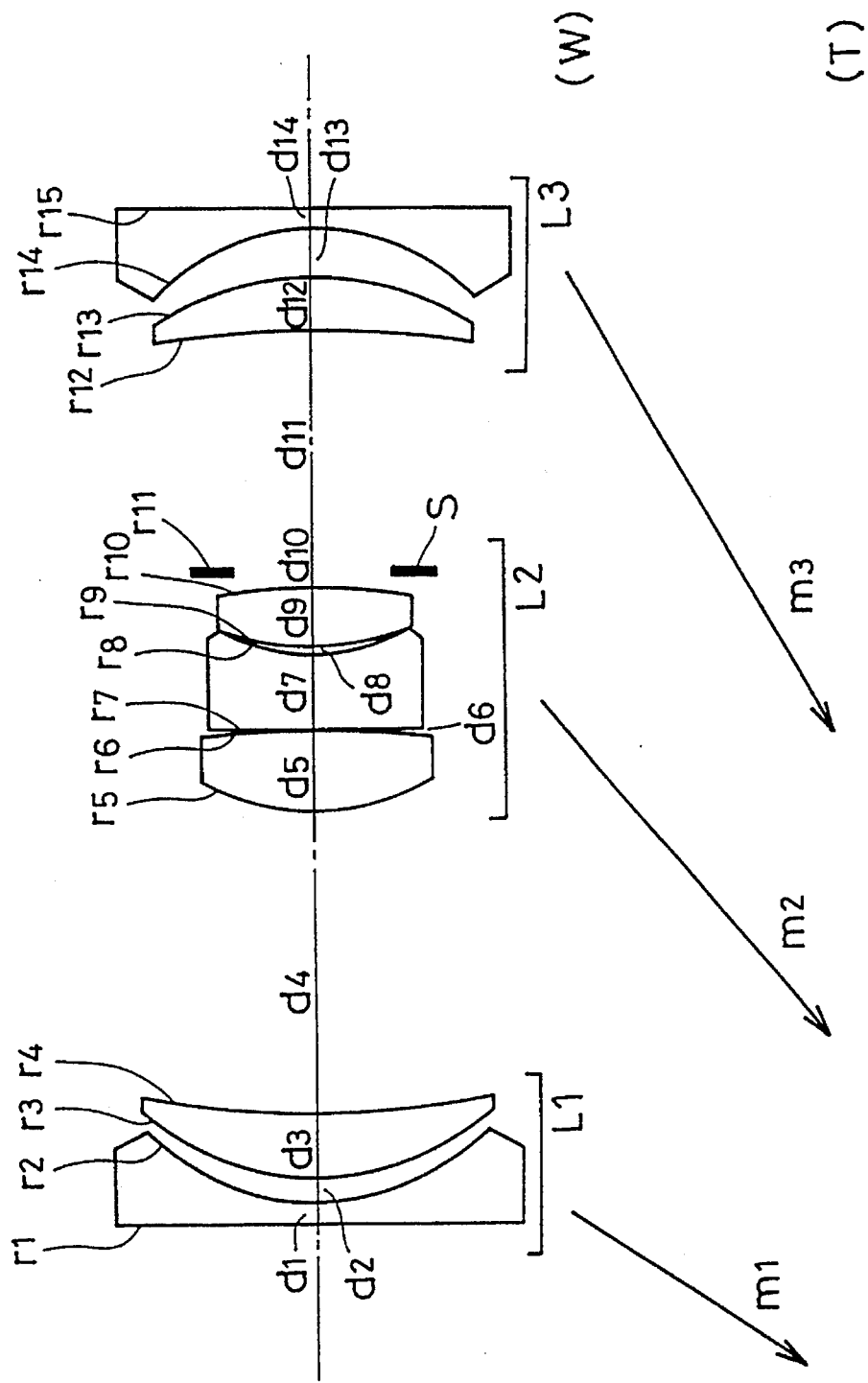
FIG. 1 is a lens arrangement of a first embodiment of the present invention.
Figure 2A:
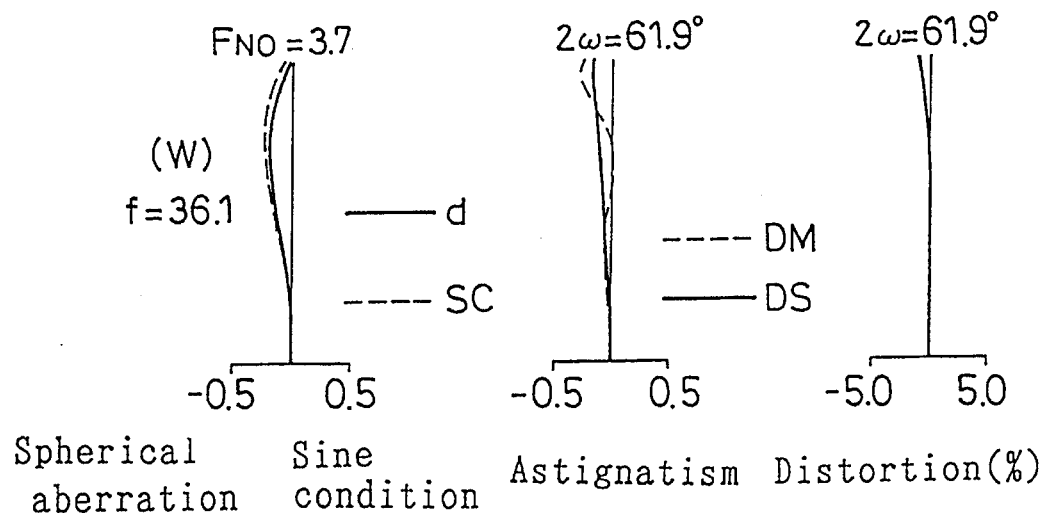
FIGS. 2A, 2B and 2C are graphic representations of aberrations of the first embodiment of the present invention.
Figure 2B:
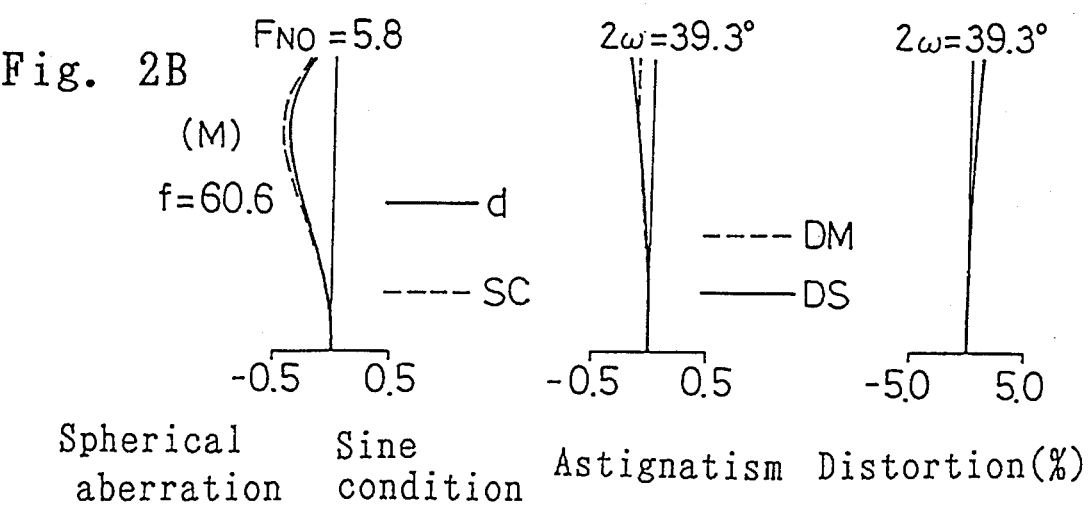
Figure 2C:
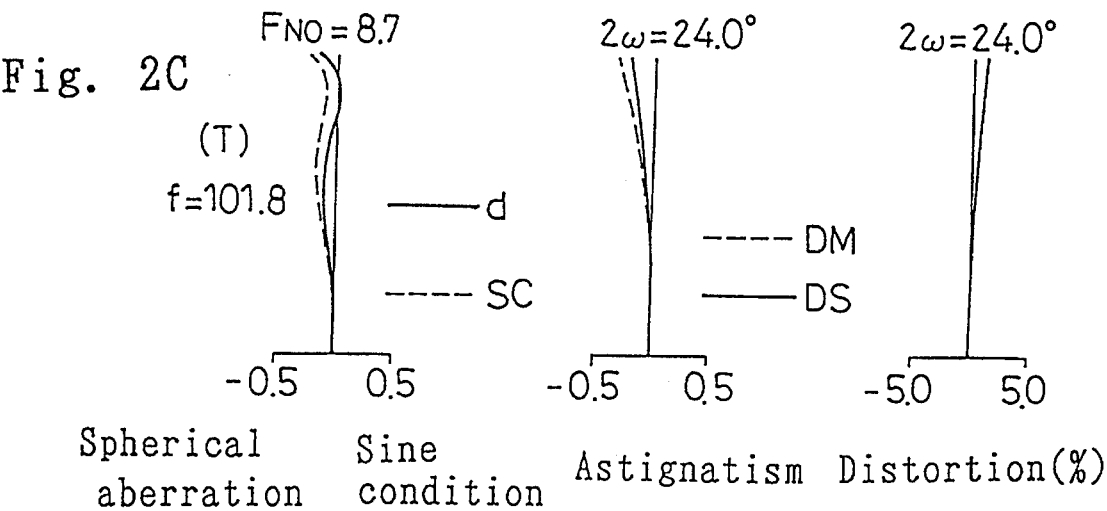

According to a first implementation of the present invention, a zoom lens system comprises from the object side a first lens unit having a negative refractive power, a second lens unit having a positive refractive power and a third lens unit having a negative refractive power. Zooming from a wide angle limit (shortest focal length condition) to a telephoto limit (longest focal length condition) is performed by moving all of the lens units while reducing the distance between the first and second lens units and the distance between the second and third lens units. The second lens unit includes three lens elements of a positive lens element, a negative lens element and a positive lens element from the object side. The following conditions (1) and (2) are fulfilled:

$$0.6 < \frac{f2}{fW} < 1.0 \tag{1}$$

$$0.2 < \frac{f2}{fT} < 0.35 \tag{2}$$

where f2 is a focal length of the second lens unit, fW is a focal length of the entire lens system at the wide angle limit, and fT is a focal length of the entire lens system at the telephoto limit.

Further, the following condition (3) is preferably fulfilled:

$$2 < \frac{fT}{fW} < 4 \tag{3}$$

In a three-group zoom lens system of a negative, positive, negative configuration, by defining the lens arrangement of the second lens unit and by moving all of the three lens units toward, for example, the object side as described above, the refractive power is symmetrically arranged in the entire lens system from the wide angle limit to the telephoto limit. As a result, distortion is excellently corrected to improve optical performance.

By fulfilling the conditions (1) and (2), more excellent optical performance is secured from the center to the periphery of the image plane in the entire focal length range. The conditions (1) and (2) define a ratio of a focal length of the second lens unit to a focal length of the entire lens system at the wide angle limit and a ratio of a focal length of a second lens unit to a focal length of the entire lens system at the telephoto limit, respectively. When the lower limits of the conditions (1) and (2) are exceeded, the refractive power of the second lens unit is too strong, so that, although it is advantageous in reducing the size of a zoom lens system, it is difficult to correct spherical aberration in the focal length range defined by the condition (3). When the upper limits of the conditions (1) and (2) are exceeded, the refractive power of the second lens unit is too weak, so that the total length of the lens system increases, which contradicts an object of the present invention.

It is preferable to provide an aspherical surface in the second lens unit. Particularly in a zoom lens system comprising from the object side a first lens unit having a negative refractive power, a second lens unit having a positive refractive power and a third lens unit having a negative refractive power wherein zooming from the wide angle limit to the telephoto limit is performed by moving all of the lens units while reducing the distance between the first and second lens units and the distance between the second and third lens units, it is effective in securing an excellent optical performance to provide an aspherical surface to the most object side surface of the second lens unit.

The aspherical surface preferably fulfills the following condition (4). When an arbitrary height y in a direction perpendicular to the optical axis is defined by $0.7Y_{max} < y < Y_{max}$ where $Y_{max}$ is a maximum effective diameter of the aspherical surface, $$-0.01 < \phi2 \cdot (N'-N) \cdot \left(\frac{d}{dy}\right) \cdot \{X(y) - XO(y)\} < 0.005 \quad (4)$$

wherein $\phi2$ is a refractive power of the second lens unit, N is a refractive index of the object side material of the aspherical surface, N' is a refractive index of the image side material of the aspherical surface, X(y) is a surface configuration of the aspherical surface, and XO(y) is a reference surface configuration of the aspherical surface. X(y) and XO(y) are defined by the following equations (A) and (B):

$$X(y) = \frac{r}{\epsilon} \cdot \left\{ 1 - \left(1 - \epsilon \cdot \frac{y^2}{r^2}\right)^{1/2} \right\} + \sum_{i \geq 2} A_i y^i \quad (A)$$

where r is a reference radius of curvature of the aspherical surface, $\epsilon$ is a conic constant, and $A_i$ is an aspherical coefficient; and $$XO(y) = \tilde{r} \cdot \left\{ 1 - \left(1 - \epsilon \cdot \frac{y^2}{\tilde{r}^2}\right)^{1/2} \right\} \quad (B)$$

where $\tilde{r}$ is a paraxial radius of curvature of the aspherical surface $$\left(\frac{1}{\tilde{r}} = \frac{1}{r} + 2A_2\right).$$

The condition (4) defines the configuration of the aspherical surface. It is a condition for correcting spherical aberration and off-axial luminance flux flare on the telephoto side. When the upper limit of the condition (4) is exceeded, a tendency for spherical aberration to incline toward the under side is remarkable in the entire focal length range and generation of off-axial luminance flux flare is remarkable on the telephoto side. When the lower limit of the condition (4) is exceeded, spherical aberration inclines toward the over side in the entire focal length range and a tendency for off-axial luminance flux flare to be overcorrected is remarkable on the telephoto side.

If a bi-aspherical lens element is used as the aspherical surface, spherical aberration and off-axial luminance flux flare on the telephoto side are corrected into a better-balanced condition. That is, spherical aberration and flare which cannot completely be corrected by one aspherical surface can be corrected by the other aspherical surface.

It is preferable that one aspherical surface fulfills the condition (4) and the other aspherical surface fulfills the following condition (5):

$$-0.01 < \phi2 \cdot (N'-N) \cdot \left(\frac{d}{dy}\right) \cdot \{X(y) - XO(y)\} < 0.01 \quad (5)$$

When the upper limit of the condition (5) is exceeded, spherical aberration and flare are undercorrected. When the lower limit of the condition (5) is exceeded, spherical aberration and flare are overcorrected.

In the present invention, in order to eliminate middle-band luminance flux flare in a range from the wide angle limit to the vicinity of the telephoto limit, it is preferable to provide between the first and second lens units a luminance flux restricting plate (hereinafter referred to as light restricting plate) which is movable during zooming.

In the present invention, in order to correct chromatic aberration, it is preferable that each of the first and third lens units includes two lens elements of a positive lens element and a negative lens element. By arranging the lens elements in the order of, from the object side, a positive lens element and a negative lens element in the first lens unit and in the order of, from the object side, a negative lens element and a positive lens element in the third lens unit, the refractive power is symmetrically arranged in the entire lens system. This arrangement is advantageous in correcting aberrations.

By employing an aspherical surface in the third lens unit, more excellent optical performance is obtained. The aspherical surface preferably fulfills the following condition (6). When an arbitrary height y in a direction perpendicular to the optical axis is defined by 0<y<Ymax where Ymax is a maximum effective diameter of the aspherical surface, $$-0.05 < \phi3 \cdot (N'-N) \cdot \left(\frac{d}{dy}\right) \cdot \{X(y) - XO(y)\} < 0 \quad (6)$$

where $\phi3$ is a refractive power of the third lens unit.

When the upper limit of the condition (6) is exceeded, positive distortion increases on the wide angle side and spherical aberration inclines toward the over side on the telephoto side. When the lower limit of the condition (6) is exceeded, negative distortion increases on the wide angle side and spherical aberration inclines toward the under side on the telephoto side.

The most object side positive lens element of the second lens unit preferably fulfills the following condition (7):

$$-1.3 < \frac{r1 - r2}{r1 + r2} < -0.9 \quad (7)$$

where $\phi3$ is a radius of curvature of the object side surface of the most object side positive lens element of the second lens unit and r2 is a radius of curvature of the image side surface of the most object side positive lens element of the second lens unit.

The condition (7) defines the configuration of the most positive lens element of the second lens unit. When the lower limit of the condition (7) is exceeded, spherical aberration inclines toward the over side and the back focal length increases. As a result, the total length of the lens system increases. When the upper limit of the condition (7) is exceeded, spherical aberration inclines toward the under side and the back focal length decreases. As a result, it is necessary to increase the diameter of the third lens unit in order to secure a sufficient off-axial illuminance.

As described above, with the feature of the present invention, a compact, high-magnification zoom lens system can be realized with fewer lens elements.

According to a second implementation of the present invention, a zoom lens system comprises from the object side a first lens unit having a negative refractive power, a second lens unit having a positive refractive power and a third lens unit having a negative refractive power. Zooming from a wide angle limit (shortest focal length condition) to a telephoto limit (longest focal length condition) is performed by moving all of the first, second and third lens units toward the object side while reducing the distance between the first and second lens units and the distance between the second and third lens units. The third lens unit includes at least two lens elements of a positive lens element and a negative lens element. The following conditions (8) and (9) are fulfilled:

$$0.5 < \left|\frac{f3}{fW}\right| < 1.0 \quad (8)$$

$$0.26 < \left|\frac{f3}{fT}\right| < 0.33 \quad (9)$$

where f3 is a focal length of the third lens unit, fW is a focal length of the entire lens system at the wide angle limit, and fT is a focal length of the entire lens system at the telephoto limit.

Further, the above-mentioned condition (3) is preferably fulfilled.

The conditions (8) and (9) define a ratio of a focal length of the third lens unit to a focal length of the entire lens system at the wide angle limit and a ratio of a focal length of the third lens unit to a focal length of the entire lens system at the telephoto limit, respectively. When the lower limit of the focal length range defined by the condition (3) is exceeded, the refractive power of the third lens unit is too strong, so that positive distortion increases on the wide angle side (shorter focal length side) and spherical aberration inclines toward the over side on the telephoto side (longer focal length side). Further, as the back focal length decreases, the diameter of the third lens unit increases in order to secure a sufficient quantity of peripheral light. As a result, the size of the camera increases.

When the upper limit of the condition (3) is exceeded, the refractive power of the third lens unit is too weak, so that negative distortion increases on the wide angle side and spherical aberration inclines toward the under side on the telephoto side. Further, as the movement amount of the third lens unit increases, the total length of the lens system increases on the telephoto side.

By employing an aspherical surface in the third lens unit, more excellent optical performance is obtained. It is preferable to provide an aspherical surface to a positive lens element of the third lens unit.

The aspherical surface preferably fulfills the following condition (6) which has been described with respect to the first implementation:

$$-0.05 < \phi 3 \cdot (N' - N) \cdot \left(\frac{d}{dy}\right) \cdot \{X(y) - XO(y)\} < 0 \qquad (6)$$

The condition (6) defines the configuration of the aspherical surface and indicates that the positive refractive power decreases gradually along the height. It is a condition for correcting distortion on the wide angle side and spherical aberration on the telephoto side.

When the upper limit of the condition (6) is exceeded, positive distortion increases on the wide angle side and spherical aberration inclines toward the over side on the telephoto side. When the lower limit of the condition (6) is exceeded, negative distortion increases on the wide angle side and spherical aberration inclines toward the under side on the telephoto side.

In the present invention, since the positive lens element of the third lens unit fulfills the following conditions (10) and (11), more excellent optical performance is obtained:

$$Nd \leq 1.6 \qquad (10)$$

$$vd \leq 35.0 \qquad (11)$$

where Nd is a refractive index, to the d-line, of the glass material of the positive lens element of the third lens unit, and vd is an Abbe number, to the d-line, of the glass material of the positive lens element of the third lens unit.

The condition (10) defines the refractive power of the material of the positive lens element of the third lens unit. It is a condition for preventing an inclination of an image plane in the positive direction caused by an increase of a Petzval sum toward the negative side.

The condition (11) defines the Abbe number of the material of the positive lens element of the third lens unit. It is a condition for correcting magnification chromatic aberration and axial chromatic aberration into well-balanced conditions.

In the present invention, in order to eliminate middle-band luminance flux flare in a range from the wide angle limit to the vicinity of the telephoto limit, it is preferable to provide between the first and second lens units a luminance flux restricting plate (hereinafter referred to as light restricting plate) which is movable during zooming.

In the present invention, in order to correct chromatic aberration, it is preferable that the first lens unit includes two lens elements and that the second lens unit includes three lens elements. It is particularly preferable that the first lens unit includes a positive lens element and a negative lens element and that the second lens unit includes three lens elements including at least one positive lens element and at least one negative lens element. Further, it is preferable that the second lens unit is of a positive, negative, positive lens configuration from the object side so that the refractive power is symmetrically arranged in the entire lens system from the wide angle limit to the telephoto limit.

By employing an aspherical surface in the second unit, more excellent optical performance is obtained. The aspherical surface preferably fulfills the above-mentioned condition (4).

The condition (4) defines the configuration of the aspherical surface as described above. It is a condition for correcting spherical aberration and off-axial luminance flux flare on the telephoto side. When the upper limit of the condition (4) is exceeded, a tendency for spherical aberration to incline toward the under side is remarkable in the entire focal length range and generation of off-axial luminance flux flare is remarkable on the telephoto side. When the lower limit of the condition (4) is exceeded, spherical aberration inclines toward the over side in the entire focal length range and a tendency for off-axial luminance flux flare to be overcorrected is remarkable.

In the present invention, the following (12) is preferably fulfilled:

$$2.0 < \frac{f1}{f3} < 3.7 \qquad (12)$$

where f1 is a focal length of the first lens unit.

The condition (12) defines a ratio of a focal length of the first lens unit to a focal length of the third lens unit. It is a condition for arranging the refractive power of the entire lens system in a well-balanced condition while maintaining the symmetry of the refractive power and for correcting distortion.

When the lower limit of the condition (12) is exceeded, the refractive power of the third lens unit is too weak against the refractive power of the first lens unit, so that a large amount of negative distortion is generated on the wide angle side. When the upper limit of the condition (12) is exceeded, the refractive power of the third lens unit is too strong against the first lens unit, so that a large amount of positive distortion is generated on the wide angle side.

As described above, according to the feature of the present invention, a compact, high-zoom-ratio zoom lens system can be realized with fewer lens elements.

According to a third implementation of the present invention, a zoom lens system comprises from the object side a first lens unit having a negative refractive power, a second lens unit having a positive refractive power and a third lens unit having a negative refractive power. In the zoom lens system, zooming is performed by moving all of the lens units, and focusing is performed by moving the second lens unit.

For example, zooming from a wide angle limit (shortest focal length condition) to a telephoto limit (longest focal length condition) is performed by changing the distance between the first and second lens units and the distance between the second and third lens units, that is, by moving all of the first, second and third lens units toward the object side.

In the above-described optical arrangement of the present invention, the diameter of the second lens unit is the smallest. If focusing is performed by the first lens unit, it is necessary to increase the diameter of the first lens unit in order to secure a sufficient axial illuminance in photographing a near subject. If focusing is performed by the third lens unit, it is necessary to increase the diameter of the third lens unit in order to secure a sufficient axial illuminance in photographing a near subject.

Therefore, in the optical arrangement of the present invention, it is the most advantageous in reducing the size of the camera to perform focusing by the second lens unit. Moreover, since the second lens unit is the lightest in weight, the load imposed on a motor for focusing can be reduced.

By fulfilling the following condition (13), more excellent optical performance is secured in the entire focal length range from the center to the periphery of an image plane:

$$0.05 < \left| \frac{\left(\frac{f12T}{fT}\right)^2}{\beta2T^2 - 1} \right| < 0.18 \quad (13)$$

where f12T is a composite focal length of the first and second lens unit at the telephoto limit, fT is a focal length of the entire lens system at the telephoto limit, and β2T is a lateral magnification of the second lens unit at the telephoto limit.

Further, it is preferable to arrange the zoom lens system with a focal length range which fulfills the above-mentioned condition (3).

The condition (13) represents a movement ratio of the second lens unit for focusing at the telephoto limit.

When the upper limit of the condition (13) is exceeded, the movement amount of the second lens unit increases, so that it is required to increase the distance between the first and second lens units at the telephoto limit. As a result, the total length of the lens system increases.

When the lower limit of the condition (13) is exceeded, the refractive power of the second lens unit is too strong, so that it is difficult to correct spherical aberration.

In the present invention, it is preferable to arrange an aperture between the second and third lens units. With such an arrangement, it is possible to minimize an open aperture value while letting off-axial luminance fluxes through the zoom lens system. As a result, a compact camera can be realized.

While an aperture is moved together with the second lens unit during zooming and is fixed during focusing in the subsequently described embodiments, it may be moved together with the second lens unit during focusing.

As described above, with the arrangement of the present invention, the diameter of the front lens element can be reduced. As a result, a compact camera can be realized.

Numerical data of first to thirteenth embodiments of the present invention are shown in Tables 1 to 13.

In each table, ri (i=1, 2, 3, . . . ) is a radius of curvature of an ith lens surface counted from the object side, di (i=1, 2, 3, . . . ) is an ith axial distance counted from the object side, Ni (i=1, 2, 3, . . . ) and vi (i=1, 2, 3, . . . ) are a refractive index and an Abbe number, to the d-line, of an ith lens counted from the object side, respectively. f is a focal length of the entire lens system. FNo is a minimum F number.

With respect to the second, third, fourth, seventh and thirteen embodiments, variable distances at an object distance D in photographing a near subject and variable distances at the wide angle limit, a middle focal length condition and telephoto limit in photographing a nearest subject are shown.

In the tables, the asterisks show that the surfaces are aspherical. The aspherical surfaces are defined by the above-mentioned equation (A).

FIGS. 1, 3, 7, 11, 15, 17, 19, 23, 25, 27, 29, 31 and 33 show lens arrangements, at the wide angle limit (W), of the first to thirteenth embodiments, respectively. In each figure, arrows m1, m2 and m3 schematically show movements, from the wide angle limit (W) to the telephoto limit (T), of the first, second and third lens units L1, L2 and L3. An arrow mS in FIGS. 3, 7, 11, 15, 19, 25, 29, 31 and 33 schematically shows a movement, from the wide angle limit (W) to the telephoto limit (T), of a light restricting plate S1.

The first embodiment of FIG. 1 comprises from the object side: a first lens unit L1 including a negative meniscus lens element convex to the object side and a positive meniscus lens element convex to the object side; a second lens unit L2 including a positive bi-convex lens element, a negative bi-concave lens element, a positive bi-convex lens element and an aperture S; and a third lens unit L3 including a positive meniscus lens element convex to the image side and a negative meniscus lens element convex to the image side.

The object side surface of the object side positive lens element of the second lens unit L2 and the object side surface of the positive meniscus lens element of the third lens unit L3 are aspherical.

Figure 3:
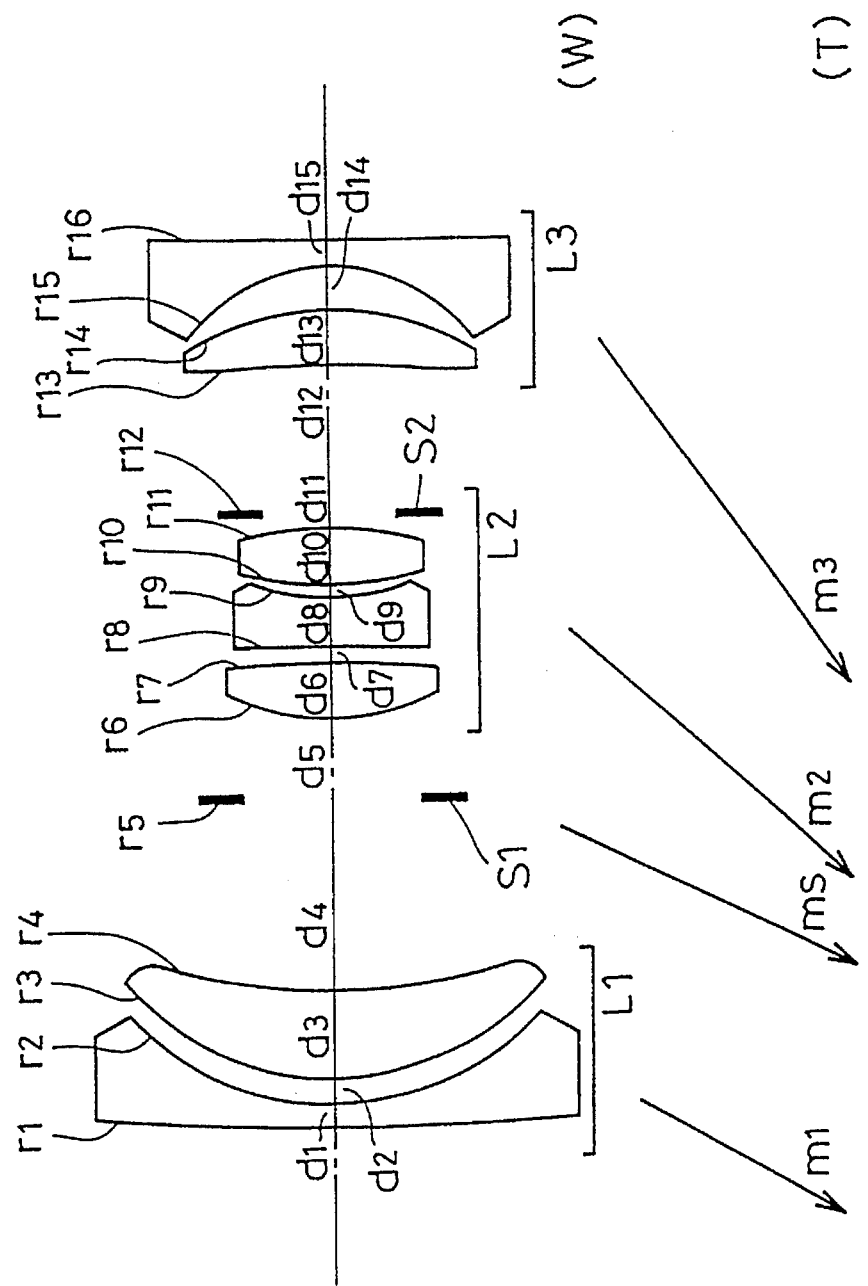
FIG. 3 is a lens arrangement of a second embodiment of the present invention.
Figure 9A:
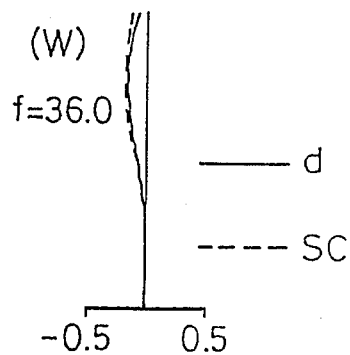
FIGS. 9A, through 9I are graphic representations of aberrations of the third embodiment when an object distance D is 2.5 m.
Figure 9B:
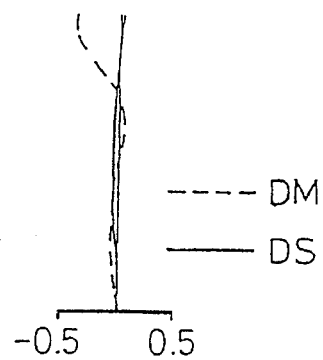
Figure 9C:
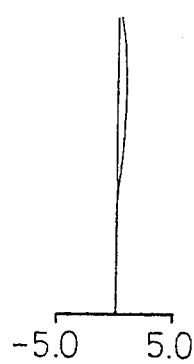
Figure 9D:
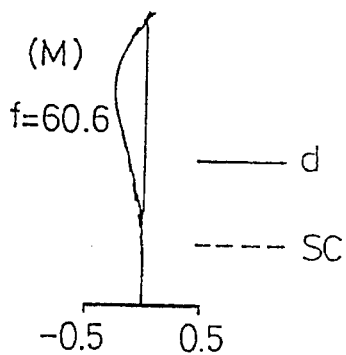
Figure 9E:
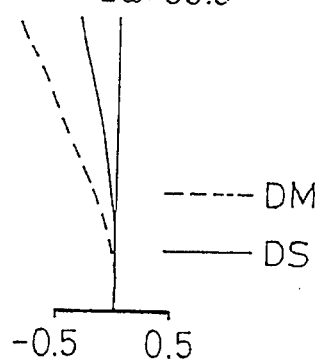
Figure 9F:
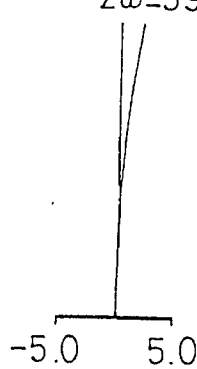
Figure 9G:
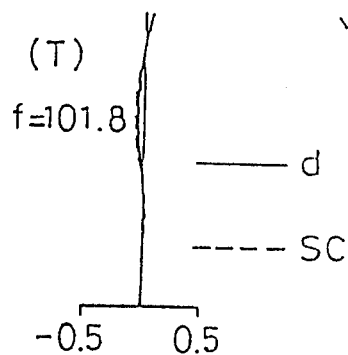
Figure 9H:
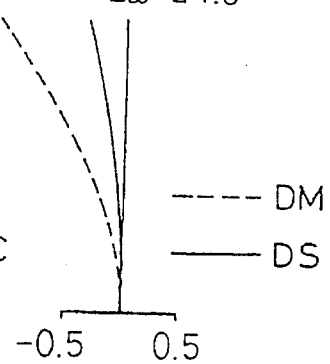
Figure 9I:
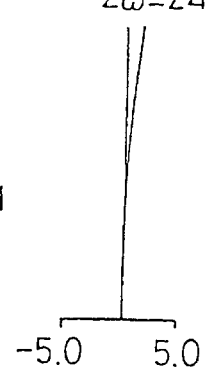
Figures 10A, 10B, 10C:
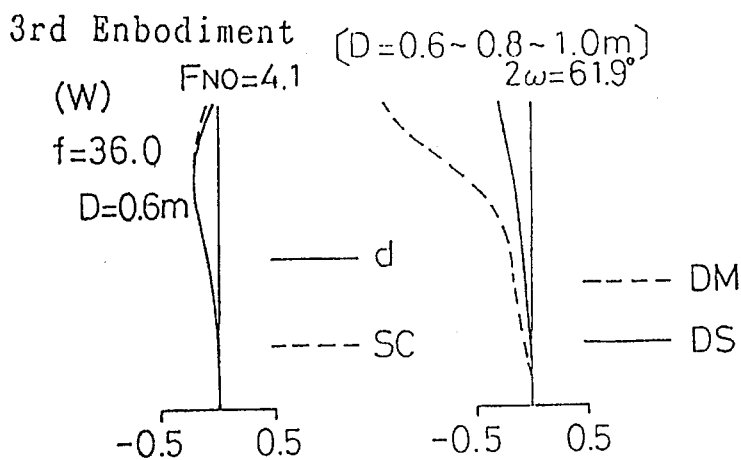
FIGS. 10A, through 10I are graphic representations of aberrations of the third embodiment when an object distance D is 0.6 to 0.8; to 1.0 m.
Figures 10D, 10E, 10F:
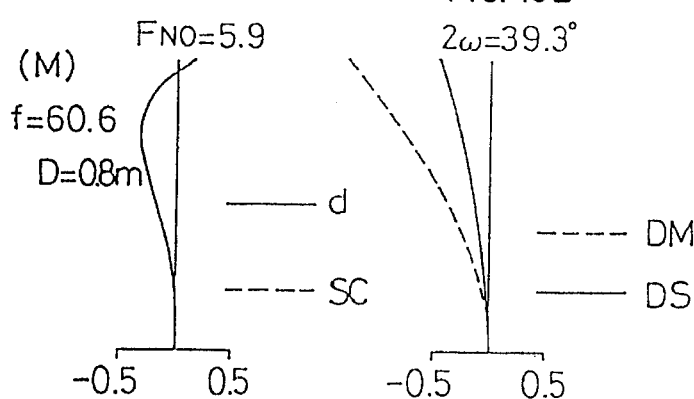
Figures 10G, 10H, 10I:
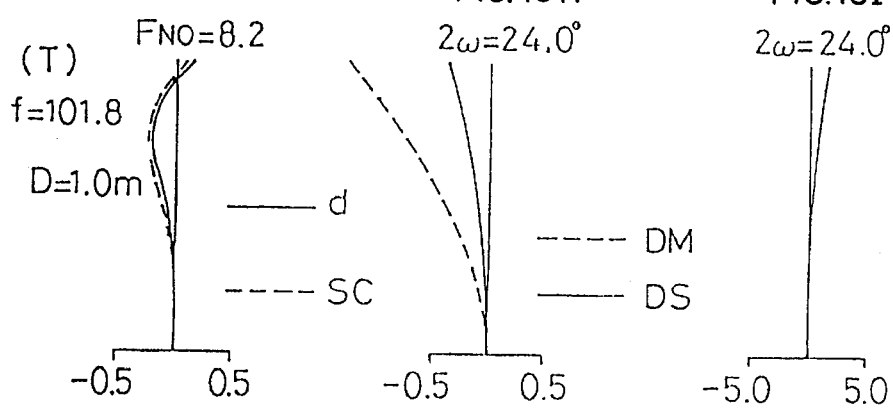
Figure 13A:
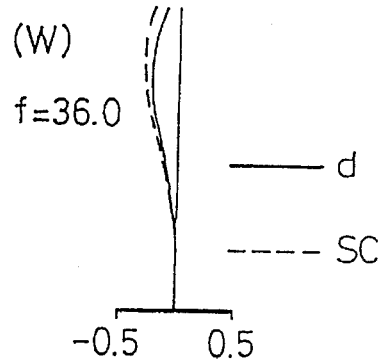
FIGS. 13A, through 13I are graphic representations of aberrations of the fourth embodiment when an object distance D is 2.0 m.
Figure 13B:
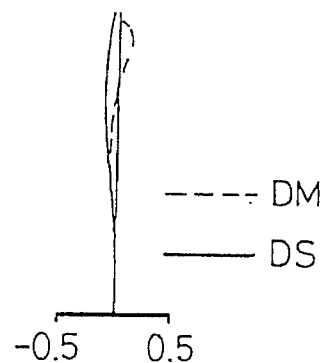
Figure 13C:
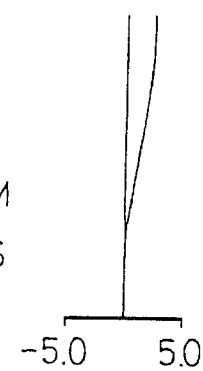
Figure 13D:
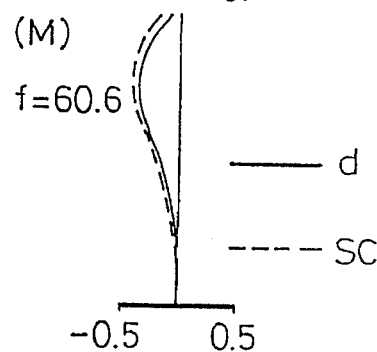
Figure 13E:
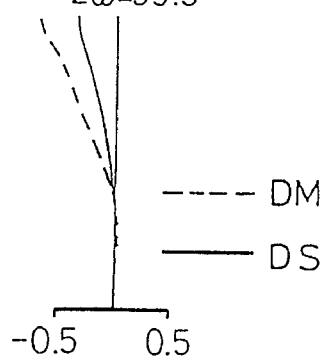
Figure 13F:
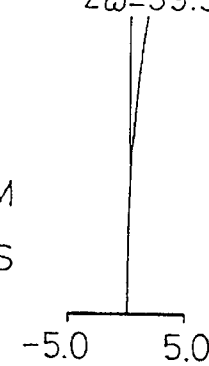
Figure 13G:
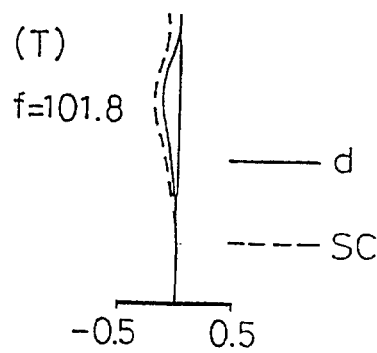
Figure 13H:
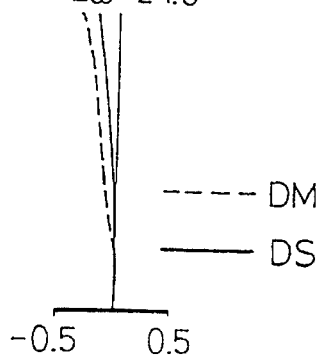
Figure 13I:
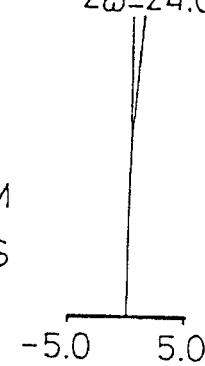

The second embodiment of FIG. 3 comprises from the object side: a first lens unit L1 including a negative meniscus lens element convex to the object side and a positive meniscus lens element convex to the object side; a light restricting plate S1; a second lens unit L2 including a positive bi-convex lens element, a negative bi-concave lens element, a positive bi-convex lens element and an aperture S2; and a third lens unit L3 including a positive meniscus lens element convex to the image side and a negative bi-concave lens element.

The image side surface of the positive lens element of the first lens unit L1, both side surfaces of the object side positive lens element of the second lens unit L2, the image side surface of the negative lens element of the second lens unit L2 and the object side surface of the positive meniscus lens element of the third lens unit L3 are aspherical.

The third, fourth and ninth embodiments of FIGS. 7, 11 and 25 comprise from the object side: a first lens unit L1 including a negative meniscus lens element convex to the object side, a positive meniscus lens element convex to the object side; a light restricting plate S1; a second lens unit L2 including a positive bi-convex lens element, a negative bi-concave lens element, a positive bi-convex lens element and an aperture S2; and a third lens unit L3 including a positive meniscus lens element convex to the image side and a negative meniscus lens element convex to the image side.

Both side surfaces of the object side positive lens element of the second lens unit L2 and the object side surface of the positive meniscus lens element of the third lens unit L3 are aspherical.

The fifth embodiment of FIG. 15 comprises from the object side: a first lens unit L1 including a negative meniscus lens element convex to the object side and a positive meniscus lens element convex to the object side; a light restricting plate S1; a second lens unit L2 including a positive bi-convex lens element, a negative bi-concave lens element, a positive bi-convex lens element and an aperture S2; and a third lens unit L3 including a positive meniscus lens element convex to the image side and a negative meniscus lens element convex to the image side.

Both side surfaces of the object side positive lens element of the second lens unit L2, the image side surface of the image side positive lens element of the second lens unit L2 and the object side surface of the positive meniscus lens element of the third lens unit L3 are aspherical.

Figure 17:
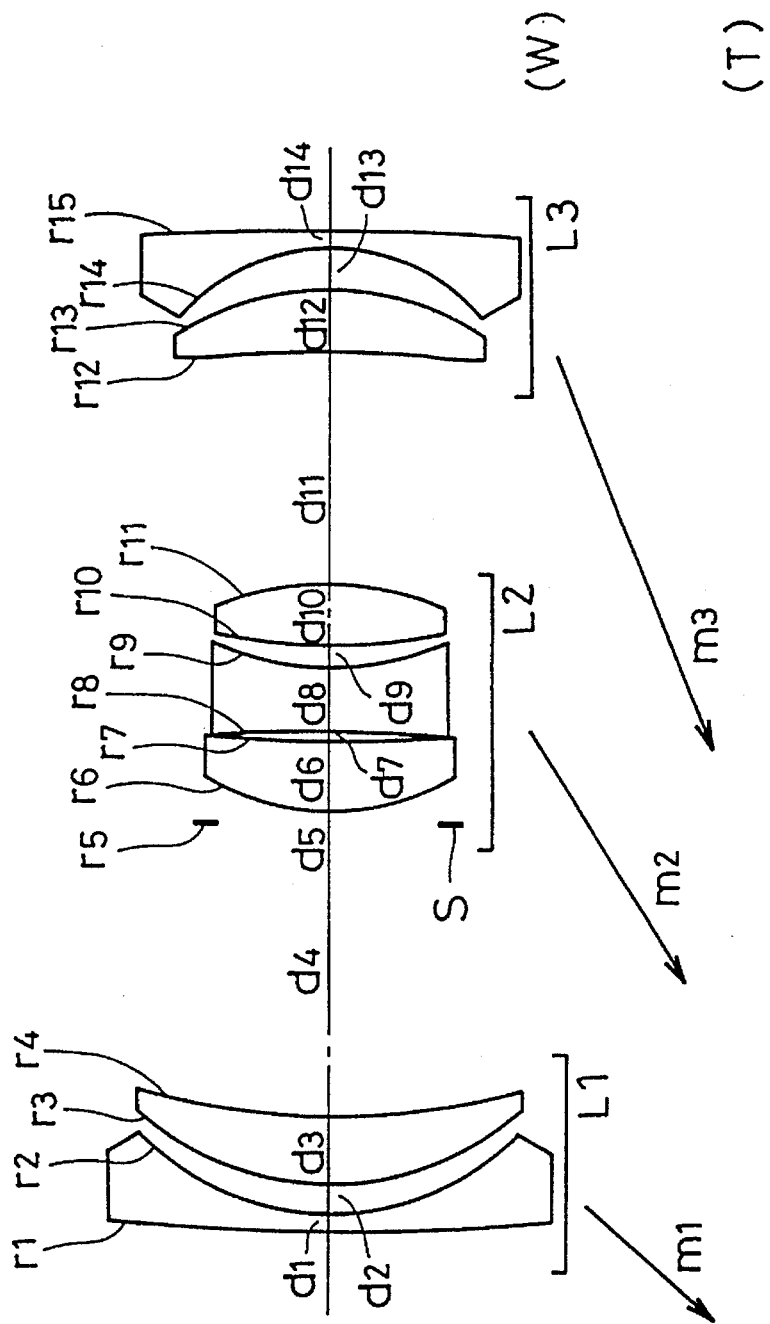
FIG. 17 is a lens arrangement of a sixth embodiment of the present invention.

The sixth embodiment of FIG. 17 comprises from the object side: a first lens unit L1 including a negative meniscus lens element convex to the object side and a positive meniscus lens element convex to the object side; a second lens unit L2 including an aperture S, a positive bi-convex lens element, a negative bi-concave lens element and a positive bi-convex lens element; and a third lens unit L3 including a positive meniscus lens element convex to the image side and a negative meniscus lens element convex to the image side.

Both side surfaces of the object side positive lens element of the second lens unit L2 and the object side surface of the positive meniscus lens element of the third lens unit L3 are aspherical.

Figure 19:
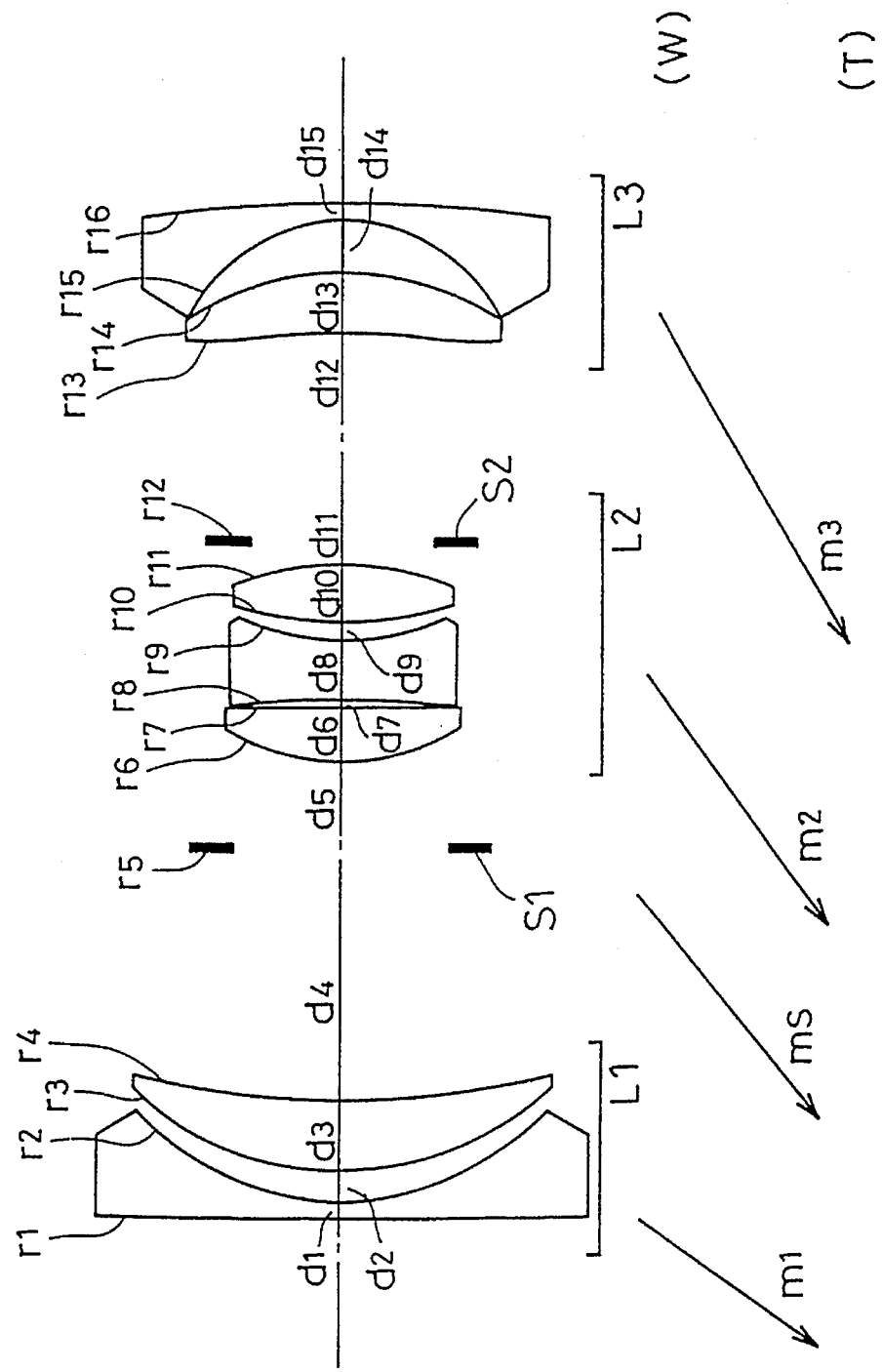
FIG. 19 is a lens arrangement of a seventh embodiment of the present invention.
Figure 20A:
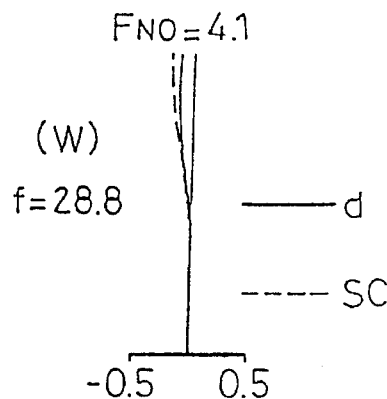
FIGS. 20A, through 20I are graphic representations of aberrations of the seventh embodiment with respect to an infinity subject.
Figure 20B:
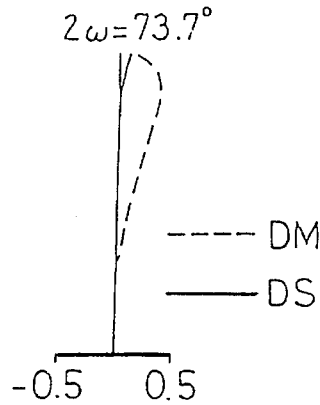
Figure 20C:
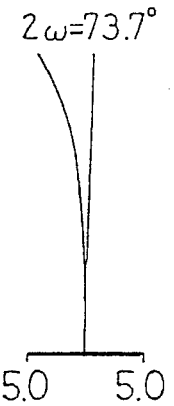
Figure 20D:
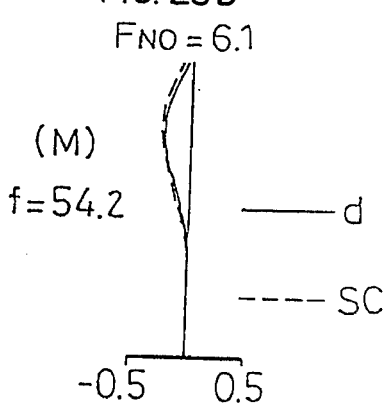
Figure 20E:
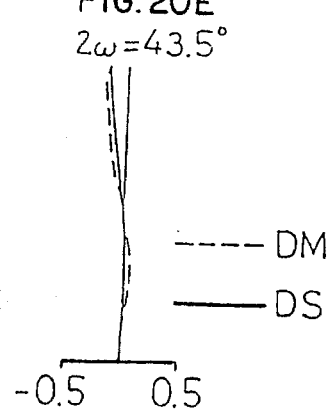
Figure 20F:
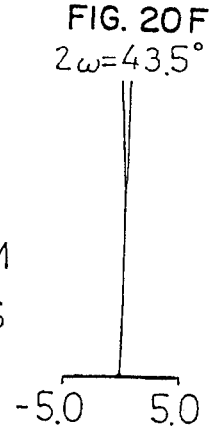
Figure 20G:
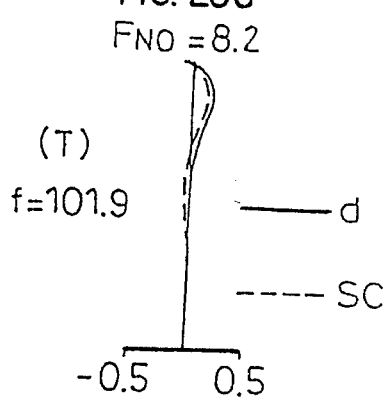
Figure 20H:
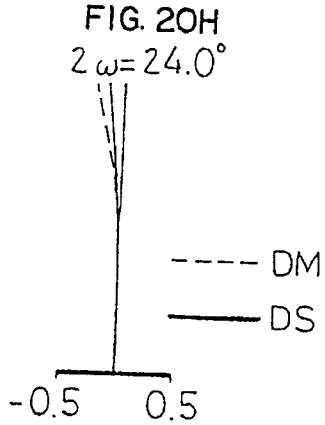
Figure 20I:
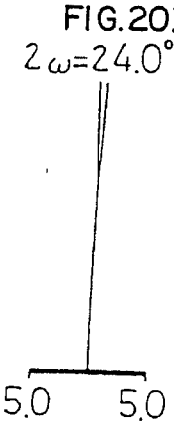
Figure 26A:
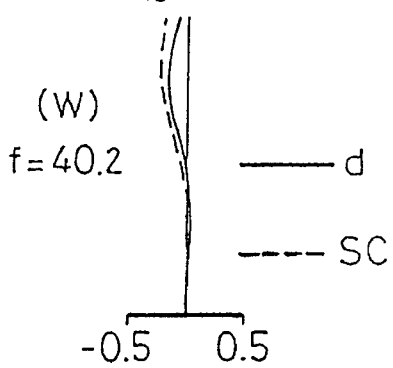
FIGS. 26A, through 26I are graphic representations of aberrations of the ninth embodiment of the present invention.
Figure 26B:
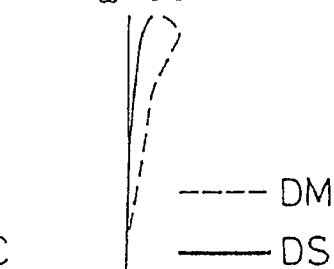
Figure 26C:
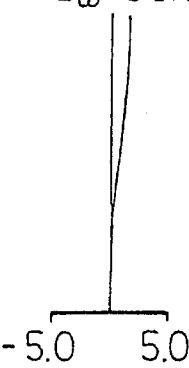
Figure 26D:
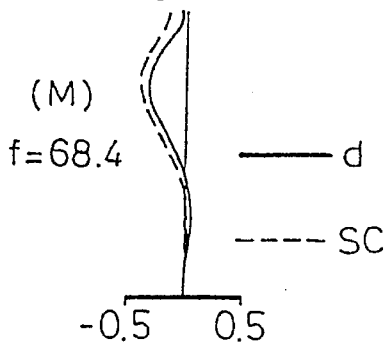
Figure 26E:
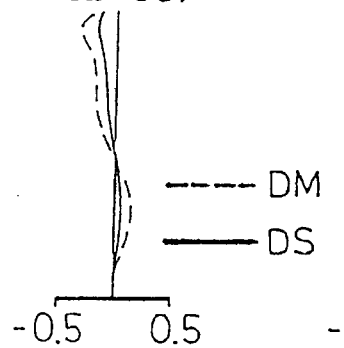
Figure 26F:
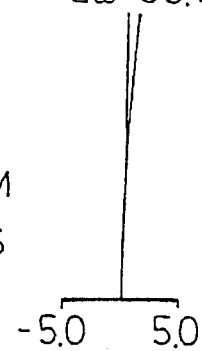
Figure 26G:
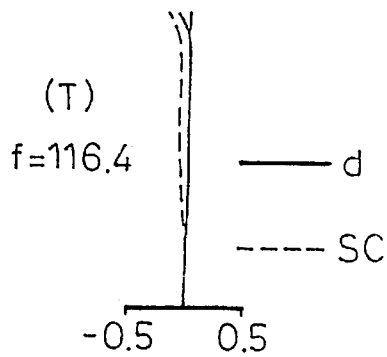
Figure 26H:
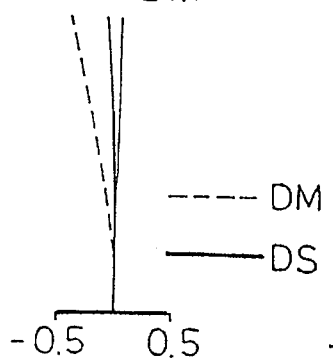
Figure 26I:
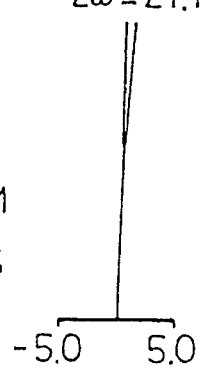

The seventh embodiment of FIG. 19 comprises from the object side: a first lens unit L1 including a negative meniscus lens element convex to the object side and a positive meniscus lens element convex to the object side; a light restricting plate S1; a second lens unit L2 including a positive meniscus lens element convex to the object side, a negative bi-concave lens element, a positive bi-convex lens element and an aperture S2; and a third lens unit L3 including a positive meniscus lens element convex to the image side and a negative meniscus lens element convex to the image side.

Both side surfaces of the object side positive lens element of the second lens unit L2 and the object side surface of the positive meniscus lens element of the third lens unit L3 are aspherical.

The eighth embodiment of FIG. 23 comprises from the object side: a first lens unit L1 including a negative meniscus lens element convex to the object side and a positive meniscus lens element convex to the object side; a second lens unit L2 including a positive bi-convex lens element, a negative bi-concave lens element, a positive bi-convex lens element and an aperture S; and a third lens unit L3 including a positive meniscus lens element convex to the image side and a negative meniscus lens element convex to the image side.

Both side surfaces of the object side positive lens element of the second lens unit L2 and the object side surface of the positive meniscus lens element of the third lens unit L3 are aspherical.

Figure 27:
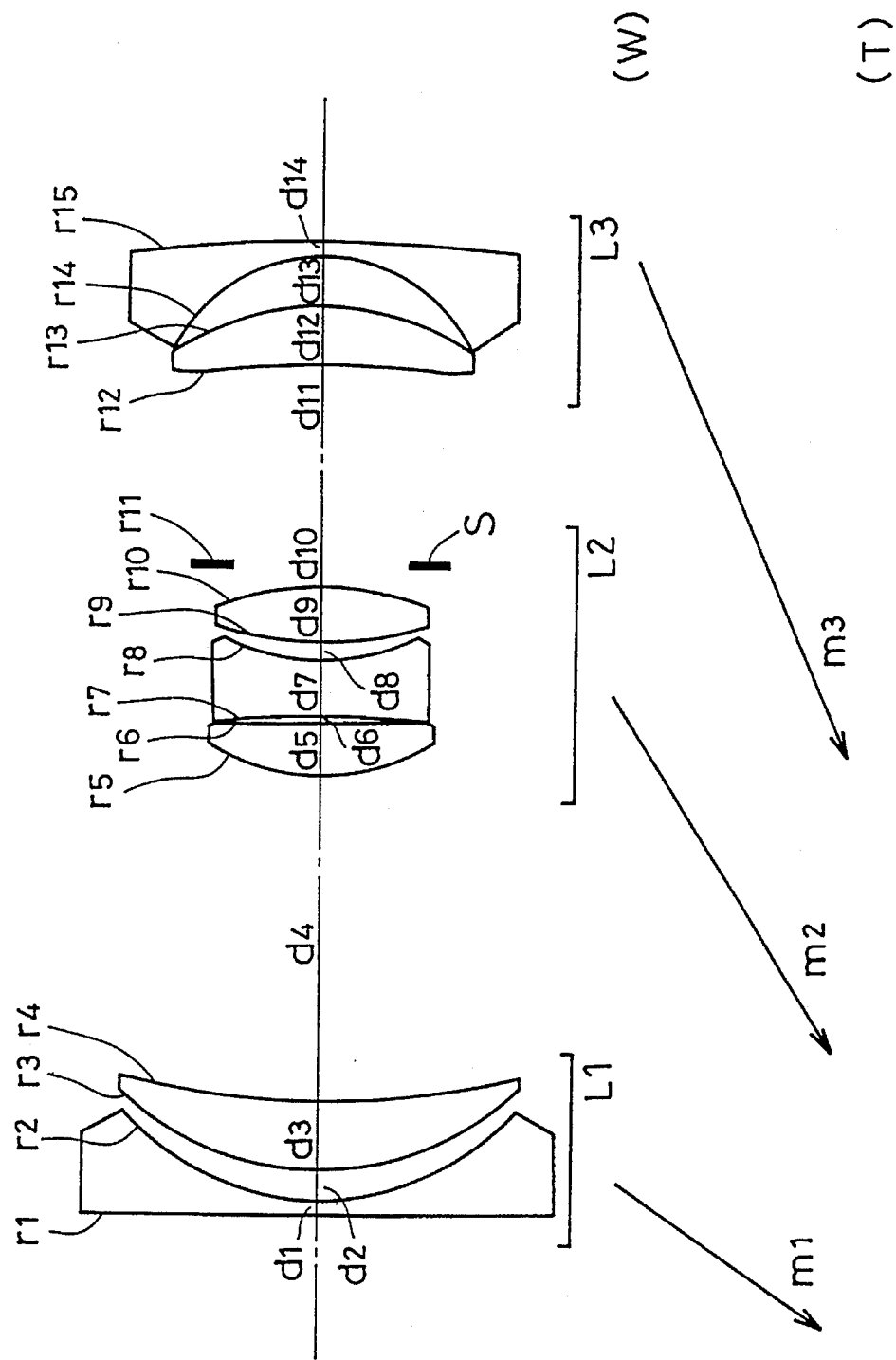
FIG. 27 is a lens arrangement of a tenth embodiment of the present invention.
Figure 30A:
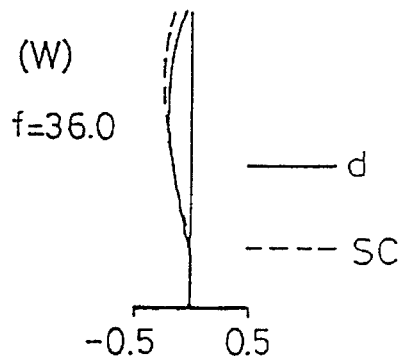
FIGS. 30A, through 30I are graphic representations of aberrations of the eleventh embodiment of the present invention.
Figure 30B:
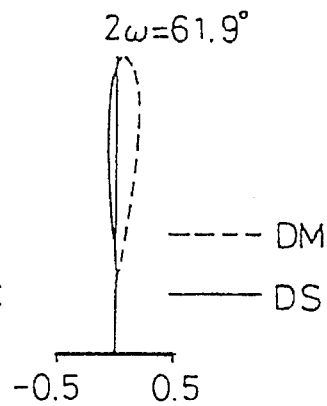
Figure 30C:
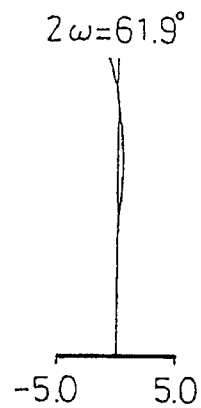
Figure 30D:
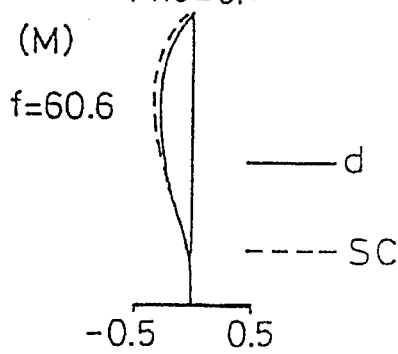
Figure 30E:
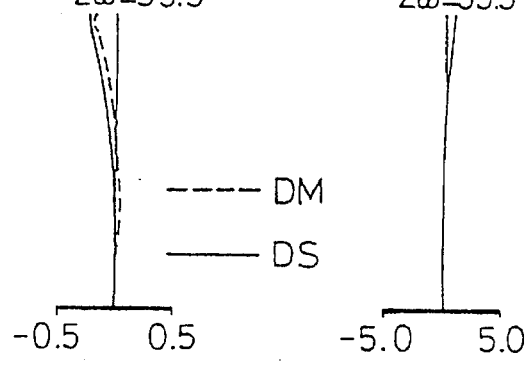
Figure 30F:
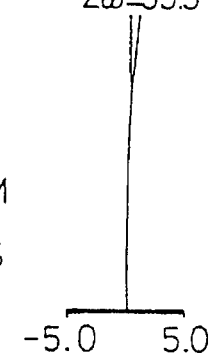
Figure 30G:
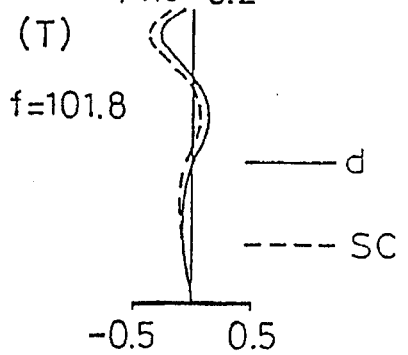
Figure 30H:
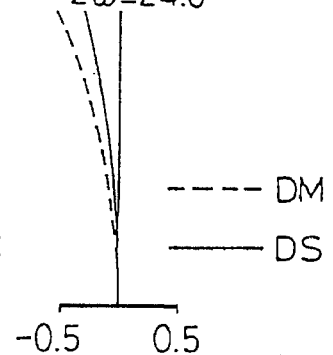
Figure 30I:
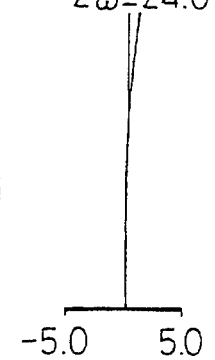

The tenth embodiment of FIG. 27 comprises from the object side: a first lens unit L1 including a negative meniscus lens element convex to the object side and a positive meniscus lens element convex to the object side; a second lens unit L2 including a positive meniscus lens element convex to the object side, a negative bi-concave lens element, a positive bi-convex lens element and an aperture S; and a third lens unit L3 including a positive meniscus lens element convex to the image side and a negative meniscus lens element convex to the image side.

Both side surfaces of the object side positive lens element of the second lens unit L2 and the object side surface of the positive meniscus lens element of the third lens unit L3 are aspherical.

The eleventh embodiment of FIG. 29 comprises from the object side: a first lens unit L1 including a negative meniscus lens element convex to the object side and a positive meniscus lens element convex to the object side; a second lens unit L2 including a positive bi-convex lens element, a negative bi-concave lens element, a positive bi-convex lens element and an aperture $2; and a third lens unit L3 including a positive meniscus lens element convex to the image side and a negative meniscus lens element convex to the image side.

Both side surfaces of the object side positive lens element of the second lens unit L2 and the object side surface of the positive meniscus lens element of the third lens unit L3 are aspherical.

Figure 31:
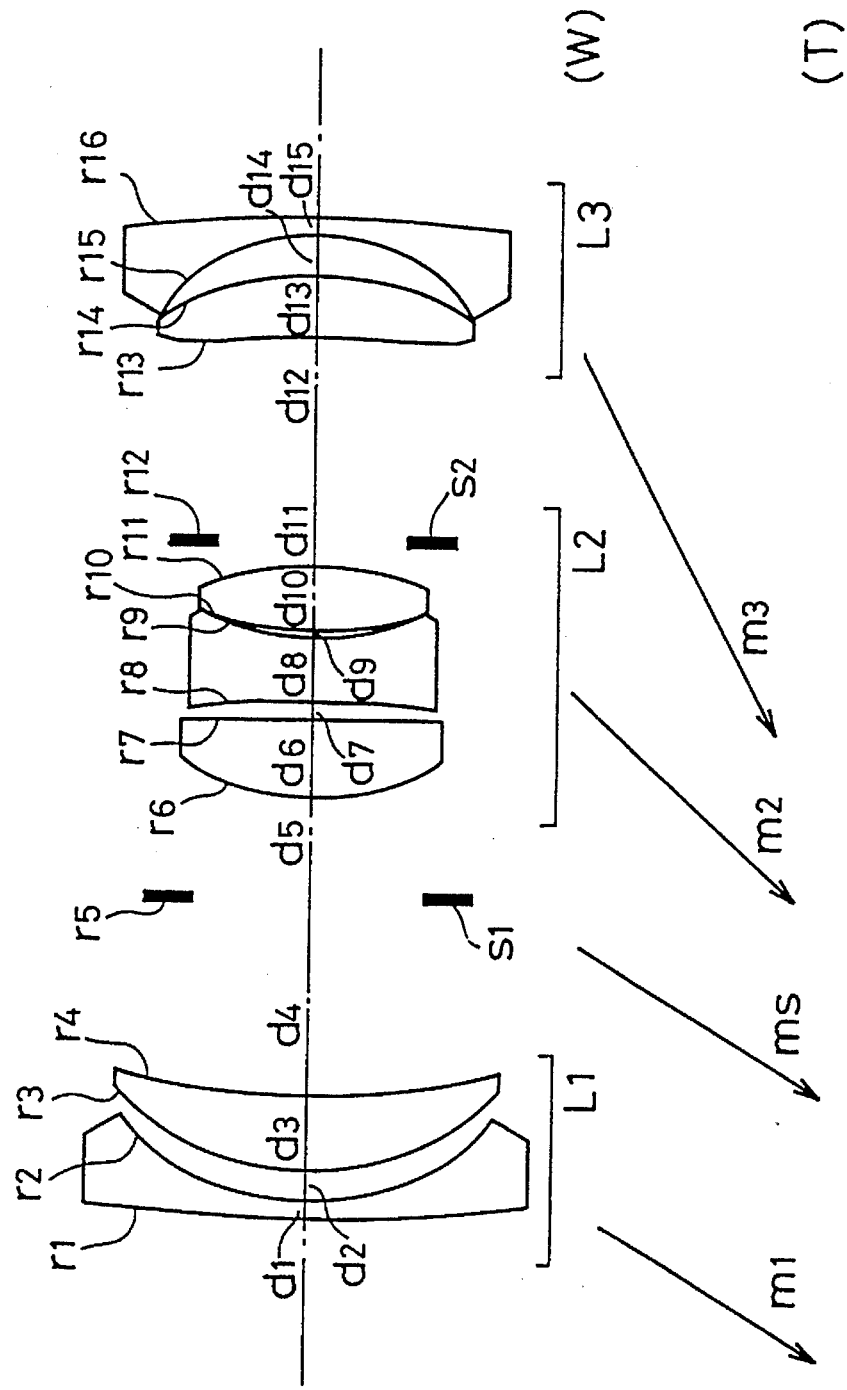
FIG. 31 is a lens arrangement of a twelfth embodiment of the present invention.
Figure 35A:
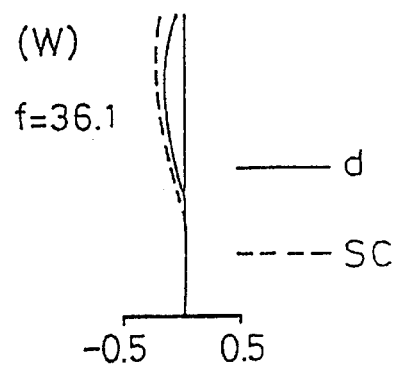
FIGS. 35A, through 35I are graphic representations of aberrations of the thirteenth embodiment when an object distance D is 2.0 m.
Figure 35B:
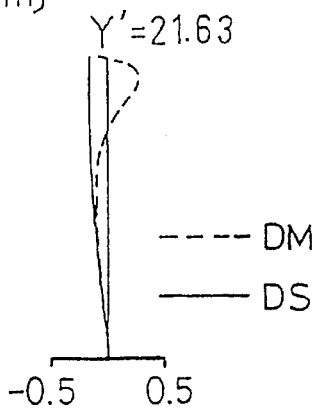
Figure 35C:
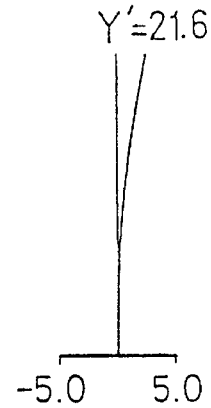
Figure 35D:
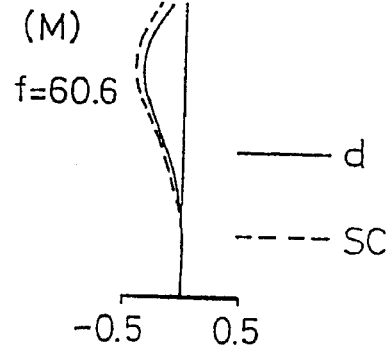
Figure 35E:
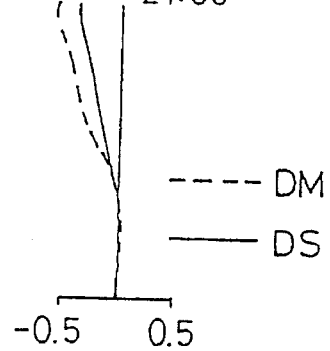
Figure 35F:
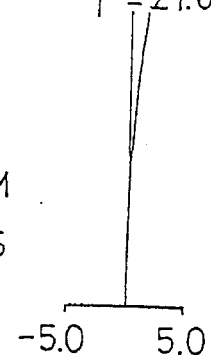
Figure 35G:
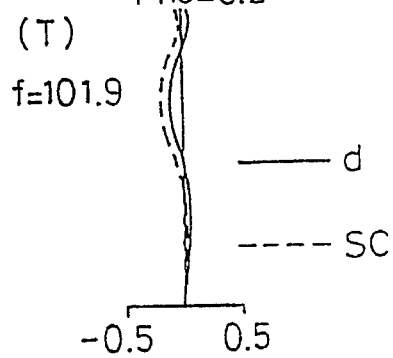
Figure 35H:
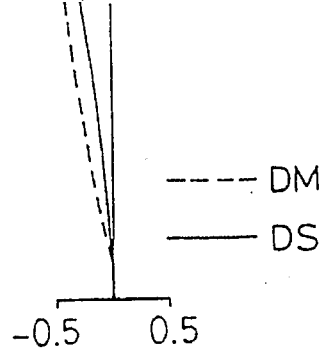
Figure 35I:
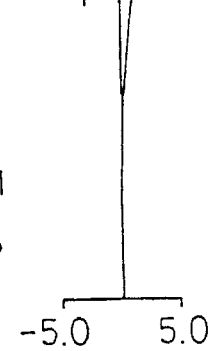

The twelfth embodiment of FIG. 31 comprises from the object side: a first lens unit L1 including a negative meniscus lens element convex to the object side and a positive meniscus lens element convex to the object side; a light restricting plate S1; a second lens unit L2 including a positive bi-convex lens element, a negative bi-concave lens element, a positive bi-convex lens element and an aperture S2; and a third lens unit L3 including a positive meniscus lens element convex to the image side and a negative meniscus lens element convex to the image side.

Both side surfaces of the object side positive lens element of the second lens unit L2 and the object side surface of the positive meniscus lens element of the third lens unit L3 are aspherical.

The thirteenth embodiment of FIG. 33 comprises from the object side: a first lens unit L1 including a negative meniscus lens element convex to the object side and a positive meniscus lens element convex to the object side; a light restricting plate S1; a second lens unit L2 including a positive bi-convex lens element, a negative bi-concave lens element, a positive bi-convex lens element and an aperture $2; and a third lens unit L3 including a positive meniscus lens element convex to the image side and a negative meniscus lens element convex to the image side.

Both side surfaces of the object side positive lens element of the second lens unit L2 and the object side surface of the positive meniscus lens element of the third lens unit L3 are aspherical.

FIGS. 2A to 2C, 16A to 16I, 18A to 18I, 24A to 24I, 26A to 26I, 28A to 28I, 30A to 30I and 32A to 32I are graphic representations of aberrations of the first, fifth, sixth, eighth, ninth, tenth, eleventh and twelfth embodiments at the wide angle limit (shortest focal condition ) (W), at the middle focal length condition (M) and at the telephoto limit (longest focal length condition) (T), respectively.

FIGS. 4A-4I to 6A-6I, 8A-8I to 10A-10I, 12A-12I to 14A-14I, 20A-20I to 22A-22I and 34A-34I to 36A-36I are graphic representations of aberrations of the second, third, fourth, seventh and thirteenth embodiments, respectively, at the wide angle limit (shortest focal length condition ) (W), at a middle focal length condition (M) and at the telephoto limit (longest focal length condition) (T) in photographing an infinity subject, in photographing a near subject and in photographing a nearest subject.

In each figure, a solid line d represents aberration to the d-line, a dotted line SC represents a sine condition, and dotted lines DM and DS represent astigmatism on a meridional image plane and a sagittal image plane, respectively.

In Tables 14 to 25, which correspond to the first to twelfth embodiments, respectively, (II) shows values of $\phi 2 \cdot (N'-N) \cdot (d/dy) \cdot \{X(y)-X0(y)\}$ of the condition (4) and (5) corresponding to values of the above-mentioned y in each aspherical surface, and (III) shows values of $\phi 3 \cdot (N'-N) \cdot (d/dy) \cdot \{X(y)-X0(y)\}$ of the condition (6) corresponding to values of the above-mentioned y in each aspherical surface.

Table 26 shows values of f2/fW of the condition (1), f2/fT of the condition (2), fT/fW of the condition (3) and (r1r2)/(r1+r2) of the condition (7) for the first to tenth embodiments. Table 27 shows values of fT/fW of the condition (3), f3/fW of the condition (8), f3/fT of the condition (9) and f1/f3 of the condition (12) for the second, fifth, sixth, eighth, eleventh and twelfth embodiments. Table 28 shows values of $(f12T/fT)^2/(\beta2T^2-1)$ of the condition (13) for the second, third, fourth, seventh and thirteenth embodiments. Table 28 shows the presence/absence of an aperture and a light restricting plate in front of and behind the second lens unit and positions of aspherical surfaces in the first to twelfth embodiments. Gn represents an nth lens from the object side.

Obviously, many modifications and variations of the present invention are possible in light of the above teachings. It is therefore to be understood that within the scope of the appended claims, the invention may be practiced other than as specifically described.

TABLE 1

(1st Embodiment)
f = 36.1 to 60.6 to 101.8  FNo = 3.7 to 5.8 to 8.7

| | Radius of Curvature | | Axial Distance | | Refractive Index | | Abbe Number |
|---|---|---|---|---|---|---|---|
| r1 | 2428.363 | | | | | | |
| | | d1 | 1.500 | N1 | 1.71300 | v1 | 53.93 |
| r2 | 16.251 | | | | | | |
| | | d2 | 1.600 | | | | |
| r3 | 17.906 | | | | | | |
| | | d3 | 4.200 | N2 | 1.63980 | v2 | 34.55 |
| r4 | 63.604 | | | | | | |
| | | d4 | 19.931 to 13.439 to 3.200 | | | | |
| r5* | 15.696 | | | | | | |
| | | d5 | 5.200 | N3 | 1.62041 | v3 | 60.29 |
| r6 | −124.138 | | | | | | |
| | | d6 | 0.250 | | | | |
| r7 | −649.697 | | | | | | |
| | | d7 | 5.050 | N4 | 1.84666 | v4 | 23.82 |
| r8 | 13.930 | | | | | | |
| | | d8 | 0.550 | | | | |
| r9 | 21.323 | | | | | | |
| | | d9 | 3.770 | N5 | 1.68893 | v5 | 31.16 |
| r10 | −42.124 | | | | | | |
| | | d10 | 1.000 | | | | |
| r11 | ∞ (aperture) | | | | | | |
| | | d11 | 15.818 to 5.604 to 3.000 | | | | |
| r12* | −58.120 | | | | | | |
| | | d12 | 3.400 | N6 | 1.58340 | v6 | 30.23 |
| r13 | −19.853 | | | | | | |
| | | d13 | 3.100 | | | | |
| r14 | −15.334 | | | | | | |
| | | d14 | 1.500 | N7 | 1.69680 | v7 | 56.47 |
| r15 | −724.029 | | | | | | |

Aspherical Coefficients r5: $\epsilon = 0.10000 \times 10$
$A4 = -0.21494 \times 10^{-4}$
$A6 = -0.79914 \times 10^{-7}$
$A8 = -0.42363 \times 10^{-9}$
$A10 = -0.53532 \times 10^{-12}$
$A12 = 0.22474 \times 10^{-13}$ r12: $\epsilon = 0.10000 \times 10$
$A4 = 0.10053 \times 10^{-4}$
$A6 = -0.19089 \times 10^{-7}$
$A8 = 0.40223 \times 10^{-9}$
$A10 = 0.52816 \times 10^{-11}$
$A12 = -0.38351 \times 10^{-13}$

TABLE 2

(2nd Embodiment)
f = 40.0 to 60.6 to 98.0  FNo = 4.1 to 6.4 to 10.1

| | Radius of Curvature | | Axial Distance | | Refractive Index | | Abbe Number |
|---|---|---|---|---|---|---|---|
| r1 | 214.400 | | | | | | |
| | | d1 | 1.449 | N1 | 1.72000 | v1 | 50.31 |
| r2 | 19.024 | | | | | | |
| | | d2 | 1.590 | | | | |
| r3 | 18.204 | | | | | | |
| | | d3 | 5.500 | N2 | 1.66446 | v2 | 35.84 |
| r4* | 45.212 | | | | | | |

TABLE 2-continued (2nd Embodiment)
f = 40.0 to 60.6 to 98.0  FNo = 4.1 to 6.4 to 10.1

| | | | | | | | |
|---|---|---|---|---|---|---|---|
| | | d4 | 12.238 to 5.754 to 2.101 | | | | |
| r5 | ∞ (light restricting plate) | | | | | | |
| | | d5 | 5.046 to 5.046 to 1.046 | | | | |
| r6* | 13.831 | | | | | | |
| | | d6 | 3.500 | N3 | 1.60311 | v3 | 60.74 |
| r7* | −5359.917 | | | | | | |
| | | d7 | 1.200 | | | | |
| r8 | −156.961 | | | | | | |
| | | d8 | 3.000 | N4 | 1.84666 | v4 | 23.82 |
| r9* | 15.633 | | | | | | |
| | | d9 | 0.900 | | | | |
| r10 | 23.142 | | | | | | |
| | | d10 | 3.600 | N5 | 1.65446 | v5 | 33.86 |
| r11 | −23.478 | | | | | | |
| | | d11 | 1.000 | | | | |
| r12 | ∞ (aperture) | | | | | | |
| | | d12 | 9.540 to 5.401 to 2.500 | | | | |
| r13* | −60.107 | | | | | | |
| | | d13 | 3.500 | N6 | 1.58340 | v6 | 30.23 |
| r14 | −18.746 | | | | | | |
| | | d14 | 2.902 | | | | |
| r15 | −11.433 | | | | | | |
| | | d15 | 1.560 | N7 | 1.71300 | v7 | 53.93 |
| r16 | 567.028 | | | | | | |

Aspherical Coefficients r4: $\epsilon = 0.10000 \times 10$
$A4 = 0.10373 \times 10^{-4}$
$A6 = 0.10681 \times 10^{-6}$
$A8 = -0.31850 \times 10^{-8}$
$A10 = 0.45910 \times 10^{-10}$
$A12 = -0.21619 \times 10^{-12}$ r6: $\epsilon = 0.10000 \times 10$
$A4 = -0.65323 \times 10^{-4}$
$A6 = -0.89345 \times 10^{-6}$
$A8 = -0.87765 \times 10^{-8}$
$A10 = 0.51935 \times 10^{-10}$
$A12 = -0.10888 \times 10^{-11}$ r7: $\epsilon = 0.10000 \times 10$
$A4 = -0.92872 \times 10^{-4}$
$A6 = -0.58409 \times 10^{-6}$
$A8 = -0.19615 \times 10^{-8}$
$A10 = 0.42039 \times 10^{-10}$
$A12 = 0.10855 \times 10^{-12}$ r9: $\epsilon = 0.10000 \times 10$
$A4 = 0.59177 \times 10^{-4}$
$A6 = -0.61332 \times 10^{-6}$
$A8 = -0.29850 \times 10^{-8}$
$A10 = 0.19471 \times 10^{-10}$
$A12 = 0.62259 \times 10^{-12}$ r13: $\epsilon = 0.10000 \times 10$
$A4 = 0.51473 \times 10^{-4}$
$A6 = -0.42616 \times 10^{-6}$
$A8 = 0.12684 \times 10^{-7}$
$A10 = -0.42975 \times 10^{-10}$
$A12 = -0.31709 \times 10^{-12}$ Variable Distances in Photographing Near Subject
(D = 2.0 m)

| | Wide | Middle | Telephoto |
|---|---|---|---|
| d5 | 5.589 | 5.491 | −0.164 |
| d11 | 2.061 | 2.159 | 2.414 |

Variable Distances in Photographing Nearest Subject
(D = 0.6 to 0.8 to 1.0 m)

| | Wide | Middle | Telephoto |
|---|---|---|---|
| d5 | 3.652 | 3.830 | −0.181 |
| d11 | 2.393 | 2.216 | 2.227 |

TABLE 3

(3rd Embodiment)
f = 36.0 to 60.6 to 101.8  FNo = 4.1 to 5.9 to 8.2

| | Radius of Curvature | | Axial Distance | | Refractive Index | | Abbe Number |
|---|---|---|---|---|---|---|---|
| r1 | 298.861 | | | | | | |
| | | d1 | 1.449 | N1 | 1.72000 | v1 | 50.31 |
| r2 | 17.923 | | | | | | |
| | | d2 | 1.590 | | | | |

TABLE 3-continued

| | | | | | | | |
|---|---|---|---|---|---|---|---|
| r3 | 19.377 | | | | | | |
| | | d3 | 5.500 | N2 | 1.66446 | v2 | 35.84 |
| r4 | 70.592 | | | | | | |
| | | d4 | 17.193 to 7.790 to 2.101 | | | | |
| r5 | ∞ (light restricting plate) | | | | | | |
| | | d5 | 6.125 to 6.125 to 1.125 | | | | |
| r6* | 14.401 | | | | | | |
| | | d6 | 3.713 | N3 | 1.62041 | v3 | 60.29 |
| r7* | −503.360 | | | | | | |
| | | d7 | 1.209 | | | | |
| r8 | −59.475 | | | | | | |
| | | d8 | 4.251 | N4 | 1.84666 | v4 | 23.82 |
| r9 | 16.422 | | | | | | |
| | | d9 | 0.550 | | | | |
| r10 | 25.229 | | | | | | |
| | | d10 | 3.754 | N5 | 1.68893 | v5 | 31.16 |
| r11 | −21.860 | | | | | | |
| | | d11 | 1.000 | | | | |
| r12 | ∞ (aperture) | | | | | | |
| | | d12 | 11.996 to 5.688 to 2.500 | | | | |
| r13* | −57.921 | | | | | | |
| | | d13 | 3.500 | N6 | 1.58340 | v6 | 30.23 |
| r14 | −18.939 | | | | | | |
| | | d14 | 2.902 | | | | |
| r15 | −11.752 | | | | | | |
| | | d15 | 1.560 | N7 | 1.72000 | v7 | 52.14 |
| r16 | −171.924 | | | | | | |

Aspherical Coefficients r6: $\epsilon = 0.10000 \times 10$
$A4 = -0.80644 \times 10^{-5}$
$A6 = 0.31161 \times 10^{-6}$
$A8 = -0.10303 \times 10^{-7}$
$A10 = 0.13163 \times 10^{-9}$
$A12 = -0.11772 \times 10^{-11}$ r7: $\epsilon = 0.10000 \times 10$
$A4 = 0.29256 \times 10^{-4}$
$A6 = 0.16918 \times 10^{-6}$
$A8 = -0.48913 \times 10^{-8}$
$A10 = -0.90163 \times 10^{-11}$
$A12 = -0.19732 \times 10^{-13}$ r13: $\epsilon = 0.10000 \times 10$
$A4 = 0.42605 \times 10^{-4}$
$A6 = -0.13540 \times 10^{-6}$
$A8 = 0.71363 \times 10^{-8}$
$A10 = -0.35864 \times 10^{-10}$
$A12 = 0.59236 \times 10^{-14}$

Variable Distances in Photographing Near Subject
(D = 2.5 m)

| | Wide | Middle | Telephoto |
|---|---|---|---|
| d5 | 5.830 | 5.748 | 0.600 |
| d11 | 1.295 | 1.377 | 1.525 |

Variable Distances in Photographing Nearest Subject
(D = 0.6 to 0.8 to 1.0 m)

| | Wide | Middle | Telephoto |
|---|---|---|---|
| d5 | 4.727 | 4.813 | −0.337 |
| d11 | 2.398 | 2.312 | 2.462 |

TABLE 4

(4th Embodiment)
f = 36.0 to 60.6 to 101.8  FNo = 4.1 to 6.1 to 8.2

| | Radius of Curvature | | Axial Distance | | Refractive Index | | Abbe Number |
|---|---|---|---|---|---|---|---|
| r1 | 120.758 | | | | | | |
| | | d1 | 1.100 | N1 | 1.72000 | v1 | 50.31 |
| r2 | 16.837 | | | | | | |
| | | d2 | 1.850 | | | | |
| r3 | 18.292 | | | | | | |
| | | d3 | 4.000 | N2 | 1.68893 | v2 | 31.16 |
| r4 | 41.695 | | | | | | |
| | | d4 | 12.174 to 6.241 to 2.300 | | | | |
| r5 | ∞ (light restricting plate) | | | | | | |
| | | d5 | 6.000 to 6.000 to 0.600 | | | | |

TABLE 4-continued (4th Embodiment)
f = 36.0 to 60.6 to 101.8  FNo = 4.1 to 6.1 to 8.2

| | | | | | | | |
|---|---|---|---|---|---|---|---|
| r6* | 14.104 | | | | | | |
| | | d6 | 4.500 | N3 | 1.60311 | v3 | 60.74 |
| r7* | −1064.248 | | | | | | |
| | | d7 | 0.500 | | | | |
| r8 | −83.533 | | | | | | |
| | | d8 | 4.000 | N4 | 1.84666 | v4 | 23.82 |
| r9 | 18.197 | | | | | | |
| | | d9 | 1.300 | | | | |
| r10 | 32.230 | | | | | | |
| | | d10 | 3.650 | N5 | 1.65446 | v5 | 33.86 |
| r11 | −20.465 | | | | | | |
| | | d11 | 1.650 | | | | |
| r12 | ∞ (aperture) | | | | | | |
| | | d12 | 12.994 to 5.886 to 3.100 | | | | |
| r13* | −61.538 | | | | | | |
| | | d13 | 3.750 | N6 | 1.58340 | v6 | 30.23 |
| r14 | −17.443 | | | | | | |
| | | d14 | 2.450 | | | | |
| r15 | −11.413 | | | | | | |
| | | d15 | 1.000 | N7 | 1.74400 | v7 | 44.93 |
| r16 | −119.322 | | | | | | |

Aspherical Coefficients r6: $\epsilon = 0.10000 \times 10$
$A4 = -0.13490 \times 10^{-4}$
$A6 = 0.57968 \times 10^{-6}$
$A8 = -0.28297 \times 10^{-7}$
$A10 = 0.58215 \times 10^{-9}$
$A12 = -0.43174 \times 10^{-11}$ r7: $\epsilon = 0.10000 \times 10$
$A4 = 0.43054 \times 10^{-4}$
$A6 = 0.42251 \times 10^{-6}$
$A8 = -0.24463 \times 10^{-7}$
$A10 = 0.64551 \times 10^{-9}$
$A12 = -0.57864 \times 10^{-11}$ r13: $\epsilon = 0.10000 \times 10$
$A4 = 0.46482 \times 10^{-4}$
$A6 = -0.16344 \times 10^{-6}$
$A8 = 0.91403 \times 10^{-8}$
$A10 = -0.89265 \times 10^{-10}$
$A12 = 0.45987 \times 10^{-12}$

Variable Distances in Photographing Near Subject
(D = 2.0 m)

| | Wide | Middle | Telephoto |
|---|---|---|---|
| d5 | 5.589 | 5.491 | −0.164 |
| d11 | 2.061 | 2.159 | 2.414 |

Variable Distances in Photographing Nearest Subject
(D = 0.5 to 0.8 to 1.1 m)

| | Wide | Middle | Telephoto |
|---|---|---|---|
| d5 | 4.051 | 4.585 | −0.915 |
| d11 | 3.599 | 3.065 | 3.165 |

TABLE 5

(5th Embodiment)
f = 39.1 to 60.6 to 101.9  FNo = 4.5 to 6.4 to 8.5

| | Radius of Curvature | | Axial Distance | | Refractive Index | | Abbe Number |
|---|---|---|---|---|---|---|---|
| r1 | 76.106 | | | | | | |
| | | d1 | 1.550 | N1 | 1.74400 | v1 | 44.93 |
| r2 | 16.547 | | | | | | |
| | | d2 | 1.100 | | | | |
| r3 | 17.430 | | | | | | |
| | | d3 | 5.500 | N2 | 1.65446 | v2 | 33.72 |
| r4 | 51.215 | | | | | | |
| | | d4 | 19.070 to 11.944 to 2.100 | | | | |
| r5 | ∞ (light restricting plate) | | | | | | |
| | | d5 | 5.154 to 5.154 to 1.154 | | | | |
| r6* | 13.569 | | | | | | |
| | | d6 | 3.650 | N3 | 1.62041 | v3 | 60.29 |
| r7* | −1049.395 | | | | | | |

TABLE 5-continued (5th Embodiment)
f = 39.1 to 60.6 to 101.9   FNo = 4.5 to 6.4 to 8.5

| | Radius of Curvature | | Axial Distance | | Refractive Index | | Abbe Number |
|---|---|---|---|---|---|---|---|
| r8 | −1032.791 | | | | | | |
| | | d7 | 0.323 | | | | |
| r9 | 13.188 | | | | | | |
| | | d8 | 3.550 | N4 | 1.84666 | v4 | 23.82 |
| r10 | 28.688 | d9 | 0.800 | | | | |
| r11* | −22.310 | | | | | | |
| | | d10 | 3.000 | N5 | 1.67339 | v5 | 29.25 |
| r12 | ∞ (aperture) | d11 | 1.000 | | | | |
| | | d12 | 11.893 to 5.893 to 2.500 | | | | |
| r13* | −46.503 | | | | | | |
| | | d13 | 3.800 | N6 | 1.58340 | v6 | 30.23 |
| r14 | −17.100 | d14 | 2.600 | | | | |
| r15 | −11.781 | | | | | | |
| | | d15 | 1.594 | N7 | 1.72000 | v7 | 50.31 |
| r16 | −199.744 | | | | | | |

Aspherical Coefficients r6: $\epsilon = 0.10000 \times 10$
$A4 = -0.93063 \times 10^{-4}$
$A6 = -0.10854 \times 10^{-5}$
$A8 = -0.17008 \times 10^{-7}$
$A10 = -0.31903 \times 10^{-9}$
$A12 = -0.37656 \times 10^{-11}$ r7: $\epsilon = 0.10000 \times 10$
$A4 = -0.87050 \times 10^{-4}$
$A6 = -0.13431 \times 10^{-5}$
$A8 = -0.24187 \times 10^{-7}$
$A10 = -0.88723 \times 10^{-10}$
$A12 = 0.14126 \times 10^{-13}$ r11: $\epsilon = 0.10000 \times 10$
$A4 = -0.15039 \times 10^{-4}$
$A6 = 0.51153 \times 10^{-6}$
$A8 = -0.11113 \times 10^{-7}$
$A10 = -0.12675 \times 10^{-9}$
$A12 = -0.79311 \times 10^{-12}$ r13: $\epsilon = 0.10000 \times 10$
$A4 = 0.42860 \times 10^{-4}$
$A6 = -0.33337 \times 10^{-6}$
$A8 = 0.13916 \times 10^{-7}$
$A10 = -0.13735 \times 10^{-9}$
$A12 = 0.60406 \times 10^{-12}$

TABLE 6

(6th Embodiment)
f = 36.0 to 60.6 to 101.8   FNo = 4.1 to 6.1 to 8.2

| | Radius of Curvature | | Axial Distance | | Refractive Index | | Abbe Number |
|---|---|---|---|---|---|---|---|
| r1 | 122.843 | | | | | | |
| | | d1 | 1.100 | N1 | 1.72000 | v1 | 50.31 |
| r2 | 16.636 | d2 | 1.850 | | | | |
| r3 | 18.328 | | | | | | |
| | | d3 | 4.000 | N2 | 1.70055 | v2 | 30.11 |
| r4 | 42.144 | | | | | | |
| | | d4 | 17.819 to 11.719 to 2.300 | | | | |
| r5 | ∞ (aperture) | d5 | 0.600 | | | | |
| r6* | 14.075 | | | | | | |
| | | d6 | 4.500 | N3 | 1.60311 | v3 | 60.74 |
| r7 | −2575.2561 | d7 | 0.500 | | | | |
| r8 | −79.004 | | | | | | |
| | | d8 | 4.000 | N4 | 1.84666 | v4 | 23.82 |
| r9 | 18.259 | d9 | 1.300 | | | | |
| r10 | 33.820 | | | | | | |
| | | d10 | 3.650 | N5 | 1.66446 | v5 | 35.84 |
| r11 | −19.939 | | | | | | |
| | | d11 | 14.297 to 7.320 to 4.600 | | | | |
| r12* | −61.107 | | | | | | |
| | | d12 | 3.750 | N6 | 1.58340 | v6 | 30.23 |
| r13 | −17.994 | d13 | 2.600 | | | | |
| r14 | −12.421 | | | | | | |
| | | d14 | 1.000 | N7 | 1.77250 | v7 | 49.77 |
| r15 | −175.424 | | | | | | |

TABLE 6-continued (6th Embodiment)
f = 36.0 to 60.6 to 101.8   FNo = 4.1 to 6.1 to 8.2

Aspherical Coefficients r6: $\epsilon = 0.10000 \times 10$
$A4 = -0.97191 \times 10^{-5}$
$A6 = 0.71675 \times 10^{-6}$
$A8 = -0.28744 \times 10^{-7}$
$A10 = 0.57159 \times 10^{-9}$
$A12 = -0.41336 \times 10^{-11}$ r7: $\epsilon = 0.10000 \times 10$
$A4 = 0.51121 \times 10^{-4}$
$A6 = 0.59017 \times 10^{-6}$
$A8 = -0.26510 \times 10^{-7}$
$A10 = 0.66516 \times 10^{-9}$
$A12 = -0.58622 \times 10^{-11}$ r12: $\epsilon = 0.10000 \times 10$
$A4 = 0.38379 \times 10^{-4}$
$A6 = -0.34412 \times 10^{-6}$
$A8 = 0.12398 \times 10^{-7}$
$A10 = -0.15708 \times 10^{-9}$
$A12 = 0.83494 \times 10^{-12}$

TABLE 7

(7th Embodiment)
f = 28.8 to 54.2 to 101.9   FNo = 4.1 to 6.1 to 8.2

| | Radius of Curvature | | Axial Distance | | Refractive Index | | Abbe Number |
|---|---|---|---|---|---|---|---|
| r1 | 606.516 | | | | | | |
| | | d1 | 1.100 | N1 | 1.78831 | v1 | 47.32 |
| r2 | 18.766 | d2 | 2.050 | | | | |
| r3 | 20.729 | | | | | | |
| | | d3 | 4.800 | N2 | 1.74000 | v2 | 28.26 |
| r4 | 57.757 | | | | | | |
| | | d4 | 17.162 to 9.986 to 2.300 | | | | |
| r5 | ∞ (light restricting plate) | d5 | 5.700 to 5.700 to 0.600 | | | | |
| r6* | 13.311 | | | | | | |
| | | d6 | 3.800 | N3 | 1.51728 | v3 | 69.43 |
| r7* | 4989.519 | d7 | 0.500 | | | | |
| r8 | −224.009 | | | | | | |
| | | d8 | 4.050 | N4 | 1.84666 | v4 | 23.82 |
| r9 | 16.925 | d9 | 1.250 | | | | |
| r10 | 26.126 | | | | | | |
| | | d10 | 3.800 | N5 | 1.66446 | v5 | 35.84 |
| r11 | −22.103 | d11 | 1.700 | | | | |
| r12 | ∞ (aperture) | | | | | | |
| | | d12 | 14.118 to 5.248 to 3.100 | | | | |
| r13* | −46.488 | | | | | | |
| | | d13 | 4.050 | N6 | 1.58340 | v6 | 30.23 |
| r14 | −19.003 | d14 | 3.500 | | | | |
| r15 | −11.902 | | | | | | |
| | | d15 | 1.000 | N7 | 1.72000 | v7 | 50.31 |
| r16 | −104.983 | | | | | | |

Aspherical Coefficients r6: $\epsilon = 0.10000 \times 10$
$A4 = -0.29926 \times 10^{-4}$
$A6 = 0.33426 \times 10^{-6}$
$A8 = -0.32306 \times 10^{-7}$
$A10 = 0.59764 \times 10^{-9}$
$A12 = -0.55497 \times 10^{-11}$ r7: $\epsilon = 0.10000 \times 10$
$A4 = 0.35204 \times 10^{-4}$
$A6 = -0.82040 \times 10^{-7}$
$A8 = -0.18379 \times 10^{-7}$
$A10 = 0.37274 \times 10^{-9}$
$A12 = -0.41948 \times 10^{-11}$ r13: $\epsilon = 0.10000 \times 10$
$A4 = 0.33856 \times 10^{-4}$
$A6 = -0.27886 \times 10^{-6}$
$A8 = 0.89087 \times 10^{-8}$
$A10 = -0.79899 \times 10^{-10}$
$A12 = 0.35641 \times 10^{-12}$ Variable Distances in Photographing Near Subject
(D = 2.0 m)

| Wide | Middle | Telephoto |
|---|---|---|

TABLE 7-continued (7th Embodiment)
f = 28.8 to 54.2 to 101.9  FNo = 4.1 to 6.1 to 8.2

| | | | |
|---|---|---|---|
| d5 | 5.384 | 5.287 | −0.164 |
| d11 | 2.018 | 2.113 | 2.464 |

Variable Distances in Photographing Nearest Subject
(D = 0.7 to 0.9 to 1.2 m)

| | Wide | Middle | Telephoto |
|---|---|---|---|
| d5 | 4.710 | 4.707 | −0.772 |
| d11 | 2.690 | 2.693 | 3.072 |

TABLE 8

(8th Embodiment)
f = 36.1 to 60.6 to 101.9  FNo = 4.1 to 6.1 to 8.2

| Radius of Curvature | | Axial Distance | | Refractive Index | | Abbe Number |
|---|---|---|---|---|---|---|
| r1 | 122.843 | | | | | |
| | | d1 | 1.100 | N1 | 1.72000 | v1 50.31 |
| r2 | 16.636 | | | | | |
| | | d2 | 1.850 | | | |
| r3 | 18.328 | | | | | |
| | | d3 | 4.000 | N2 | 1.70055 | v2 30.11 |
| r4 | 42.144 | | | | | |
| | | d4 | 18.419 to 12.319 to 2.900 | | | |
| r5* | 14.075 | | | | | |
| | | d5 | 4.500 | N3 | 1.60311 | v3 60.74 |
| r6* | −2575.261 | | | | | |
| | | d6 | 0.500 | | | |
| r7 | −79.004 | | | | | |
| | | d7 | 4.000 | N4 | 1.84666 | v4 23.82 |
| r8 | 18.259 | | | | | |
| | | d8 | 1.300 | | | |
| r9 | 33.820 | | | | | |
| | | d9 | 3.650 | N5 | 1.66446 | v5 35.84 |
| r10 | −19.939 | | | | | |
| | | d10 | 1.500 | | | |
| r11 | ∞ (aperture) | | | | | |
| | | d11 | 12.797 to 5.820 to 3.100 | | | |
| r12* | −61.107 | | | | | |
| | | d12 | 3.750 | N6 | 1.58340 | v6 30.23 |
| r13 | −17.994 | | | | | |
| | | d13 | 2.600 | | | |
| r14 | −12.421 | | | | | |
| | | d14 | 1.000 | N7 | 1.77250 | v7 49.77 |
| r15 | −175.424 | | | | | |

Aspherical Coefficients r5: $\epsilon = 0.10000 \times 10$
A4 = −0.99523 × 10⁻⁵
A6 = 0.72280 × 10⁻⁶
A8 = −0.28790 × 10⁻⁷
A10 = 0.57130 × 10⁻⁹
A12 = −0.41301 × 10⁻¹¹ r6: $\epsilon = 0.10000 \times 10$
A4 = 0.50891 × 10⁻⁴
A6 = 0.59506 × 10⁻⁶
A8 = −0.26495 × 10⁻⁷
A10 = 0.66471 × 10⁻⁹
A12 = −0.58689 × 10⁻¹¹ r12: $\epsilon = 0.10000 \times 10$
A4 = 0.38417 × 10⁻⁴
A6 = −0.34333 × 10⁻⁶
A8 = 0.12401 × 10⁻⁷
A10 = −0.15738 × 10⁻⁹
A12 = 0.83719 × 10⁻¹²

TABLE 9

(9th Embodiment)
f = 40.2 to 68.4 to 116.4  FNo = 4.1 to 6.1 to 8.2

| Radius of Curvature | | Axial Distance | | Refractive Index | | Abbe Number |
|---|---|---|---|---|---|---|
| r1 | 121.418 | | | | | |
| | | d1 | 1.226 | N1 | 1.72000 | v1 52.14 |
| r2 | 18.550 | | | | | |
| | | d2 | 2.061 | | | |
| r3 | 20.192 | | | | | |
| | | d3 | 4.457 | N2 | 1.68893 | v2 31.16 |
| r4 | 46.835 | | | | | |
| | | d4 | 14.973 to 7.835 to 2.400 | | | |
| r5 | ∞ (light restricting plate) | | | | | |
| | | d5 | 6.686 to 6.686 to 0.686 | | | |
| r6* | 15.757 | | | | | |
| | | d6 | 5.014 | N3 | 1.60311 | v3 60.74 |
| r7* | −1556.274 | | | | | |
| | | d7 | 0.557 | | | |
| r8 | −92.764 | | | | | |
| | | d8 | 4.457 | N4 | 1.84666 | v4 23.82 |
| r9 | 20.204 | | | | | |
| | | d9 | 1.449 | | | |
| r10 | 36.884 | | | | | |
| | | d10 | 4.067 | N5 | 1.66446 | v5 35.84 |
| r11 | −23.216 | | | | | |
| | | d11 | 1.839 | | | |
| r12 | ∞ (aperture) | | | | | |
| | | d12 | 14.637 to 6.485 to 3.350 | | | |
| r13* | −68.221 | | | | | |
| | | d13 | 4.179 | N6 | 1.58340 | v6 30.23 |
| r14 | −19.576 | | | | | |
| | | d14 | 2.730 | | | |
| r15 | −12.696 | | | | | |
| | | d15 | 1.114 | N7 | 1.72000 | v7 50.31 |
| r16 | −173.269 | | | | | |

Aspherical Coefficients r6: $\epsilon = 0.10000 \times 10$
A4 = −0.11865 × 10⁻⁴
A6 = 0.70485 × 10⁻⁶
A8 = −0.23732 × 10⁻⁷
A10 = 0.34975 × 10⁻⁹
A12 = −0.18569 × 10⁻¹¹ r7: $\epsilon = 0.10000 \times 10$
A4 = 0.30289 × 10⁻⁴
A6 = 0.54341 × 10⁻⁶
A8 = −0.21916 × 10⁻⁷
A10 = 0.39067 × 10⁻⁹
A12 = −0.24155 × 10⁻¹¹ r13: $\epsilon = 0.10000 \times 10$
A4 = 0.38286 × 10⁻⁴
A6 = −0.32483 × 10⁻⁶
A8 = 0.10535 × 10⁻⁷
A10 = −0.11131 × 10⁻⁹
A12 = 0.50736 × 10⁻¹²

TABLE 10

(10th Embodiment)
f = 28.8 to 54.2 to 101.8  FNo = 4.1 to 6.1 to 8.2

| Radius of Curvature | | Axial Distance | | Refractive Index | | Abbe Number |
|---|---|---|---|---|---|---|
| r1 | 606.516 | | | | | |
| | | d1 | 1.100 | N1 | 1.78831 | v1 47.31 |
| r2 | 18.770 | | | | | |
| | | d2 | 2.050 | | | |
| r3 | 20.712 | | | | | |
| | | d3 | 4.800 | N2 | 1.74000 | v2 28.26 |
| r4 | 57.592 | | | | | |
| | | d4 | 22.827 to 15.674 to 2.900 | | | |
| r5* | 13.312 | | | | | |
| | | d5 | 3.800 | N3 | 1.51728 | v3 69.43 |
| r6* | 4913.039 | | | | | |
| | | d6 | 0.500 | | | |
| r7 | −222.676 | | | | | |
| | | d7 | 4.050 | N4 | 1.84666 | v4 23.82 |
| r8 | 16.928 | | | | | |
| | | d8 | 1.250 | | | |
| r9 | 26.110 | | | | | |
| | | d9 | 3.800 | N5 | 1.66446 | v5 35.84 |
| r10 | −22.108 | | | | | |

TABLE 10-continued (10th Embodiment)
f = 28.8 to 54.2 to 101.8   FNo = 4.1 to 6.1 to 8.2

| | Radius of Curvature | | Axial Distance | Refractive Index | | Abbe Number |
|---|---|---|---|---|---|---|
| | | d10 | 1.700 | | | |
| r11 | ∞ (aperture) | | | | | |
| | | d11 | 14.137 to 5.252 to 3.100 | | | |
| r12* | −46.710 | | | | | |
| | | d12 | 4.050 | N6 | 1.58340 | v6 30.23 |
| r13 | −18.957 | | | | | |
| | | d13 | 3.500 | | | |
| r14 | −11.890 | | | | | |
| | | d14 | 1.000 | N7 | 1.72000 | v7 50.31 |
| r15 | −106.553 | | | | | |

Aspherical Coefficients r5: $\epsilon = 0.10000 \times 10$
 $A4 = -0.30969 \times 10^{-4}$
 $A6 = 0.39646 \times 10^{-6}$
 $A8 = -0.33033 \times 10^{-7}$
 $A10 = 0.59062 \times 10^{-9}$
 $A12 = -0.54401 \times 10^{-11}$
r12: $\epsilon = 0.10000 \times 10$
 $A4 = 0.34876 \times 10^{-4}$
 $A6 = -0.35833 \times 10^{-6}$
 $A8 = 0.11263 \times 10^{-7}$
 $A10 = -0.11036 \times 10^{-9}$
 $A12 = 0.49678 \times 10^{-12}$ r6: $\epsilon = 0.10000 \times 10$
 $A4 = 0.34361 \times 10^{-4}$
 $A6 = 0.24315 \times 10^{-9}$
 $A8 = -0.19905 \times 10^{-7}$
 $A10 = 0.37340 \times 10^{-9}$
 $A12 = -0.40838 \times 10^{-11}$

TABLE 11

(11th Embodiment)
f = 36.0 to 60.6 to 101.8   FNo = 4.1 to 6.1 to 8.2

| | Radius of Curvature | | Axial Distance | Refractive Index | | Abbe Number |
|---|---|---|---|---|---|---|
| r1 | 145.940 | | | | | |
| | | d1 | 1.630 | N1 | 1.71300 | v1 53.93 |
| r2 | 15.098 | | | | | |
| | | d2 | 1.661 | | | |
| r3 | 16.458 | | | | | |
| | | d3 | 4.300 | N2 | 1.63980 | v2 34.55 |
| r4 | 44.779 | | | | | |
| | | d4 | 13.051 to 7.298 to 2.900 | | | |
| r5 | ∞ (light restricting plate) | | | | | |
| | | d5 | 6.000 to 6.000 to 0.000 | | | |
| r6* | 14.168 | | | | | |
| | | d6 | 4.773 | N3 | 1.60311 | v3 60.74 |
| r7* | −839.292 | | | | | |
| | | d7 | 0.578 | | | |
| r8 | −218.384 | | | | | |
| | | d8 | 4.183 | N4 | 1.84666 | v4 23.82 |
| r9 | 14.847 | | | | | |
| | | d9 | 0.500 | | | |
| r10 | 21.438 | | | | | |
| | | d10 | 3.633 | N5 | 1.63980 | v5 34.55 |
| r11 | −23.380 | | | | | |
| | | d11 | 1.690 | | | |
| r12 | ∞ (aperture) | | | | | |
| | | d12 | 11.679 to 4.719 to 3.150 | | | |
| r13* | −69.203 | | | | | |
| | | d13 | 3.650 | N6 | 1.58340 | v6 30.23 |
| r14 | −17.995 | | | | | |
| | | d14 | 2.450 | | | |
| r15 | −11.660 | | | | | |
| | | d15 | 1.500 | N7 | 1.71300 | v7 53.93 |
| r16 | −204.946 | | | | | |

Aspherical Coefficients r6: $\epsilon = 0.10000 \times 10$
 $A4 = -0.30838 \times 10^{-4}$
 $A6 = 0.79022 \times 10^{-7}$
 $A8 = -0.10651 \times 10^{-7}$
 $A10 = 0.12956 \times 10^{-9}$
 $A12 = -0.12470 \times 10^{-11}$ r7: $\epsilon = 0.10000 \times 10$
 $A4 = 0.30397 \times 10^{-5}$
 $A6 = 0.79573 \times 10^{-7}$
 $A8 = -0.75313 \times 10^{-8}$
 $A10 = -0.64351 \times 10^{-11}$
 $A12 = 0.20373 \times 10^{-12}$

TABLE 11-continued (11th Embodiment)
f = 36.0 to 60.6 to 101.8   FNo = 4.1 to 6.1 to 8.2 r13: $\epsilon = 0.10000 \times 10$
 $A4 = 0.43636 \times 10^{-4}$
 $A6 = -0.56373 \times 10^{-7}$
 $A8 = 0.82388 \times 10^{-8}$
 $A10 = -0.95917 \times 10^{-10}$
 $A12 = 0.53571 \times 10^{-12}$

TABLE 12

(12th Embodiment)
f = 36.0 to 60.6 to 101.8   FNo = 4.1 to 6.1 to 8.2

| | Radius of Curvature | | Axial Distance | Refractive Index | | Abbe Number |
|---|---|---|---|---|---|---|
| r1 | 116.694 | | | | | |
| | | d1 | 1.100 | N1 | 1.75450 | v1 51.57 |
| r2 | 15.654 | | | | | |
| | | d2 | 1.850 | | | |
| r3 | 17.077 | | | | | |
| | | d3 | 4.300 | N2 | 1.65446 | v2 33.86 |
| r4 | 45.548 | | | | | |
| | | d4 | 11.640 to 5.640 to 2.300 | | | |
| r5 | ∞ (light restricting plate) | | | | | |
| | | d5 | 6.000 to 6.000 to 0.600 | | | |
| r6* | 14.466 | | | | | |
| | | d6 | 4.550 | N3 | 1.60311 | v3 60.74 |
| r7* | −1999.999 | | | | | |
| | | d7 | 0.900 | | | |
| r8 | −153.340 | | | | | |
| | | d8 | 4.100 | N4 | 1.84666 | v4 23.82 |
| r9 | 15.537 | | | | | |
| | | d9 | 0.500 | | | |
| r10 | 22.287 | | | | | |
| | | d10 | 3.633 | N5 | 1.63980 | v5 34.55 |
| r11 | −21.710 | | | | | |
| | | d11 | 1.700 | | | |
| r12 | ∞ (aperture) | | | | | |
| | | d12 | 12.089 to 5.428 to 3.100 | | | |
| r13* | −68.951 | | | | | |
| | | d13 | 3.750 | N6 | 1.58340 | v6 30.23 |
| r14 | −17.745 | | | | | |
| | | d14 | 2.450 | | | |
| r15 | −11.434 | | | | | |
| | | d15 | 1.000 | N7 | 1.75450 | v7 51.57 |
| r16 | −109.908 | | | | | |

Aspherical Coefficients r6: $\epsilon = 0.10000 \times 10$
 $A4 = -0.26669 \times 10^{-4}$
 $A6 = -0.19501 \times 10^{-6}$
 $A8 = -0.56894 \times 10^{-11}$
 $A10 = 0.59627 \times 10^{-10}$
 $A12 = -0.80346 \times 10^{-12}$
r13: $\epsilon = 0.10000 \times 10$
 $A4 = 0.46345 \times 10^{-4}$
 $A6 = -0.17690 \times 10^{-6}$
 $A8 = 0.15198 \times 10^{-7}$
 $A10 = -0.20822 \times 10^{-9}$
 $A12 = 0.11789 \times 10^{-11}$ r7: $\epsilon = 0.10000 \times 10$
 $A4 = 0.10333 \times 10^{-4}$
 $A6 = -0.29132 \times 10^{-6}$
 $A8 = -0.34902 \times 10^{-8}$
 $A10 = 0.15752 \times 10^{-10}$
 $A12 = -0.34427 \times 10^{-12}$

TABLE 13

(13th Embodiment)
f = 36.0 to 60.6 to 101.9   FNo = 4.1 to 6.1 to 8.2

| | Radius of Curvature | | Axial Distance | Refractive Index | | Abbe Number |
|---|---|---|---|---|---|---|
| r1 | 122.843 | | | | | |
| | | d1 | 1.100 | N1 | 1.72000 | v1 50.31 |
| r2 | 16.636 | | | | | |

TABLE 13-continued (13th Embodiment)
f = 36.0 to 60.6 to 101.9  FNo = 4.1 to 6.1 to 8.2

| | | | | | | |
|---|---|---|---|---|---|---|
| r3 | 18.328 | | | | | |
| | | d2 | 1.850 | | | |
| r4 | 42.144 | | | | | |
| | | d3 | 4.000 | N2 | 1.70055 v2 | 30.11 |
| r5 | ∞ (light restricting plate) | d4 | 12.419 to 6.319 to 2.300 | | | |
| | | d5 | 6.000 to 6.000 to 0.600 | | | |
| r6* | 14.075 | | | | | |
| | | d6 | 4.500 | N3 | 1.60311 v3 | 60.74 |
| r7* | −2575.261 | | | | | |
| | | d7 | 0.500 | | | |
| r8 | −79.004 | | | | | |
| | | d8 | 4.000 | N4 | 1.84666 v4 | 23.82 |
| r9 | 18.259 | | | | | |
| | | d9 | 1.300 | | | |
| r10 | 33.820 | | | | | |
| | | d10 | 3.650 | N5 | 1.66446 v5 | 35.84 |
| r11 | −19.939 | | | | | |
| | | d11 | 1.500 | | | |
| r12 | ∞ (aperture) | | | | | |
| | | d12 | 12.797 to 5.820 to 3.100 | | | |
| r13* | −61.107 | | | | | |
| | | d13 | 3.750 | N6 | 1.58340 v6 | 30.23 |
| r14 | −17.994 | | | | | |
| | | d14 | 2.600 | | | |
| r15. | −12.421 | | | | | |
| | | d15 | 1.000 | N7 | 1.77250 v7 | 49.77 |
| r16 | −175.424 | | | | | |

Aspherical Coefficients r6: ε = 0.10000 × 10          r7: ε = 0.10000 × 10
  A4 = −0.97191 × 10⁻⁴           A4 = 0.51121 × 10⁻⁴
  A6 = 0.71675 × 10⁻⁶            A6 = 0.59017 × 10⁻⁶
  A8 = −0.28744 × 10⁻⁷           A8 = −0.26510 × 10⁻⁷
  A10 = 0.57159 × 10⁻⁹           A10 = 0.66516 × 10⁻⁹
  A12 = −0.41336 × 10⁻¹¹         A12 = −0.58622 × 10⁻¹¹
r12: ε = 0.10000 × 10
  A4 = 0.38379 × 10⁻⁴
  A6 = −0.34412 × 10⁻⁶
  A8 = 0.12398 × 10⁻⁷
  A10 = −0.15708 × 10⁻⁹
  A12 = 0.83494 × 10⁻¹²

Variable Distances in Photographing Near Subject
(D = 2.0 m)

| | Wide | Middle | Telephoto |
|---|---|---|---|
| d5 | 5.596 | 5.497 | −0.159 |
| d11 | 1.903 | 2.003 | 2.259 |

Variable Distances in Photographing Nearest Subject
(D = 0.5 to 0.7 to 1.1 m)

| | Wide | Middle | Telephoto |
|---|---|---|---|
| d5 | 4.089 | 4.359 | −0.904 |
| d11 | 3.411 | 3.141 | 3.004 |

TABLE 14

(1st Embodiment)

| | (II) | (III) |
|---|---|---|
| y | 5th surface | 12th surface |
| 0.1Ymax | −6.67858 × 10⁻⁷ | −0.469545 × 10⁻⁷ |
| 0.2Ymax | −5.3864 × 10⁻⁶ | −3.73078 × 10⁻⁶ |
| 0.3Ymax | −1.84307 × 10⁻⁵ | −1.24887 × 10⁻⁵ |
| 0.4Ymax | −4.45563 × 10⁻⁵ | −2.94973 × 10⁻⁵ |
| 0.5Ymax | −8.93171 × 10⁻⁵ | −5.82371 × 10⁻⁵ |
| 0.6Ymax | −1.5947 × 10⁻⁴ | −1.04497 × 10⁻⁴ |
| 0.7Ymax | −2.63477 × 10⁻⁴ | −1.78893 × 10⁻⁴ |

TABLE 14-continued (1st Embodiment)

| | (II) | (III) |
|---|---|---|
| y | 5th surface | 12th surface |
| 0.8Ymax | −4.12038 × 10⁻⁴ | −2.99204 × 10⁻⁴ |
| 0.9Ymax | −6.18546 × 10⁻⁴ | −4.8878 × 10⁻⁴ |
| 1.0Ymax | −8.99123 × 10⁻⁴ | −7.62455 × 10⁻⁴ |

TABLE 15

(2nd Embodiment)

| | (II) | |
|---|---|---|
| y | 6th surface | 7th surface |
| 0.1 Ymax | −1.43198 × 10⁻⁶ | 1.83412 × 10⁻⁶ |
| 0.2 Ymax | −1.17225 × 10⁻⁵ | 1.48182 × 10⁻⁵ |
| 0.3 Ymax | −4.11183 × 10⁻⁵ | 5.08366 × 10⁻⁵ |
| 0.4 Ymax | −1.02892 × 10⁻⁴ | 1.23277 × 10⁻⁴ |
| 0.5 Ymax | −2.15449 × 10⁻⁴ | 2.4783 × 10⁻⁴ |
| 0.6 Ymax | −4.0514 × 10⁻⁴ | 4.4326 × 10⁻⁴ |
| 0.7 Ymax | −7.10125 × 10⁻⁴ | 7.3194 × 10⁻⁴ |
| 0.8 Ymax | −1.18613 × 10⁻³ | 1.13981 × 10⁻³ |
| 0.9 Ymax | −1.91582 × 10⁻³ | 1.69518 × 10⁻³ |
| 1.0 Ymax | −4.90067 × 10⁻⁴ | 4.90067 × 10⁻⁴ |

| | (II) | (III) |
|---|---|---|
| y | 9th surface | 13th surface |
| 0.1 Ymax | −1.11482 × 10⁻⁶ | −2.46163 × 10⁻⁶ |
| 0.2 Ymax | −8.80463 × 10⁻⁶ | −1.92702 × 10⁻⁵ |
| 0.3 Ymax | −2.90662 × 10⁻⁵ | −6.32038 × 10⁻⁵ |
| 0.4 Ymax | −6.67013 × 10⁻⁵ | −1.46307 × 10⁻⁴ |
| 0.5 Ymax | −1.24635 × 10⁻⁴ | −2.84839 × 10⁻⁴ |
| 0.6 Ymax | −2.03164 × 10⁻⁴ | −5.0829 × 10⁻⁴ |
| 0.7 Ymax | −2.99211 × 10⁻⁴ | −8.68988 × 10⁻⁴ |
| 0.8 Ymax | −4.05737 × 10⁻⁴ | −1.44259 × 10⁻³ |
| 0.9 Ymax | −5.11729 × 10⁻⁴ | −2.2991 × 10⁻³ |
| 1.0 Ymax | −6.03433 × 10⁻⁴ | −3.41121 × 10⁻³ |

TABLE 16

(3rd Embodiment)

| | (II) | |
|---|---|---|
| y | 6th surface | 7th surface |
| 0.1 Ymax | −2.47285 × 10⁻⁷ | −9.2659 × 10⁻⁷ |
| 0.2 Ymax | −1.82303 × 10⁻⁶ | −7.49792 × 10⁻⁶ |
| 0.3 Ymax | −5.43054 × 10⁻⁶ | −2.57034 × 10⁻⁵ |
| 0.4 Ymax | −1.1145 × 10⁻⁵ | −6.18355 × 10⁻⁵ |
| 0.5 Ymax | −1.93395 × 10⁻⁵ | −1.21643 × 10⁻⁴ |
| 0.6 Ymax | −3.24749 × 10⁻⁵ | −2.08189 × 10⁻⁴ |
| 0.7 Ymax | −5.77649 × 10⁻⁵ | −3.17819 × 10⁻⁴ |
| 0.8 Ymax | −1.12037 × 10⁻⁴ | −4.33447 × 10⁻⁴ |
| 0.9 Ymax | −2.33658 × 10⁻⁴ | −5.14153 × 10⁻⁴ |
| 1.0 Ymax | −5.13467 × 10⁻⁴ | −4.79714 × 10⁻⁴ |

| | (III) |
|---|---|
| y | 13th surface |
| 0.1 Ymax | −1.88388 × 10⁻⁶ |
| 0.2 Ymax | −1.49575 × 10⁻⁵ |
| 0.3 Ymax | −5.01478 × 10⁻⁵ |
| 0.4 Ymax | −1.19174 × 10⁻⁴ |
| 0.5 Ymax | −2.3777 × 10⁻⁴ |
| 0.6 Ymax | −4.31003 × 10⁻⁴ |
| 0.7 Ymax | −7.39206 × 10⁻⁴ |
| 0.8 Ymax | −1.2213 × 10⁻³ |
| 0.9 Ymax | −1.95006 × 10⁻³ |
| 1.0 Ymax | −2.99118 × 10⁻³ |

TABLE 17

(4th Embodiment)

| | (II) | |
|---|---|---|
| y | 6th surface | 7th surface |
| 0.1 Ymax | $-4.08285 \times 10^{-6}$ | $-1.14798 \times 10^{-6}$ |
| 0.2 Ymax | $-3.23993 \times 10^{-5}$ | $-9.33164 \times 10^{-6}$ |
| 0.3 Ymax | $-1.08236 \times 10^{-4}$ | $-3.21108 \times 10^{-5}$ |
| 0.4 Ymax | $-2.5435 \times 10^{-4}$ | $-7.73358 \times 10^{-5}$ |
| 0.5 Ymax | $-4.94684 \times 10^{-4}$ | $-1.5235 \times 10^{-4}$ |
| 0.6 Ymax | $-8.55339 \times 10^{-4}$ | $-2.64068 \times 10^{-4}$ |
| 0.7 Ymax | $-1.36211 \times 10^{-3}$ | $-4.21572 \times 10^{-4}$ |
| 0.8 Ymax | $-2.03514 \times 10^{-3}$ | $-6.40085 \times 10^{-4}$ |
| 0.9 Ymax | $-0.0028923$ | $-9.36693 \times 10^{-4}$ |
| 1.0 Ymax | $-3.99578 \times 10^{-3}$ | $-1.29078 \times 10^{-3}$ |

| | (III) |
|---|---|
| y | 13th surface |
| 0.1 Ymax | $-2.11419 \times 10^{-6}$ |
| 0.2 Ymax | $-1.67698 \times 10^{-5}$ |
| 0.3 Ymax | $-5.6205 \times 10^{-5}$ |
| 0.4 Ymax | $-1.3372 \times 10^{-4}$ |
| 0.5 Ymax | $-2.67328 \times 10^{-4}$ |
| 0.6 Ymax | $-4.84892 \times 10^{-4}$ |
| 0.7 Ymax | $-8.29529 \times 10^{-4}$ |
| 0.8 Ymax | $-0.0013667$ |
| 0.9 Ymax | $-0.0022029$ |
| 1.0 Ymax | $-3.54336 \times 10^{-3}$ |

TABLE 18

(5th Embodiment)

| | (II) | |
|---|---|---|
| y | 6th surface | 7th surface |
| 0.1 Ymax | $-2.236 \times 10^{-6}$ | $1.99901 \times 10^{-6}$ |
| 0.2 Ymax | $-1.82936 \times 10^{-5}$ | $1.64497 \times 10^{-5}$ |
| 0.3 Ymax | $-6.42531 \times 10^{-5}$ | $5.82837 \times 10^{-5}$ |
| 0.4 Ymax | $-1.61909 \times 10^{-4}$ | $1.48315 \times 10^{-4}$ |
| 0.5 Ymax | $-3.45245 \times 10^{-4}$ | $3.18596 \times 10^{-4}$ |
| 0.6 Ymax | $-6.73313 \times 10^{-4}$ | $0.000621$ |
| 0.7 Ymax | $-1.25596 \times 10^{-4}$ | $1.14062 \times 10^{-3}$ |
| 0.8 Ymax | $-2.30446 \times 10^{-3}$ | $2.01602 \times 10^{-3}$ |
| 0.9 Ymax | $-4.22809 \times 10^{-3}$ | $3.46899 \times 10^{-3}$ |
| 1.0 Ymax | $-7.81242 \times 10^{-3}$ | $7.81242 \times 10^{-3}$ |

| | (II) | (III) |
|---|---|---|
| y | 11th surface | 13th surface |
| 0.1 Ymax | $2.43342 \times 10^{-7}$ | $-2.09084 \times 10^{-6}$ |
| 0.2 Ymax | $1.85928 \times 10^{-6}$ | $-1.63766 \times 10^{-5}$ |
| 0.3 Ymax | $5.82148 \times 10^{-6}$ | $-5.40111 \times 10^{-5}$ |
| 0.4 Ymax | $1.2497 \times 10^{-5}$ | $-1.26892 \times 10^{-4}$ |
| 0.5 Ymax | $2.18799 \times 10^{-5}$ | $-2.53147 \times 10^{-4}$ |
| 0.6 Ymax | $3.46474 \times 10^{-5}$ | $-4.64378 \times 10^{-4}$ |
| 0.7 Ymax | $5.46473 \times 10^{-5}$ | $-8.11111 \times 10^{-4}$ |
| 0.8 Ymax | $9.3793 \times 10^{-5}$ | $-0.0013658$ |
| 0.9 Ymax | $1.80898 \times 10^{-4}$ | $-2.23421 \times 10^{-3}$ |
| 1.0 Ymax | $2.23524 \times 10^{-4}$ | $-3.61177 \times 10^{-3}$ |

TABLE 19

(6th Embodiment)

| | (II) | |
|---|---|---|
| y | 6th surface | 7th surface |
| 0.1 Ymax | $-2.91522 \times 10^{-7}$ | $-1.36685 \times 10^{-6}$ |
| 0.2 Ymax | $-1.98161 \times 10^{-6}$ | $-1.11502 \times 10^{-5}$ |
| 0.3 Ymax | $-5.1118 \times 10^{-6}$ | $-3.86078 \times 10^{-5}$ |
| 0.4 Ymax | $-8.47536 \times 10^{-6}$ | $-9.38321 \times 10^{-5}$ |

TABLE 19-continued (6th Embodiment)

| 0.5 Ymax | $-1.11943 \times 10^{-5}$ | $-1.87038 \times 10^{-4}$ |
|---|---|---|
| 0.6 Ymax | $-1.36764 \times 10^{-5}$ | $-3.28592 \times 10^{-4}$ |
| 0.7 Ymax | $-1.50796 \times 10^{-5}$ | $-5.31508 \times 10^{-4}$ |
| 0.8 Ymax | $-7.49659 \times 10^{-6}$ | $-8.1539 \times 10^{-4}$ |
| 0.9 Ymax | $2.22358 \times 10^{-5}$ | $-1.20232 \times 10^{-3}$ |
| 1.0 Ymax | $4.94806 \times 10^{-5}$ | $-1.67762 \times 10^{-3}$ |

| | (III) |
|---|---|
| y | 12th surface |
| 0.1 Ymax | $-1.63326 \times 10^{-6}$ |
| 0.2 Ymax | $-1.27513 \times 10^{-5}$ |
| 0.3 Ymax | $-4.17525 \times 10^{-5}$ |
| 0.4 Ymax | $-9.67233 \times 10^{-5}$ |
| 0.5 Ymax | $-1.88316 \times 10^{-4}$ |
| 0.6 Ymax | $-3.32801 \times 10^{-4}$ |
| 0.7 Ymax | $-5.52772 \times 10^{-4}$ |
| 0.8 Ymax | $-8.77149 \times 10^{-4}$ |
| 0.9 Ymax | $-1.35533 \times 10^{-3}$ |
| 1.0 Ymax | $-1.31676 \times 10^{-3}$ |

TABLE 20

(7th Embodiment)

| | (II) | |
|---|---|---|
| y | 6th surface | 7th surface |
| 0.1 Ymax | $-9.33847 \times 10^{-7}$ | $-9.74814 \times 10^{-7}$ |
| 0.2 Ymax | $-7.33477 \times 10^{-6}$ | $-7.73047 \times 10^{-6}$ |
| 0.3 Ymax | $-2.45126 \times 10^{-5}$ | $-2.5485 \times 10^{-5}$ |
| 0.4 Ymax | $-5.94301 \times 10^{-5}$ | $-5.74986 \times 10^{-5}$ |
| 0.5 Ymax | $-1.24711 \times 10^{-4}$ | $-1.02691 \times 10^{-4}$ |
| 0.6 Ymax | $-2.4328 \times 10^{-4}$ | $-1.52769 \times 10^{-4}$ |
| 0.7 Ymax | $-4.53614 \times 10^{-4}$ | $-1.88188 \times 10^{-4}$ |
| 0.8 Ymax | $-8.25464 \times 10^{-4}$ | $-0.0001671$ |
| 0.9 Ymax | $-1.52098 \times 10^{-3}$ | $1.1152 \times 10^{-5}$ |
| 1.0 Ymax | $-2.98477 \times 10^{-3}$ | $6.10311 \times 10^{-4}$ |

| | (III) |
|---|---|
| y | 13th surface |
| 0.1 Ymax | $-1.97743 \times 10^{-6}$ |
| 0.2 Ymax | $-1.5405 \times 10^{-5}$ |
| 0.3 Ymax | $-5.03707 \times 10^{-5}$ |
| 0.4 Ymax | $-1.17056 \times 10^{-4}$ |
| 0.5 Ymax | $-2.30879 \times 10^{-4}$ |
| 0.6 Ymax | $-4.19597 \times 10^{-4}$ |
| 0.7 Ymax | $-7.29956 \times 10^{-4}$ |
| 0.8 Ymax | $-1.23664 \times 10^{-3}$ |
| 0.9 Ymax | $-2.07234 \times 10^{-3}$ |
| 1.0 Ymax | $-3.53138 \times 10^{-3}$ |

TABLE 21

(8th Embodiment)

| | (II) | |
|---|---|---|
| y | 5th surface | 6th surface |
| 0.1 Ymax | $-2.98767 \times 10^{-7}$ | $-1.36083 \times 10^{-6}$ |
| 0.2 Ymax | $-2.03628 \times 10^{-6}$ | $-1.11041 \times 10^{-5}$ |
| 0.3 Ymax | $-5.27793 \times 10^{-6}$ | $-3.84638 \times 10^{-5}$ |
| 0.4 Ymax | $-8.81587 \times 10^{-6}$ | $-9.353 \times 10^{-5}$ |
| 0.5 Ymax | $-1.17363 \times 10^{-5}$ | $-1.86546 \times 10^{-4}$ |
| 0.6 Ymax | $-1.43926 \times 10^{-5}$ | $-3.27943 \times 10^{-4}$ |
| 0.7 Ymax | $-8.32819 \times 10^{-6}$ | $-5.30826 \times 10^{-4}$ |
| 0.8 Ymax | $5.27184 \times 10^{-6}$ | $-8.14865 \times 10^{-4}$ |
| 0.9 Ymax | $2.13767 \times 10^{-5}$ | $-1.20204 \times 10^{-3}$ |
| 1.0 Ymax | $4.83979 \times 10^{-5}$ | $-1.67712 \times 10^{-3}$ |

(III)

TABLE 21-continued (8th Embodiment)

| y | 12th surface |
|---|---|
| 0.1 Ymax | $-1.67704 \times 10^{-3}$ |
| 0.2 Ymax | $-1.30944 \times 10^{-5}$ |
| 0.3 Ymax | $-4.28824 \times 10^{-5}$ |
| 0.4 Ymax | $-9.93594 \times 10^{-5}$ |
| 0.5 Ymax | $-1.93483 \times 10^{-4}$ |
| 0.6 Ymax | $-3.41969 \times 10^{-4}$ |
| 0.7 Ymax | $-5.67992 \times 10^{-4}$ |
| 0.8 Ymax | $-9.01162 \times 10^{-4}$ |
| 0.9 Ymax | $-1.39209 \times 10^{-3}$ |
| 1.0 Ymax | $-4.50929 \times 10^{-3}$ |

TABLE 22

(9th Embodiment)

| | (II) | |
|---|---|---|
| y | 6th surface | 7th surface |
| 0.1 Ymax | $-4.67695 \times 10^{-7}$ | $-1.05677 \times 10^{-6}$ |
| 0.2 Ymax | $-3.15648 \times 10^{-6}$ | $-8.77829 \times 10^{-6}$ |
| 0.3 Ymax | $-8.09984 \times 10^{-6}$ | $-3.10212 \times 10^{-5}$ |
| 0.4 Ymax | $-1.37219 \times 10^{-5}$ | $-7.64476 \times 10^{-5}$ |
| 0.5 Ymax | $-2.0255 \times 10^{-5}$ | $-1.52652 \times 10^{-4}$ |
| 0.6 Ymax | $-3.22413 \times 10^{-5}$ | $-2.65242 \times 10^{-4}$ |
| 0.7 Ymax | $-5.45136 \times 10^{-5}$ | $-4.21342 \times 10^{-4}$ |
| 0.8 Ymax | $-8.0847 \times 10^{-5}$ | $-6.37709 \times 10^{-4}$ |
| 0.9 Ymax | $-9.21482 \times 10^{-5}$ | $-9.42117 \times 10^{-4}$ |
| 1.0 Ymax | $3.14272 \times 10^{-3}$ | $-1.3381 \times 10^{-3}$ |

| | (III) |
|---|---|
| y | 13th surface |
| 0.1 Ymax | $-2.30415 \times 10^{-6}$ |
| 0.2 Ymax | $-1.78926 \times 10^{-5}$ |
| 0.3 Ymax | $-5.83716 \times 10^{-5}$ |
| 0.4 Ymax | $-1.3581 \times 10^{-4}$ |
| 0.5 Ymax | $-2.6885 \times 10^{-4}$ |
| 0.6 Ymax | $-4.8848 \times 10^{-4}$ |
| 0.7 Ymax | $-8.39786 \times 10^{-4}$ |
| 0.8 Ymax | $-1.39021 \times 10^{-3}$ |
| 0.9 Ymax | $-2.29463 \times 10^{-3}$ |
| 1.0 Ymax | $-0.0040468$ |

TABLE 23

(10th Embodiment)

| | (II) | |
|---|---|---|
| y | 5th surface | 6th surface |
| 0.1 Ymax | $-9.64844 \times 10^{-7}$ | $-9.9422 \times 10^{-7}$ |
| 0.2 Ymax | $-7.54685 \times 10^{-6}$ | $-7.92045 \times 10^{-6}$ |
| 0.3 Ymax | $-2.50414 \times 10^{-5}$ | $-2.62766 \times 10^{-5}$ |
| 0.4 Ymax | $-6.01429 \times 10^{-5}$ | $-5.96678 \times 10^{-5}$ |
| 0.5 Ymax | $-1.25027 \times 10^{-4}$ | $-1.07097 \times 10^{-5}$ |
| 0.6 Ymax | $-2.42312 \times 10^{-4}$ | $-1.59462 \times 10^{-4}$ |
| 0.7 Ymax | $-4.50872 \times 10^{-4}$ | $-1.94462 \times 10^{-4}$ |
| 0.8 Ymax | $-8.22068 \times 10^{-4}$ | $-1.63161 \times 10^{-4}$ |
| 0.9 Ymax | $-1.52043 \times 10^{-3}$ | $5.28141 \times 10^{-4}$ |
| 1.0 Ymax | $-2.99036 \times 10^{-3}$ | $7.61676 \times 10^{-4}$ |

| | (III) |
|---|---|
| y | 12th surface |
| 0.1 Ymax | $-2.03186 \times 10^{-6}$ |
| 0.2 Ymax | $-1.572 \times 10^{-5}$ |
| 0.3 Ymax | $-5.09329 \times 10^{-5}$ |
| 0.4 Ymax | $-1.17412 \times 10^{-4}$ |

TABLE 23-continued (10th Embodiment)

| 0.5 Ymax | $-2.30649 \times 10^{-4}$ |
|---|---|
| 0.6 Ymax | $-4.1919 \times 10^{-4}$ |
| 0.7 Ymax | $-7.29725 \times 10^{-4}$ |
| 0.8 Ymax | $-1.23364 \times 10^{-3}$ |
| 0.9 Ymax | $-2.06128 \times 10^{-3}$ |
| 1.0 Ymax | $-3.53723 \times 10^{-3}$ |

TABLE 24

(11th Embodiment)

| | (II) | |
|---|---|---|
| y | 6th surface | 7th surface |
| 0.1 Ymax | $-1.0357 \times 10^{-6}$ | $-9.13814 \times 10^{-8}$ |
| 0.2 Ymax | $-8.25849 \times 10^{-6}$ | $-7.58758 \times 10^{-7}$ |
| 0.3 Ymax | $-2.7897 \times 10^{-5}$ | $-2.61327 \times 10^{-6}$ |
| 0.4 Ymax | $-6.69952 \times 10^{-5}$ | $-5.85209 \times 10^{-6}$ |
| 0.5 Ymax | $-1.35307 \times 10^{-4}$ | $-8.84017 \times 10^{-6}$ |
| 0.6 Ymax | $-2.48337 \times 10^{-4}$ | $-5.26992 \times 10^{-6}$ |
| 0.7 Ymax | $-4.31809 \times 10^{-4}$ | $2.04242 \times 10^{-5}$ |
| 0.8 Ymax | $-7.29734 \times 10^{-4}$ | $9.93916 \times 10^{-5}$ |
| 0.9 Ymax | $-1.22297 \times 10^{-3}$ | $2.85772 \times 10^{-4}$ |
| 1.0 Ymax | $-2.07453 \times 10^{-3}$ | $6.63367 \times 10^{-4}$ |

| | (III) |
|---|---|
| y | 13th surface |
| 0.1 Ymax | $-1.97892 \times 10^{-6}$ |
| 0.2 Ymax | $-1.58102 \times 10^{-5}$ |
| 0.3 Ymax | $-5.36189 \times 10^{-5}$ |
| 0.4 Ymax | $-1.29541 \times 10^{-4}$ |
| 0.5 Ymax | $-2.63232 \times 10^{-4}$ |
| 0.6 Ymax | $-4.8399 \times 10^{-4}$ |
| 0.7 Ymax | $-8.34348 \times 10^{-4}$ |
| 0.8 Ymax | $-1.37604 \times 10^{-3}$ |
| 0.9 Ymax | $-0.0022129$ |
| 1.0 Ymax | $-0.0035687$ |

TABLE 25

(12th Embodiment)

| | (II) | |
|---|---|---|
| y | 6th surface | 7th surface |
| 0.1 Ymax | $-9.43554 \times 10^{-7}$ | $-3.00167 \times 10^{-7}$ |
| 0.2 Ymax | $-7.689 \times 10^{-6}$ | $-2.25238 \times 10^{-6}$ |
| 0.3 Ymax | $-2.68472 \times 10^{-5}$ | $-6.71768 \times 10^{-6}$ |
| 0.4 Ymax | $-6.70979 \times 10^{-5}$ | $-1.27651 \times 10^{-5}$ |
| 0.5 Ymax | $-1.41209 \times 10^{-4}$ | $-1.62652 \times 10^{-5}$ |
| 0.6 Ymax | $-2.69082 \times 10^{-4}$ | $-7.8531 \times 10^{-6}$ |
| 0.7 Ymax | $-4.82638 \times 10^{-4}$ | $3.01424 \times 10^{-5}$ |
| 0.8 Ymax | $-8.35236 \times 10^{-4}$ | $1.28715 \times 10^{-4}$ |
| 0.9 Ymax | $-1.42249 \times 10^{-3}$ | $3.41095 \times 10^{-4}$ |
| 1.0 Ymax | $-2.42901 \times 10^{-3}$ | $7.59385 \times 10^{-4}$ |

| | (III) |
|---|---|
| y | 13th surface |
| 0.1 Ymax | $-2.15523 \times 10^{-6}$ |
| 0.2 Ymax | $-1.71102 \times 10^{-5}$ |
| 0.3 Ymax | $-5.77042 \times 10^{-5}$ |
| 0.4 Ymax | $-1.39437 \times 10^{-4}$ |
| 0.5 Ymax | $-2.85674 \times 10^{-4}$ |
| 0.6 Ymax | $-5.32234 \times 10^{-4}$ |
| 0.7 Ymax | $-9.28332 \times 10^{-4}$ |
| 0.8 Ymax | $-0.0015402$ |
| 0.9 Ymax | $-2.49026 \times 10^{-3}$ |
| 1.0 Ymax | $-4.11833 \times 10^{-3}$ |

TABLE 26

|  | fT/fW | f2/fW | f2/fT | (r1−r2)/(r1+r2) |
|---|---|---|---|---|
| 1st Embodiment | 2.83 | 0.778 | 0.275 | −1.27 |
| 2nd Embodiment | 2.45 | 0.629 | 0.257 | −1.01 |
| 3rd Embodiment | 2.83 | 0.749 | 0.265 | −1.06 |
| 4th Embodiment | 2.83 | 0.726 | 0.257 | −1.03 |
| 5th Embodiment | 2.60 | 0.697 | 0.268 | −1.03 |
| 6th Embodiment | 2.83 | 0.725 | 0.257 | −1.01 |
| 7th Embodiment | 3.53 | 0.887 | 0.251 | −0.99 |
| 8th Embodiment | 2.83 | 0.725 | 0.257 | −1.01 |
| 9th Embodiment | 2.90 | 0.737 | 0.254 | −1.02 |
| 10th Embodiment | 3.53 | 0.887 | 0.251 | −0.99 |

TABLE 27

|  | fT/fW | f3/fW | f3/fT | f1/f3 |
|---|---|---|---|---|
| 2nd Embodiment | 2.45 | −0.643 | −0.263 | 3.45 |
| 3rd Embodiment | 2.60 | −0.771 | −0.297 | 3.63 |
| 6th Embodiment | 2.83 | −0.871 | −0.308 | 2.26 |
| 8th Embodiment | 2.83 | −0.871 | −0.308 | 2.26 |
| 11th Embodiment | 2.83 | −0.907 | −0.321 | 1.92 |
| 12th Embodiment | 2.83 | −0.882 | −0.312 | 1.98 |

TABLE 28

|  | $\dfrac{(f_{12T}/f_T)^2}{\beta_{2T}^2 - 2}$ |
|---|---|
| 2nd Embodiment | −0.110 |
| 3rd Embodiment | −0.119 |
| 4th Embodiment | −0.134 |
| 7th Embodiment | −0.133 |
| 13th Embodiment | −0.133 |

TABLE 29

|  | In front of 2nd unit | Behind 2nd unit | Aspherical surfaces |
|---|---|---|---|
| 1st Embodiment | None | Aperture | One side surface of G3<br>One side surface of G6 |
| 2nd Embodiment | Light restricting plate | Aperture | One side surface of G2<br>Both side surfaces of G3<br>One side surface of G4<br>One side surface of G6 |
| 3rd Embodiment | Light restricting plate | Aperture | Both side surfaces of G3<br>One side surface of G6 |
| 4th Embodiment | Light restricting plate | Aperture | Both side surfaces of G3<br>One side surface of G6 |
| 5th Embodiment | Light restricting plate | Aperture | Both side surfaces of G3<br>One side surface of G5<br>One side surface of G6 |
| 6th Embodiment | Aperture | None | Both side surfaces of G3<br>One side surface of G6 |
| 7th Embodiment | Light restricting plate | Aperture | Both side surfaces of G3<br>One side surface of G6 |
| 8th Embodiment | None | Aperture | Both side surfaces of G3<br>One side surface of G6 |
| 9th Embodiment | Light restricting plate | Aperture | Both side surfaces. of G3<br>One side surface of G6 |
| 10th Embodiment | None | Aperture | Both side surfaces of G3<br>One side surface of G6 |
| 11th Embodiment | Light restricting plate | Aperture | Both side surfaces of G3<br>One side surface of G6 |
| 12th Embodiment | Light restricting plate | Aperture | Both side surfaces of G3<br>One side surface of G6 |

What is claimed is:

1. A zoom lens system comprising from the object side to the image side:

a first lens unit having a negative refractive power and shifting along an optical axis of the zoom lens system during a zooming operation;

a second lens unit having a positive refractive power and shifting along the optical axis during the zooming operation, said second lens unit consisting of from the object side to the image side a positive lens element, a negative lens element and a positive lens element; and a third lens unit having a negative refractive power and shifting along the optical axis during the zooming operation;

and wherein the zoom lens system fulfills the following conditions:

$$0.6 < \frac{f2}{fW} < 1.0$$

$$0.2 < \frac{f2}{fT} < 0.35$$

wherein;

f2 represents a focal length of the second lens unit;

fW represents the shortest focal length of the zoom lens system; and fT represents the longest focal length of the zoom lens system.

2. A zoom lens system as claimed in claim 1, wherein a space between the first and the second lens units and a space between the second and third lens units decrease during the zooming operation from a shorter focal length to a longer focal length.

3. A zoom lens system as claimed in claim 1, wherein the second lens unit includes an aspherical surface.

4. A zoom lens system as claimed in claim 3, wherein the second lens unit includes a lens element whose both side surfaces are aspherical.

5. A zoom lens system as claimed in claim 1, wherein the zoom lens system has a ray restrictor between the first and the second lens units, said ray restrictor having an opening for passing through light rays except for undesirable off-axial light rays for the lens unit and shifting along the optical axis.

6. A zoom lens system as claimed in claim 1, wherein the first and the third lens units consist of two lens elements, respectively.

7. A zoom lens system comprising from the object side to the image side:

a first lens unit having a negative refractive power and shifting along an optical axis of the zoom lens system during a zooming operation;

a second lens unit having a positive refractive power and shifting along the optical axis during the zooming operation; said second lens unit having an aspherical surface at the most object side end; and a third lens unit having a negative refractive power and shifting along the optical axis during the zooming operation;

and wherein the zoom lens system fulfills the following conditions:

$$0.6 < f2/fW < 1.0$$

$$0.2 < f2/fT < 0.35$$

wherein;

f2 represents a focal length of the second lens unit;

fW represents the shortest focal length of the zoom lens system; and fT represents the longest focal length of the zoom lens system.

8. A zoom lens system comprising from the object side to the image side:

a first lens unit having a negative refractive power and shifting along an optical axis of the zoom lens system during a zooming operation;

a second lens unit having a positive refractive power and shifting along the optical axis during the zooming operation, said second lens unit having an aspherical surface at the most object side end; and a third lens unit having a negative refractive power and shifting along the optical axis during the zooming operation;

and wherein the zoom lens system fulfills the following condition:

$$-1.3 < \frac{r1 - r2}{r1 + r2} < -0.9$$

wherein;

r1 represents a radius of curvature of an object side surface of a lens element arranged at the most object side end of the second lens unit; and r2 represents a radius of curvature of an image side surface of the lens element arranged at the most object side end of the second lens unit.

9. A zoom lens system comprising from the object side to the image side:

a first lens unit having a negative refractive power and shifting along an optical axis of the zoom lens system during a zooming operation;

a second lens unit having a positive refractive power and shifting along the optical axis during the zooming operation; and a third lens unit having a negative refractive power and shifting along the optical axis during the zooming operation, said third lens unit consisting of from the object side to the image side a positive lens element and a negative lens element;

and wherein the zoom lens system fulfills the following conditions:

$$0.5 < \left| \frac{f3}{fW} \right| < 1.0$$

$$0.26 < \left| \frac{f3}{fT} \right| < 0.33$$

wherein;

f3 represents a focal length of the third lens unit;

fW represents the shortest focal length of the zoom lens system; and fT represents the longest focal length of the zoom lens system.

10. A zoom lens system as claimed in claim 9, wherein a space between the first and the second lens units and a space between the second and the third lens units decrease during the zooming operation from a shorter focal length to a longer focal length.

11. A zoom lens system as claimed in claim 9, wherein the third lens unit includes a positive lens element with an aspherical surface.

12. A zoom lens system as claimed in claim 9, wherein the third lens unit includes a positive lens element fulfilling the following conditions:

$$Nd \leq 1.6$$

$$vd \leq 35.0$$

wherein;

Nd represents a refractive index of the positive lens element; and vd represents an Abbe number of the positive lens element.

13. A zoom lens system as claimed in claim 9, wherein the zoom lens system has a ray restrictor between the first and the second lens units, said ray restrictor having an opening for passing through light rays except for undesirable off-axial light rays for the lens unit and shifting along the optical axis.

14. A zoom lens system as claimed in claim 9, wherein the first lens unit consists of two lens elements and the second lens unit consists of three lens elements.

15. A zoom lens system comprising from the object side to the image side:

a first lens unit having a negative refractive power and shifting along an optical axis of the zoom lens system during a zooming operation;

a second lens unit having a positive refractive power and shifting along an optical axis during the zooming operation, and said second lens unit shifting along the optical axis for focusing operation; and a third lens unit having a negative refractive power and shifting along the optical axis during the zooming operation;

and wherein the zoom lens system fulfills the following condition:

$$0.05 < \left| \frac{\left(\frac{f12T}{fT}\right)^2}{\beta 2T^2 - 1} \right| < 0.18$$

wherein:

f12T represents a composite focal length of the first and the second lens units at the longest focal length condition;

B2T represents a lateral magnification of the second lens unit at the longest focal length condition; and fT represents the longest focal length of the zoom lens system.

16. A zoom lens system as claimed in claim 15, wherein the zoom lens system has an aperture stop between the second and the third lens units.

* * * * *